US012574641B2

(12) United States Patent
Park et al.

(10) Patent No.: US 12,574,641 B2
(45) Date of Patent: Mar. 10, 2026

(54) CAMERA DEVICE

(71) Applicant: LG INNOTEK CO., LTD., Seoul (KR)

(72) Inventors: Sang Ok Park, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 103 days.

(21) Appl. No.: 18/562,692

(22) PCT Filed: May 19, 2022

(86) PCT No.: PCT/KR2022/007200
§ 371 (c)(1),
(2) Date: Nov. 20, 2023

(87) PCT Pub. No.: WO2022/245165
PCT Pub. Date: Nov. 24, 2022

(65) Prior Publication Data
US 2024/0251168 A1     Jul. 25, 2024

(30) Foreign Application Priority Data

May 21, 2021     (KR) ........................ 10-2021-0065810
May 21, 2021     (KR) ........................ 10-2021-0065811

(51) Int. Cl.
*H04N 23/68*          (2023.01)
*H04N 23/55*          (2023.01)

(52) U.S. Cl.
CPC ........... *H04N 23/687* (2023.01); *H04N 23/55* (2023.01)

(58) Field of Classification Search
CPC ............................ H04N 23/687; H04N 23/55
See application file for complete search history.

(56) References Cited

U.S. PATENT DOCUMENTS 11,579,461 B1 * 2/2023 Mireault ................ G02B 7/023
2014/0055630 A1 * 2/2014 Gregory ................. H04N 23/57
348/208.2
(Continued)

FOREIGN PATENT DOCUMENTS

JP            2011-247909 A      12/2011
KR      10-2017-0040133 A        4/2017
(Continued)

OTHER PUBLICATIONS

International Search Report dated Aug. 18, 2022 in International Application No. PCT/KR2022/007200.

*Primary Examiner* — Minh Q Phan
(74) *Attorney, Agent, or Firm* — Saliwanchik, Lloyd & Eisenschenk

(57)          ABSTRACT
The first embodiment of the present invention may comprise: a fixed part including a first substrate; a first movement part disposed in the fixed part and including a lens; a second movement part disposed in the fixed part and including an image sensor; a first drive part for moving the first movement part in an optical axis direction; a second drive part for moving the second movement part in a direction perpendicular to the optical axis direction; a connection substrate for connecting the first substrate and the second movement part; and a first elastic member for connecting the fixed part and the second movement part.

20 Claims, 36 Drawing Sheets

(56)                References Cited

U.S. PATENT DOCUMENTS

| | | | | |
|---|---|---|---|---|
| 2019/0212632 A1* | 7/2019 | Miller | .................. | H04N 23/54 |
| 2022/0053136 A1* | 2/2022 | Sommer | ............... | H04N 23/54 |

FOREIGN PATENT DOCUMENTS

| | | |
|---|---|---|
| KR | 10-2020-0066571 A | 6/2020 |
| KR | 10-2020-0083953 A | 7/2020 |
| KR | 10-2021-0039841 A | 4/2021 |
| KR | 10-2021-0043244 A | 4/2021 |

* cited by examiner

10

(a)                                                    (b)

(a)

(b)

(c)

(d)

__1010__

(a)           (b)

(a)

(b)

(c)

(d)

CAMERA DEVICE

CROSS-REFERENCE TO RELATED APPLICATIONS

This application is the U.S. national stage application of International Patent Application No. PCT/KR2022/007200, filed May 19, 2022, which claims the benefit under 35 U.S.C. § 119 of Korean Application No. 10-2021-0065810, filed May 21, 2021, and Korean Application No. 10-2021-0065811, filed May 21, 2021, the disclosures of each of which are incorporated herein by reference in their entirety.

TECHNICAL FIELD

The teachings in accordance with exemplary and non-limiting embodiments of this invention relate generally to a camera device.

BACKGROUND OF THE INVENTION

A camera device is a device that takes pictures or videos of a subject, and is mounted on optical devices such as smartphones, drones, and vehicles.

In order to improve image quality, camera devices require image stabilization (Optical Image Stabilization, OIS) to compensate for image shake caused by user movement. In camera devices, image stabilization is performed by moving the lens perpendicular to the optical axis.

However, due to the recent trend of high pixelation, the diameter of the lens has increased, which increases the weight of the lens, and it is difficult to secure electromagnetic force to move the lens within a limited space.

DISCLOSURE

Technical Field

An exemplary embodiment of the present invention aims to provide a camera device that performs an image stabilization function by moving an image sensor.

An exemplary embodiment of the present invention aims to provide a camera device in which an image sensor is driven in three axes, namely an x-axis shift, a y-axis shift, and a z-axis roll.

Technical Solution

A camera device according to a first exemplary embodiment of the present invention may comprise: a fixed part comprising a first substrate; a first movement part disposed in the fixed part and comprising a lens; a second movement part disposed in the fixed part and comprising an image sensor; a first drive part for moving the first movement part in an optical axis direction; a second drive part for moving the second movement part in a direction perpendicular to the optical axis direction; a connection substrate for connecting the first substrate and the second movement part; and a first elastic member for connecting the fixed part and the second movement part.

Preferably, the first elastic member may not be electrically connected to the first substrate.

Preferably, the first elastic member may comprise a leaf spring.

Preferably, the first elastic member may comprise an outer part coupled to the fixed part, an inner part coupled to the second movement part, and a connection part connecting the outer part to the inner part, wherein the connection part may extend in the direction perpendicular to the optical axis direction.

Preferably, a height in the optical axis direction of the connection part may be from 0.5 times to 5 times a width in the direction perpendicular to the optical axis direction.

Preferably, a spring constant in the direction perpendicular to the optical axis direction of the connection part may be less than the spring constant in the optical axis direction.

Preferably, the camera may further comprise a second elastic member connecting the fixed part and the first movement part, wherein the second elastic member may comprise an outer part coupled to the fixed part, an inner part coupled to the first movement part, and a connection part connecting the outer part to the inner part, and wherein a spring constant in the optical axis direction of the connection part may be less than a spring constant in the direction perpendicular to the optical axis direction.

Preferably, the first elastic member may be spaced apart from the connection substrate.

Preferably, the camera device may comprise a wire connecting the fixed part to the second movement part, wherein the wire may be spaced apart from the first elastic member.

Preferably, the fixed part may comprise a base disposed on the first substrate.

Preferably, the second movement part may comprise a second substrate electrically connected to the image sensor, and a holder coupled to the second substrate, and the first elastic member may connect the base and the holder.

Preferably, a damper may be comprised connecting the outer part of the first elastic member to the connection part.

Preferably, a damper may be comprised connecting the inner part of the first elastic member to the connection part.

Preferably, a metal plate may be comprised being disposed on the connection substrate and formed of an alloy.

Preferably, the metal plate may be electrically connected to the first substrate.

Preferably, an optical instrument according to the first exemplary embodiment of the present invention may comprise: a main body; a camera device disposed on the main body; and a display disposed on the main body and outputting a video or image taken by the camera device.

Preferably, a camera device according to a first exemplary embodiment of the present invention may comprise: a fixed part comprising a first substrate and a base; a first movement part disposed within the fixed part and comprising a lens; a second movement part comprising a second substrate, an image sensor electrically connected to the second substrate and a holder coupled with the second substrate; a magnet disposed in the first movement part; a first coil disposed in the first movement part in a position corresponding to that of the magnet; a second coil disposed in the second movement part in a position corresponding to that of the magnet; a connection substrate connecting the first substrate and the second substrate; and a first elastic member connecting the base and the holder.

Preferably, the first elastic member may comprise an outer part coupled to the fixed part, an inner part coupled to the second movement part, and a connection part connecting the outer part to the inner part, wherein the connection part may extend in a direction perpendicular to the optical axis direction.

Preferably, the connection part may be formed of at least three strands.

Preferably, the first elastic member may be spaced apart from the connection substrate and the first substrate.

A camera device according to a first exemplary embodiment of the present invention may comprise: a fixed part comprising a first substrate; a first movement part disposed within the fixed part and comprising a lens; a second movement part disposed within the fixed part and comprising an image sensor; a first drive part for moving the first movement part in an optical axis direction; a second drive part for moving the second movement part in a direction perpendicular to the optical axis direction; a connection substrate connecting the first substrate and the second movement part; a metal plate disposed on the connection substrate; and a first elastic member connecting the fixed part and the second movement part.

Preferably, the first elastic member may be spaced apart from the metal plate.

A camera device according to a second exemplary embodiment of the present invention may comprise: a fixed part comprising a first substrate; a first movement par disposed within the fixed part and comprising a lens; a second substrate and comprising an image sensor in electrical connection with the second substrate; a first drive part for moving the first movement part in an optical axis direction; a second drive part for moving the second movement part in a direction perpendicular to the optical axis direction; a connection substrate connecting the first substrate and the second substrate; and a metal member disposed on the connection substrate, the metal member being in electrical connection with the second substrate.

Preferably, the metal member may be connected to a terminal of the connection substrate.

Preferably, the metal member may be connected to a ground terminal of the connection substrate.

Preferably, the connection substrate may comprise two insulating layers and an energizing layer disposed between the two insulating layers, and the metal member may comprise a material different from that of the energizing layer.

Preferably, the energizing layer may be formed of copper, and the metal member may be formed of a copper alloy.

Preferably, the thickness of the metal member may be greater than the thickness of the energizing layer.

Preferably, the metal member may comprise at least one of an alloy of copper and titanium and an alloy of copper and nickel.

The connection substrate may comprise a connection part for connecting with the second substrate, an extension part extending from the connection part, and a terminal part comprising terminals for connecting with the extension and for being coupled with the first substrate, and at least a portion of the metal member may be disposed on the extension part of the connection substrate.

The extension part may comprise a bending region bending in an optical axis direction and a perpendicular direction, the metal member may comprise a first portion and a second portion formed shorter than the first portion in the optical axis direction, and at least a portion of the second portion of the metal member may be disposed in the bending region.

The metal member may extend in a zigzag manner in the direction perpendicular to the optical axis direction with a width shorter than a length in the optical axis direction of the extension part.

The metal member may comprise a plurality of first grooves recessed from the top and a plurality of second grooves recessed from the bottom, wherein the plurality of first grooves and the plurality of second grooves are each disposed at positions corresponding to each other in the optical axis direction.

The metal member may be disposed on an inner surface of the extension part.

The metal member may be disposed on an outer surface of the extension part.

The camera device may comprise an insulating layer covering the metal member.

An optical instrument according to a second exemplary embodiment of the present invention may comprise: a main body; a camera device disposed on the main body; and a display disposed on the main body and outputting a video or image taken by the camera device.

A camera device according to a second exemplary embodiment of the invention may comprise: a fixed part comprising a first substrate; a first movement part disposed in the fixed part and comprising a lens; a second substrate and comprising an image sensor in electrical connection with the second substrate; a magnet disposed in the fixed part; a first coil disposed in the first movement part in a position corresponding to that of the magnet; a second coil disposed in a position corresponding to the magnet on the second movement part; a connection substrate connecting the first substrate and the second substrate; and a metal member coupled to the connection substrate, the metal member being electrically connected to a ground terminal of the connection substrate.

The metal member may be electrically connected to the image sensor.

The connection substrate may be formed of only two insulating layers and an energizing layer disposed between the two insulating layers.

The metal member may comprise a material different from that of the energizing layer, and the metal member may have a thickness greater than the thickness of the energizing layer.

A camera device according to a second exemplary embodiment of the present invention may comprise: a fixed part comprising a first substrate; a first movement part disposed within the fixed part and comprising a lens; a second substrate, comprising an image sensor electrically connected to the second substrate; a first drive part for moving the first movement part in an optical axis direction; a second drive part for moving the second movement part in a direction perpendicular to the optical axis direction; a connection substrate connecting the first substrate and the second substrate; and a metal member coupled to the connection substrate, the connection substrate comprising a connection part to the second substrate, an extension part extending from the connection part, and a terminal part comprising a terminal connected to and formed at the bottom of the extension part, the metal member comprising a body portion disposed on the extension part, and a protrusion extending from the body portion downwardly to the terminal on the connection substrate.

A camera device according to a second exemplary embodiment of the present invention may comprise: a fixed part comprising a first substrate; a first movement part disposed within the fixed part and comprising a lens; a second substrate comprising a second substrate and an image sensor electrically connected to the second substrate; a first drive part for moving the first movement part in an optical axis direction; a second drive part for moving the second movement part in a direction perpendicular to the optical axis direction; a connection substrate connecting the first substrate and the second substrate; and a metal member disposed on the connection substrate, the connection substrate comprising a ground terminal, the metal member being electrically connected to the ground terminal.

Advantageous Effects of the Invention

With the given exemplary embodiments, the image sensor can be moved to perform an image stabilization function.

Furthermore, the first exemplary embodiment of the present invention can facilitate the management of the resonant frequency by arranging a leaf spring separate from the connection substrate supporting the image sensor.

Furthermore, the first exemplary embodiment of the present invention can minimize the noise generated by the movement part striking the fixed part when not driven through the leaf spring.

Furthermore, the second exemplary embodiment of the present invention can enable the modulus of elasticity to be increased by applying a spring to the connection substrate supporting the image sensor. This may facilitate design for resonant frequency management.

Furthermore, the second exemplary embodiment of the present invention can facilitate the management of bending part and tolerance management of the connection substrate.

Furthermore, the second exemplary embodiment of the present invention can allow a metal spring to be utilized as a ground line.

BRIEF DESCRIPTION OF DRAWINGS

FIG. 26 illustrates the operation of an image sensor of a camera device according to a first exemplary embodiment of the present invention being shifted along the x-axis. FIG. 27 is a drawing to illustrate the operation of an image sensor of a camera device according to a first exemplary embodiment of the present invention being shifted along the y-axis. FIG. 28 is a drawing to illustrate an operation in which an image sensor of a camera device according to a first exemplary embodiment of the present invention is rolled about a z-axis.

FIG. 51 is a drawing to illustrate the operation of an image sensor of a camera device according to a second exemplary embodiment of the present invention being shifted along the x-axis. FIG. 52 is a drawing to illustrate the operation of an image sensor of a camera device according to a second exemplary embodiment of the present invention being shifted along the y-axis. FIG. 53 is a drawing to illustrate an operation in which an image sensor of a camera device according to a second exemplary embodiment of the present invention is rolled about a z-axis.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, terms (comprising technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may comprise the plural unless the context otherwise requires, and references to "at least one (or more) of A and (or) B and C" may comprise one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can comprise cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" comprises not only when two components are in direct contact with each other, but also when one or more other components are formed or disposed between the two components. Furthermore, when expressed as "above" or "below", it may comprise the meaning of upward as well as downward with respect to a single component.

Hereinafter, a camera device according to a first exemplary embodiment of the present invention will be described in more detail with reference to the accompanying drawings.

Figure 1:
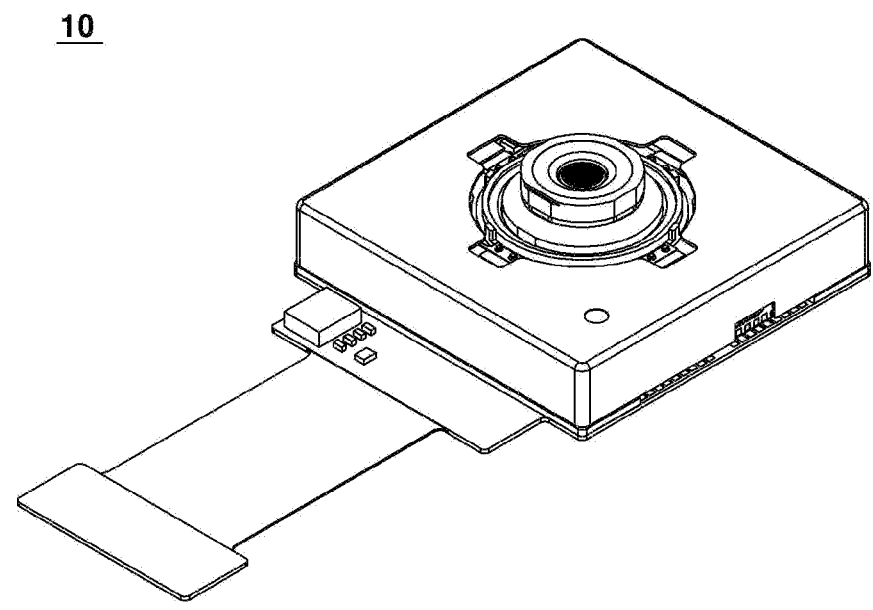
FIG. 1 is a perspective view of a camera device according to a first exemplary embodiment of the present invention.
Figure 2:
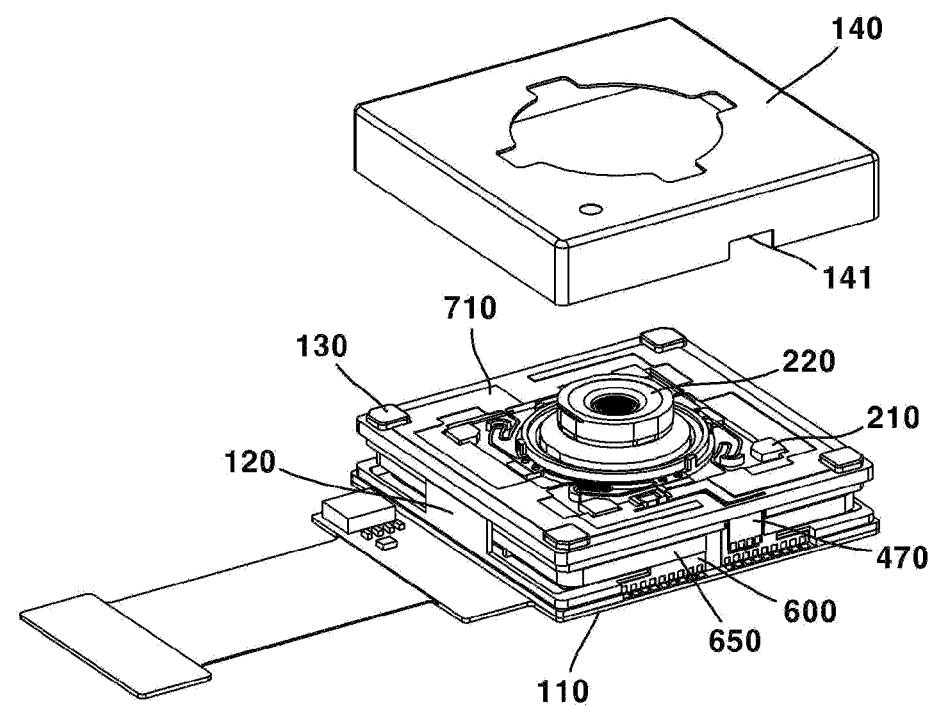
FIG. 2 is an exploded view of the camera device according to a first exemplary embodiment of the present invention with the cover member removed.
Figure 3:
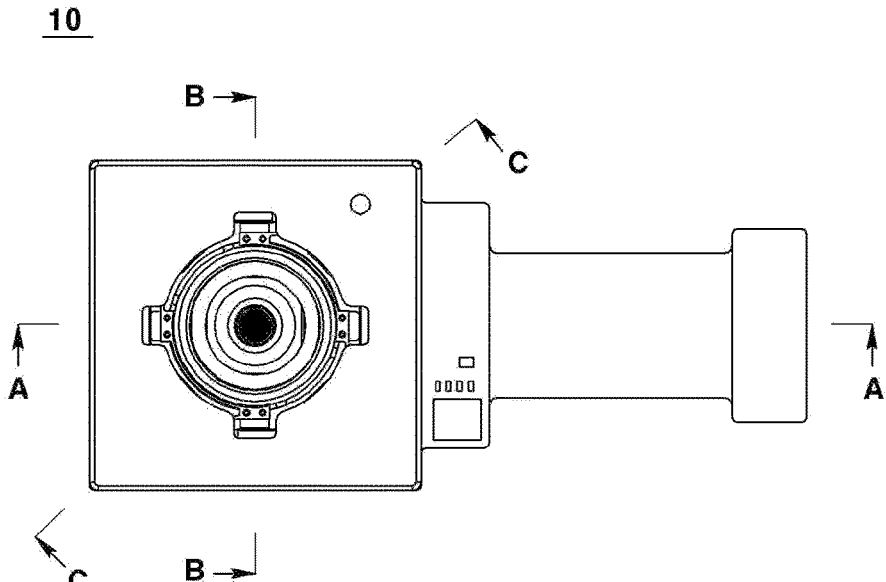
FIG. 3 is a top view of a camera device according to a first exemplary embodiment of the present invention.
Figure 4:
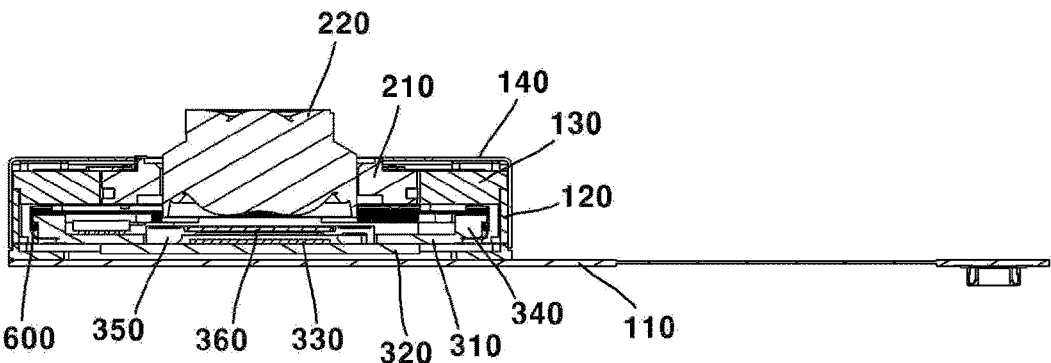
FIG. 4 is a cross-sectional view from A-A of FIG. 3.
Figure 5:
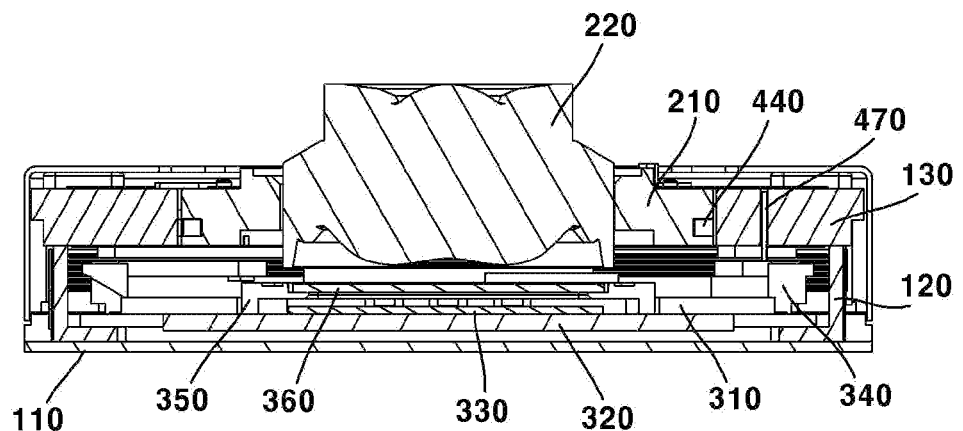
FIG. 5 is a cross-sectional view from B-B of FIG. 3.
Figure 6:
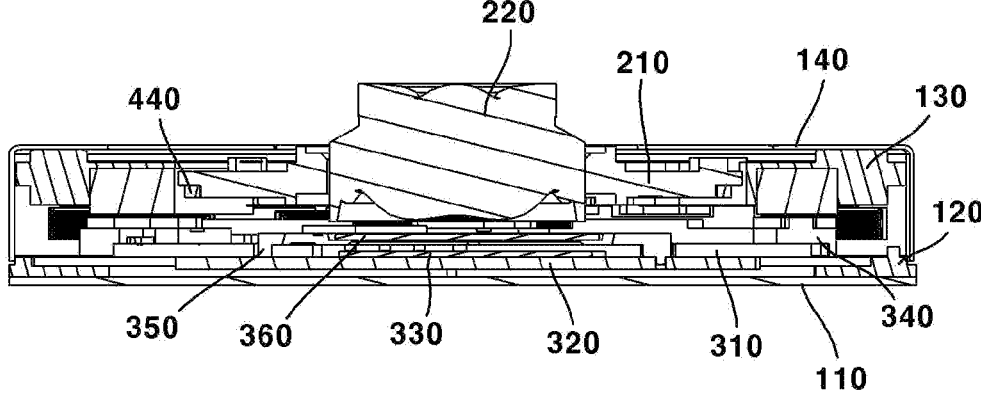
FIG. 6 is a cross-sectional view from C-C of FIG. 3.
Figure 7:
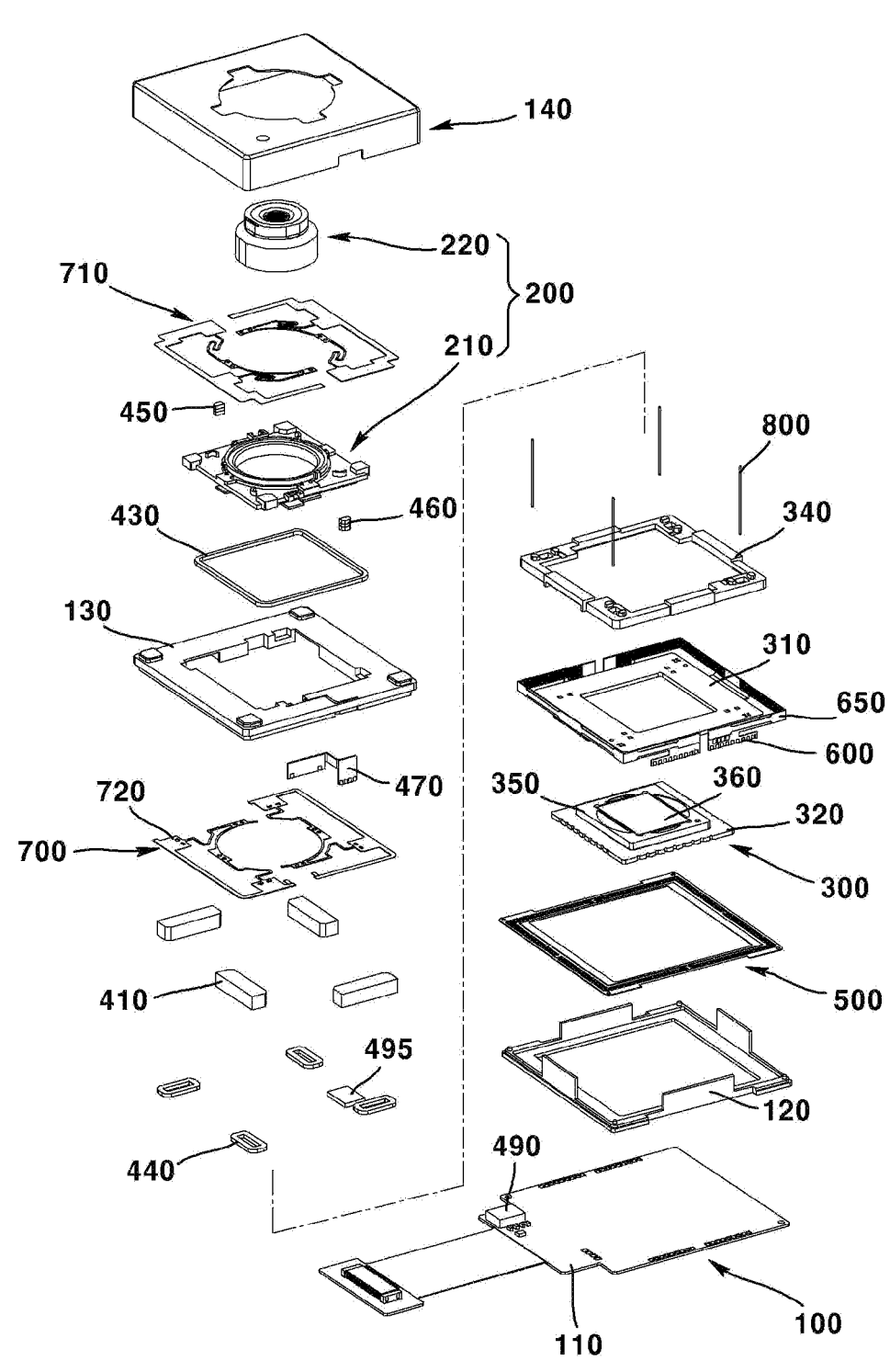
FIG. 7 is an exploded view of a camera device according to a first exemplary embodiment of the present invention.
Figure 8:
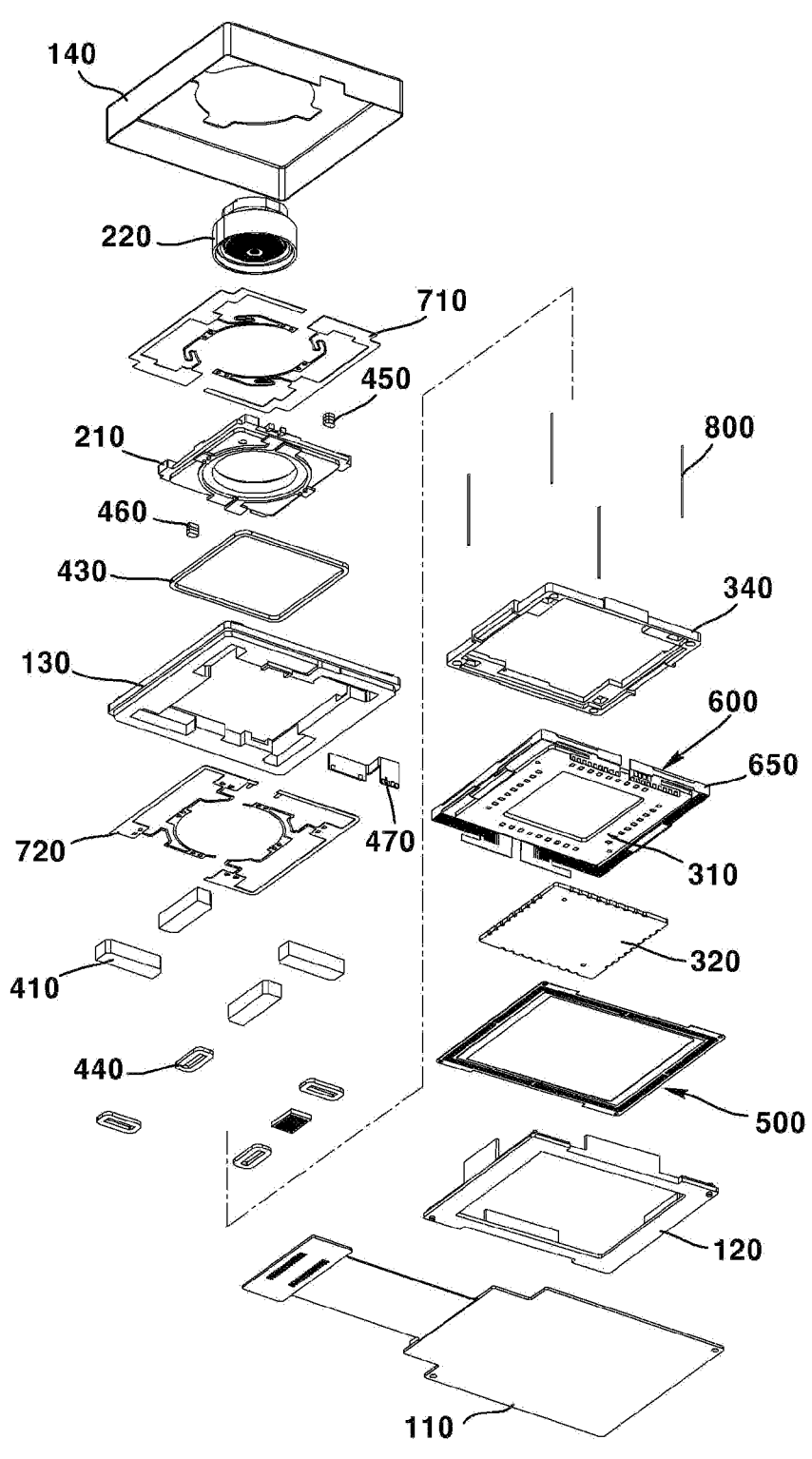
FIG. 8 is an exploded view of a camera device according to a first exemplary embodiment of the present invention from a different direction than FIG. 7.

FIG. 1 is a perspective view of a camera device according to a first exemplary embodiment of the present invention, FIG. 2 is an exploded view of the camera device according to a first exemplary embodiment of the present invention with the cover member removed, FIG. 3 is a top view of a camera device according to a first exemplary embodiment of the present invention, FIG. 4 is a cross-sectional view from A-A of FIG. 3, FIG. 5 is a cross-sectional view from B-B of FIG. 3, FIG. 6 is a cross-sectional view from C-C of FIG. 3, FIG. 7 is an exploded view of a camera device according to a first exemplary embodiment of the present invention, FIG.

Figure 9:
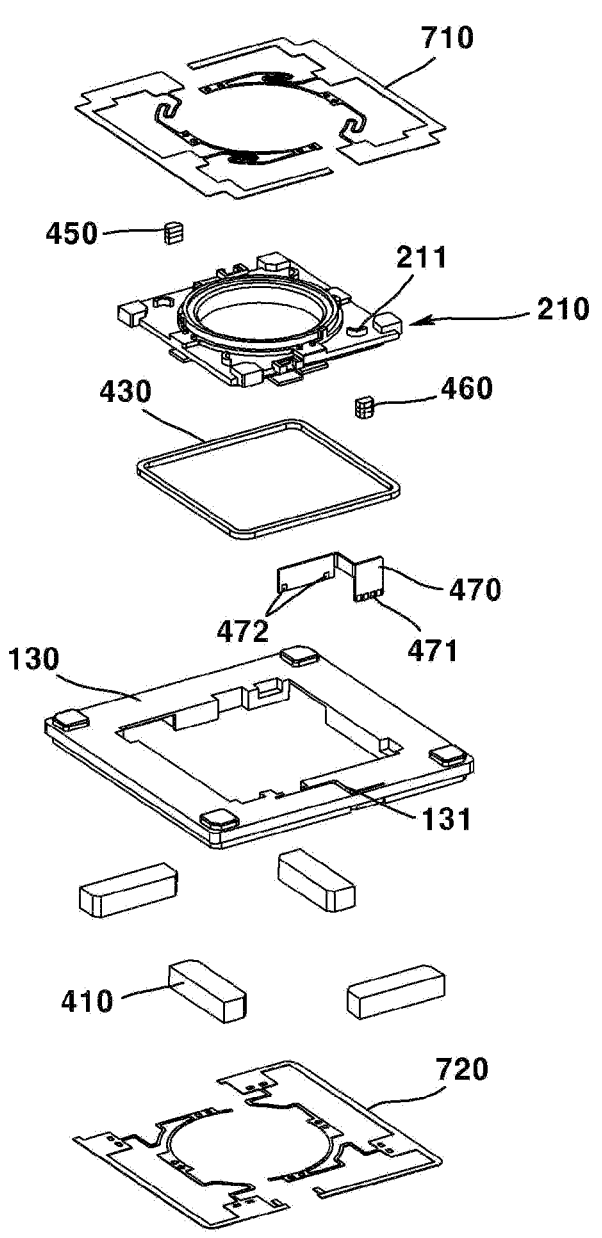
FIG. 9 is an exploded view of the first movement part of the camera device according to a first exemplary embodiment of the present invention and related configurations.
Figure 10:
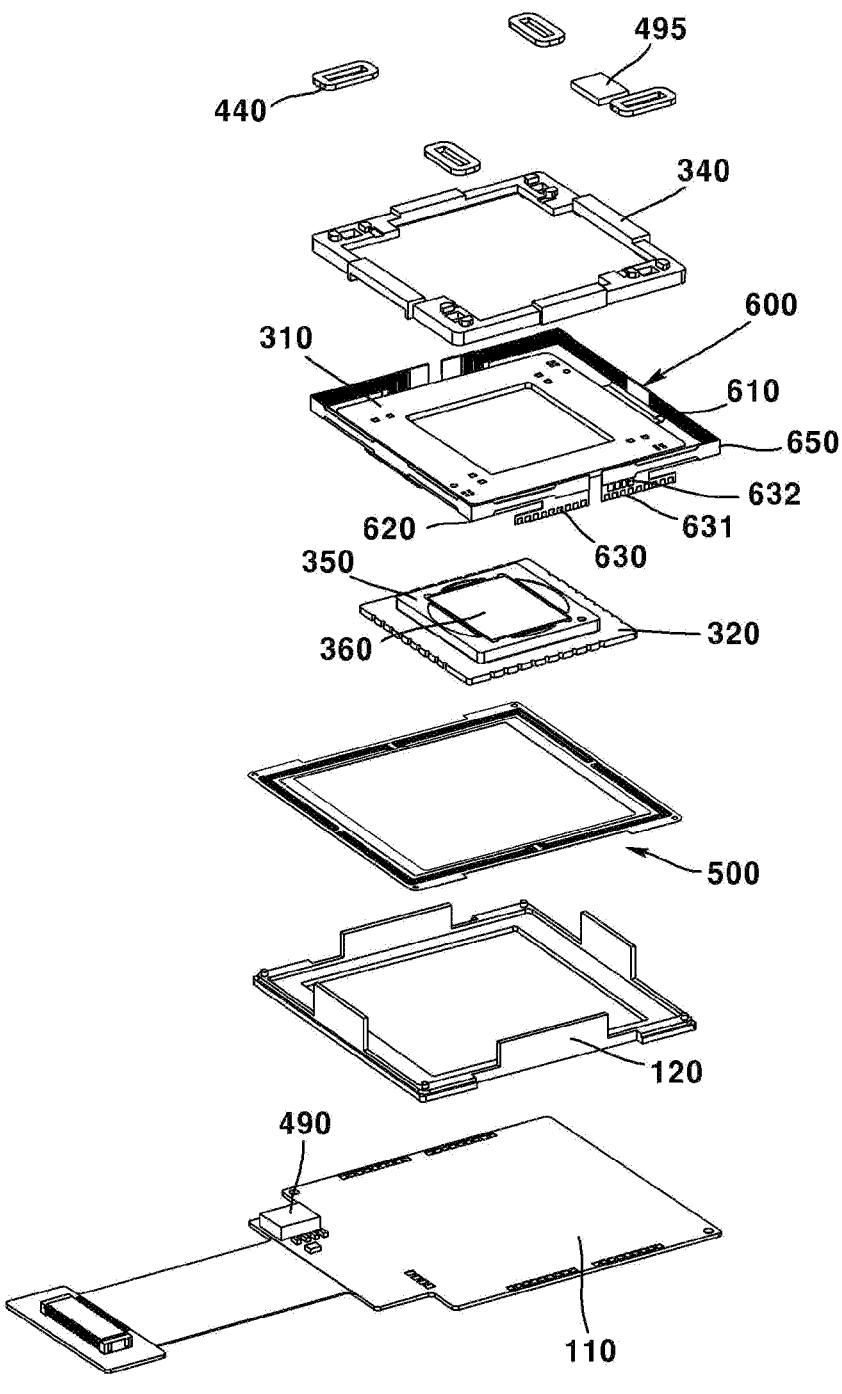
FIG. 10 is an exploded view of the second movement part and associated configuration of the camera device according to a first exemplary embodiment of the present invention.
Figure 11:
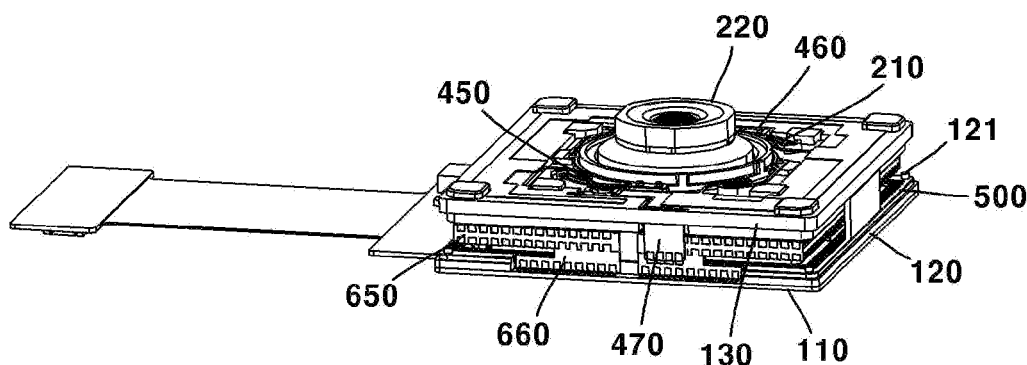
FIG. 11 is a perspective view of a camera device according to a first exemplary embodiment of the present invention with the cover member omitted.
Figure 12:
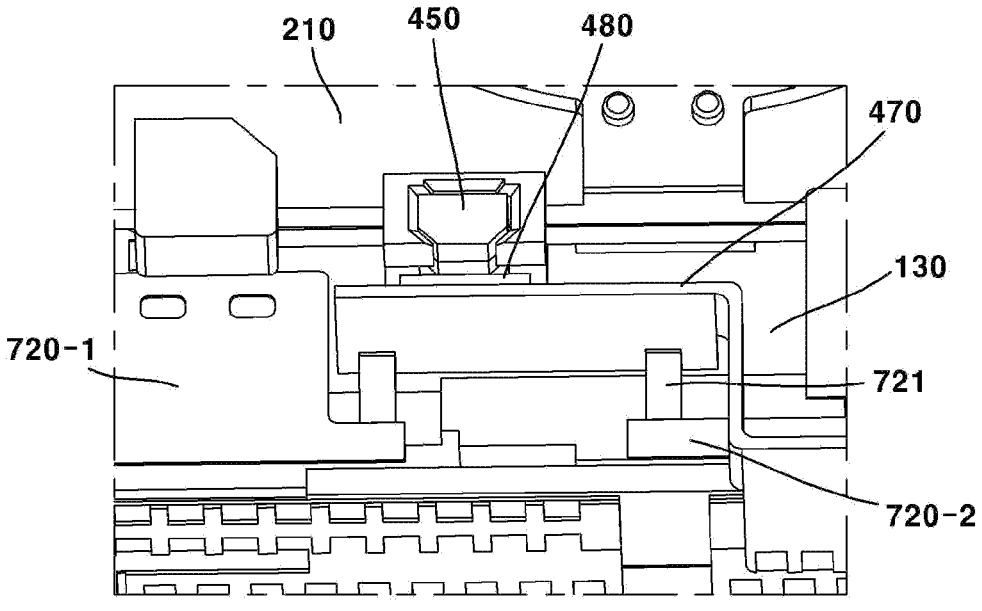
FIG. 12 is a perspective view illustrating a sensing structure and an energizing structure for AF feedback control of a camera device according to a first exemplary embodiment of the present invention.
Figure 13:
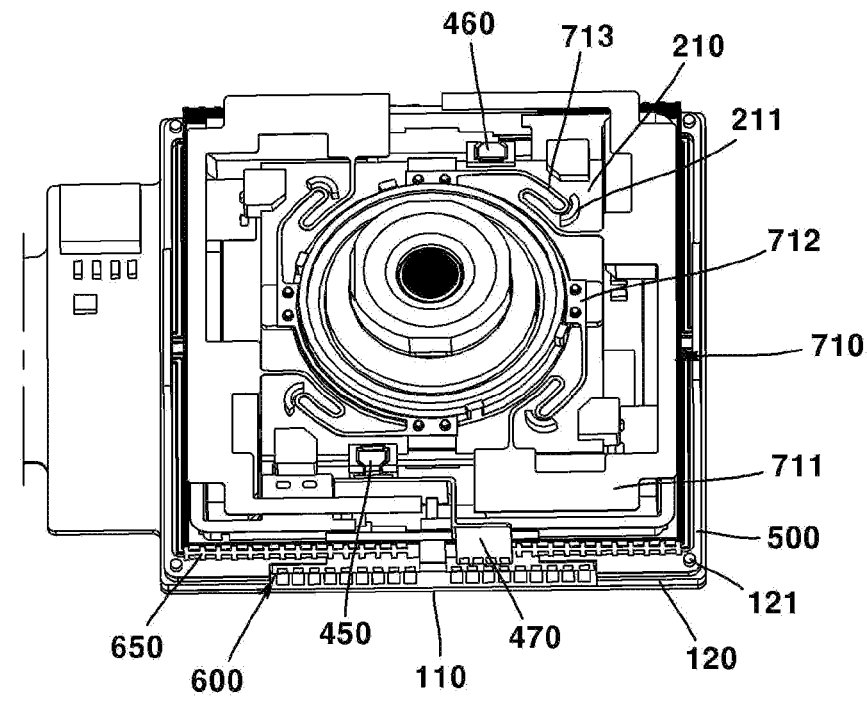
FIG. 13 is a perspective view of a partial configuration of a camera device according to a first exemplary embodiment of the present invention.
Figure 14:
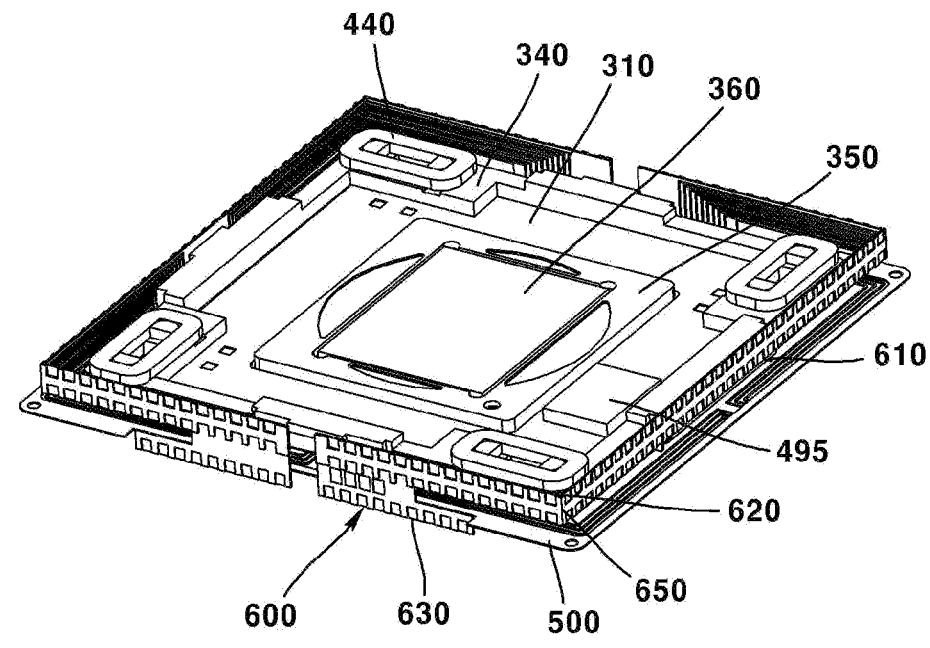
FIG. 14 is a perspective view illustrating a second movement part, a connection substrate, and an elastic member of a camera device according to a first embodiment of the present invention.
Figure 15:
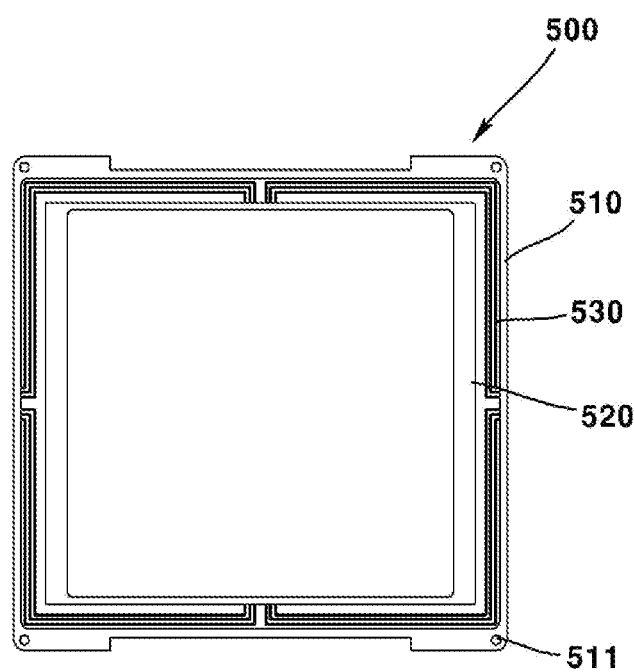
FIG. 15 is a perspective view of an elastic member of a camera device according to a first exemplary embodiment of the present invention.
Figure 16:
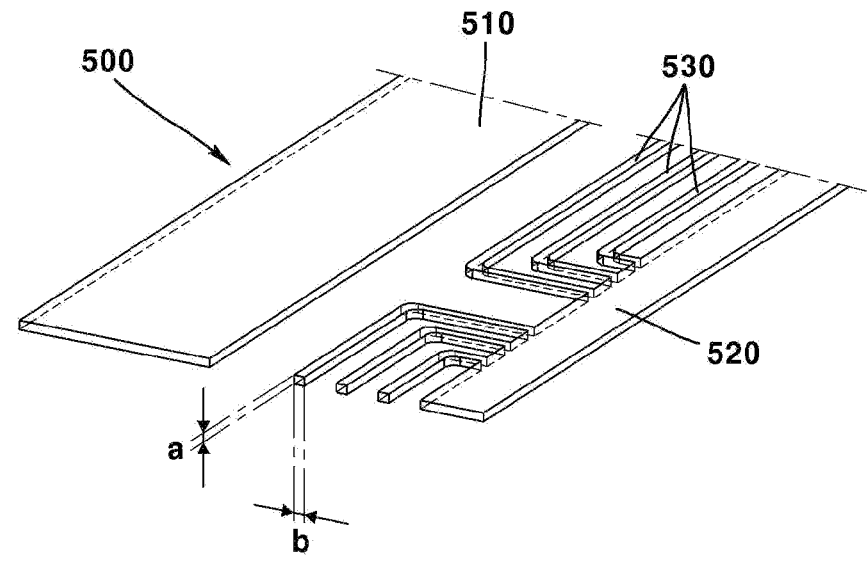
FIG. 16 is a cross-sectional perspective view illustrating a portion of an elastic member of a camera device according to a first exemplary embodiment of the present invention.
Figure 17:
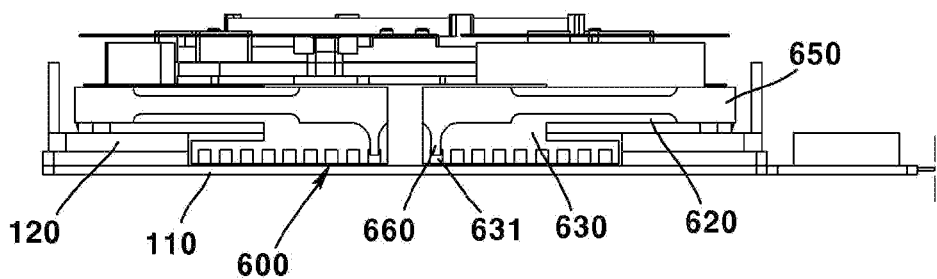
FIG. 17 is a side view of a camera device according to a first embodiment of the present invention with the cover member omitted.
Figure 18:
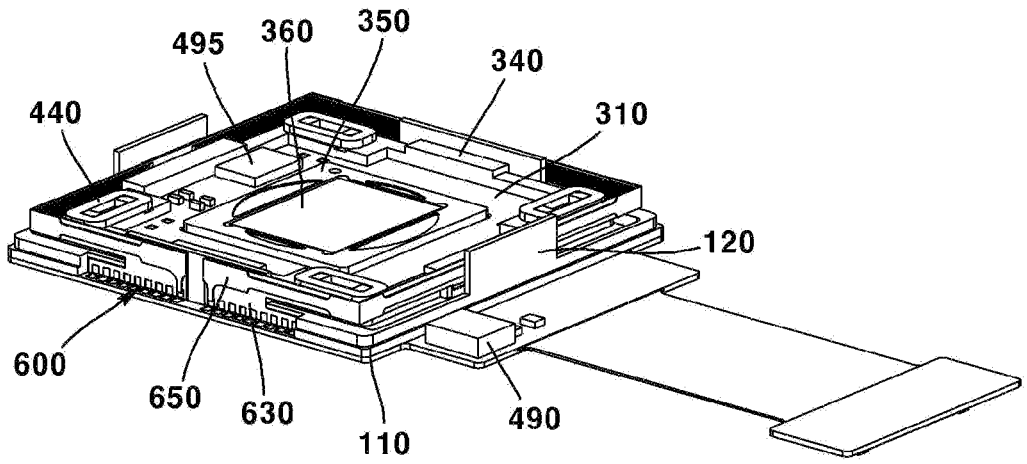
FIG. 18 is a perspective view illustrating a second movement part, a fixed part, and a connection substrate of a camera device according to a first embodiment of the present invention.
Figure 19:
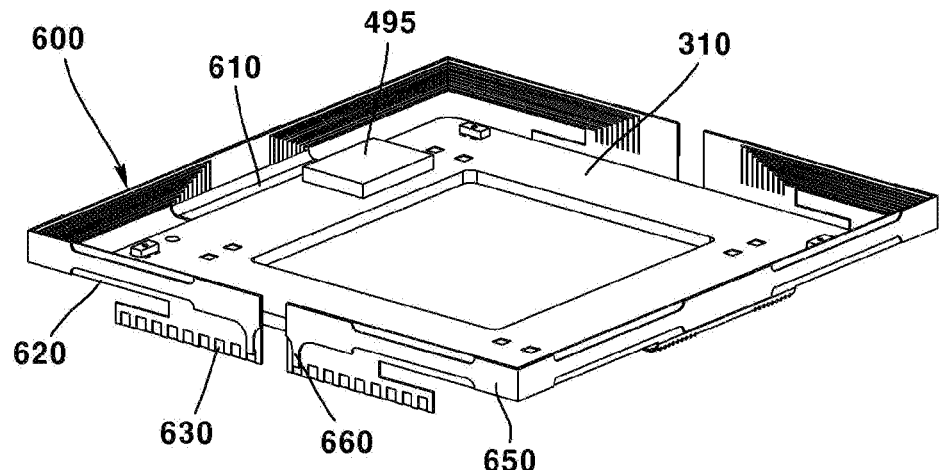
FIG. 19 is a perspective view illustrating a portion of a second movement part of a camera device according to a first exemplary embodiment of the present invention and a connection substrate.
Figure 20:
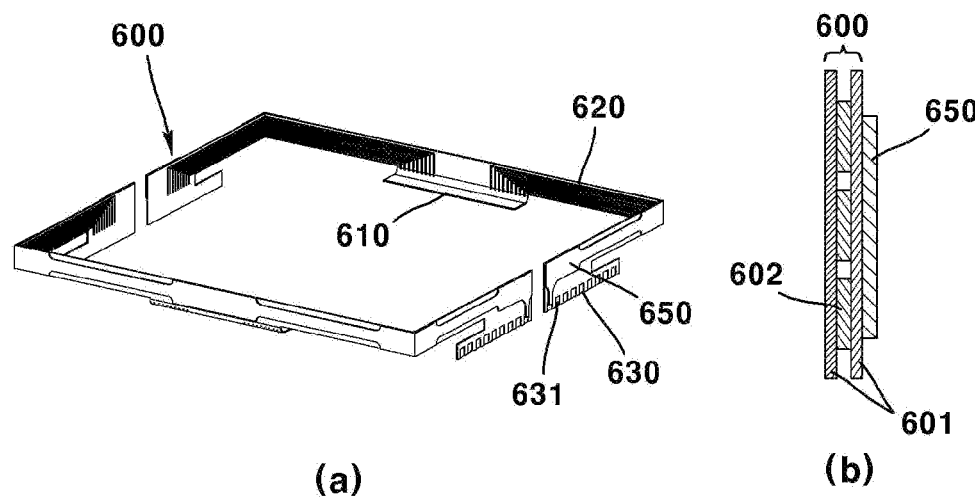
FIG. 20 (a) is a perspective view of a connection substrate and a metal plate of a camera device according to a first exemplary embodiment of the present invention, and FIG. 20 (b) is a cross-sectional view of a connection substrate and a metal plate of a camera device according to the first exemplary embodiment of the present invention.
Figure 21:
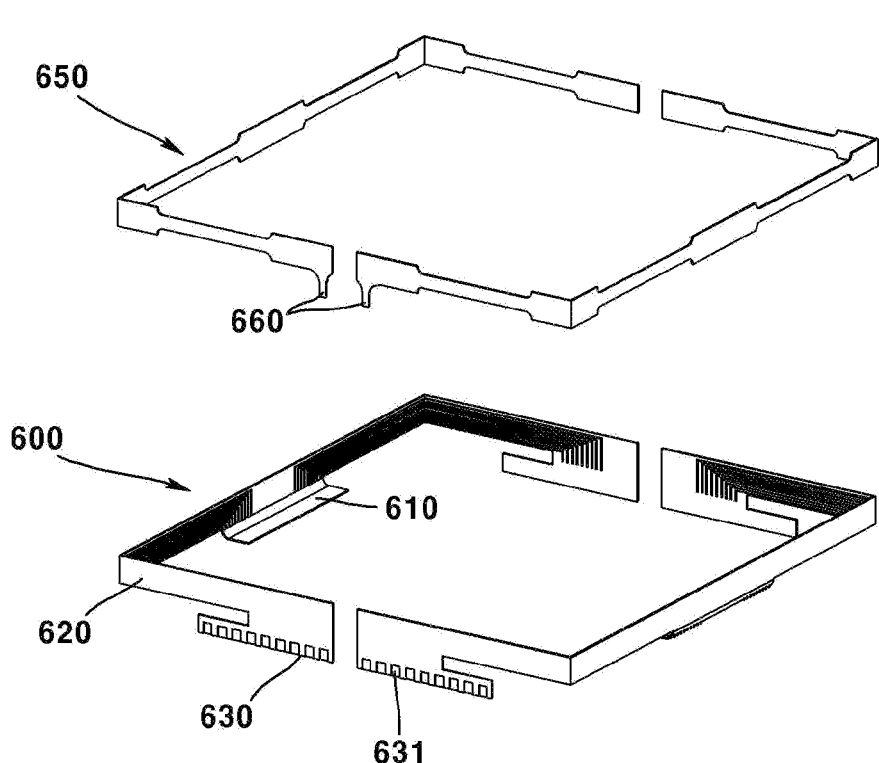
FIG. 21 is an exploded view of a connection substrate and a metal plate of a camera device according to a first exemplary embodiment of the present invention.
Figure 22:
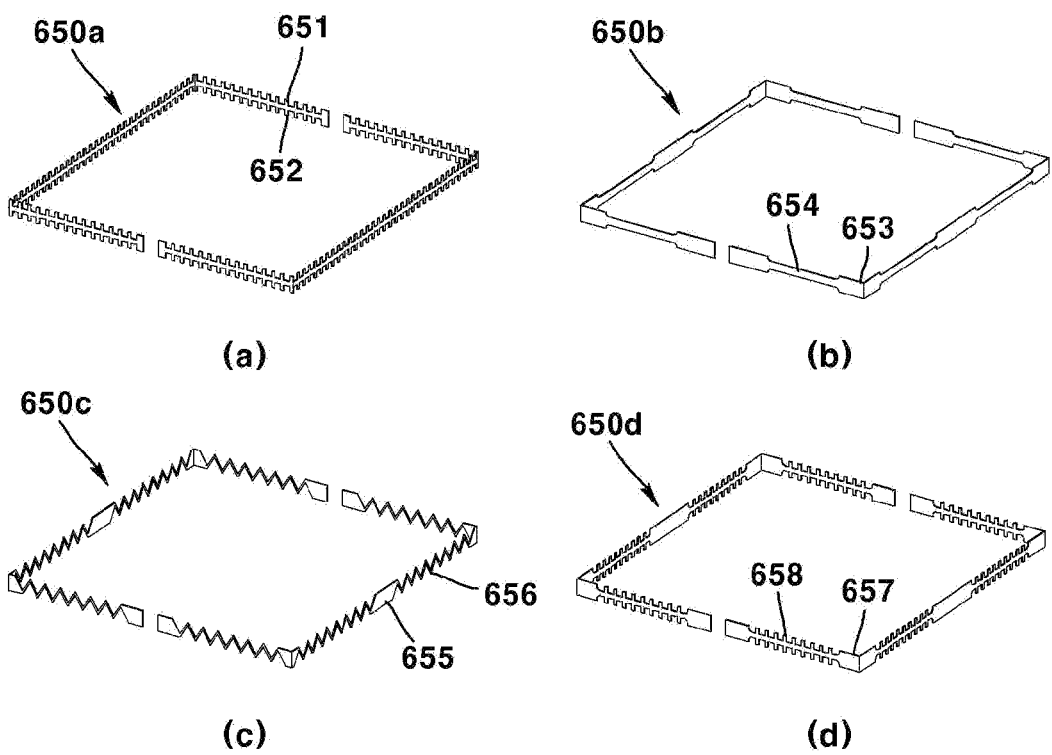
FIG. 22 is a diagram illustrating various embodiments of the metal plate of the camera device according to a first exemplary embodiment of the present invention.
Figure 23:
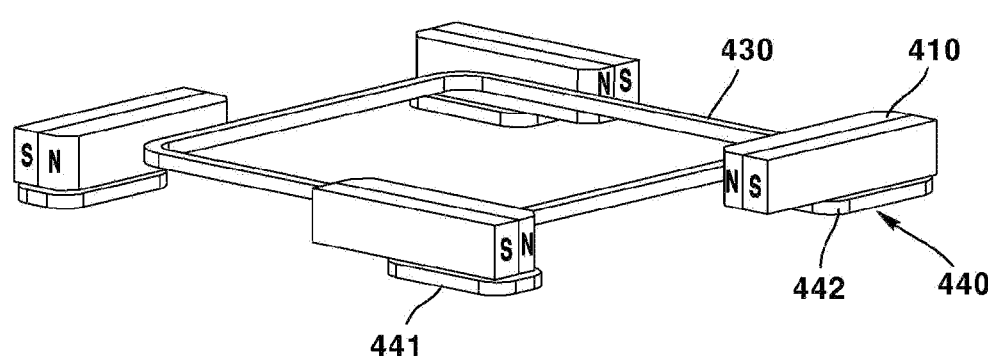
FIG. 23 is a perspective view of a magnet and coil of a camera device according to a first exemplary embodiment of the present invention.
Figure 24:
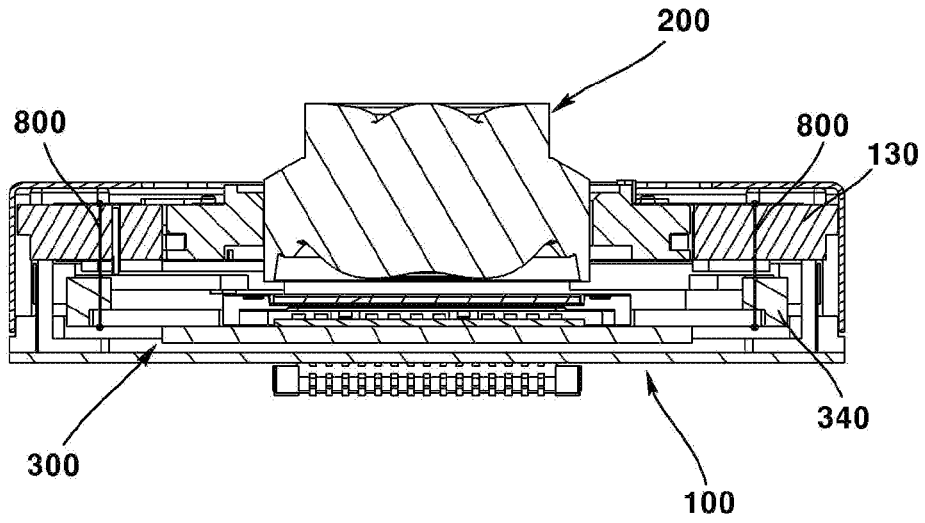
FIG. 24 is a cross-sectional view of a camera device according to a first exemplary embodiment of the present invention. The wires of the camera device according to the first exemplary embodiment of the present invention may be omitted in some drawings.

8 is an exploded view of a camera device according to a first exemplary embodiment of the present invention from a different direction than FIG. 7, FIG. 9 is an exploded view of the first movement part of the camera device according to a first exemplary embodiment of the present invention and related configurations, FIG. 10 is an exploded view of the second movement part and associated configuration of the camera device according to a first exemplary embodiment of the present invention, FIG. 11 is a perspective view of a camera device according to a first exemplary embodiment of the present invention with the cover member omitted, FIG. 12 is a perspective view illustrating a sensing structure and an energizing structure for AF feedback control of a camera device according to a first exemplary embodiment of the present invention, FIG. 13 is a perspective view of a partial configuration of a camera device according to a first exemplary embodiment of the present invention, FIG. 14 is a perspective view illustrating a second movement part, a connection substrate, and an elastic member of a camera device according to a first embodiment of the present invention, FIG. 15 is a perspective view of an elastic member of a camera device according to a first exemplary embodiment of the present invention, FIG. 16 is a cross-sectional perspective view illustrating a portion of an elastic member of a camera device according to a first exemplary embodiment of the present invention, FIG. 17 is a side view of a camera device according to a first embodiment of the present invention with the cover member omitted, FIG. 18 is a perspective view illustrating a second movement part, a fixed part, and a connection substrate of a camera device according to a first embodiment of the present invention, FIG. 19 is a perspective view illustrating a portion of a second movement part of a camera device according to a first exemplary embodiment of the present invention and a connection substrate, FIG. 20 (a) is a perspective view of a connection substrate and a metal plate of a camera device according to a first exemplary embodiment of the present invention, and FIG. 20 (b) is a cross-sectional view of a connection substrate and a metal plate of a camera device according to the first exemplary embodiment of the present invention, FIG. 21 is an exploded view of a connection substrate and a metal plate of a camera device according to a first exemplary embodiment of the present invention, FIG. 22 is a diagram illustrating various embodiments of the metal plate of the camera device according to a first exemplary embodiment of the present invention, FIG. 23 is a perspective view of a magnet and coil of a camera device according to a first exemplary embodiment of the present invention, and FIG. 24 is a cross-sectional view of a camera device according to a first exemplary embodiment of the present invention. The wires of the camera device according to the first exemplary embodiment of the present invention may be omitted in some drawings.

The camera device (10) may take at least one of an image and a video. The camera device (10) may be a camera. The camera device (10) may be a camera module. The camera device (10) may be a camera assembly. The camera device (10) may be a camera unit. The camera device (10) may comprise a lens driving device. The camera device (10) may comprise a sensor driving device. The camera device (10) may comprise a voice coil motor (VCM). The camera device (10) may comprise an autofocus assembly. The camera device (10) may comprise an image stabilization assembly. The camera device (10) may comprise an autofocus unit.

The camera device (10) may comprise a handshake correction device. The camera device (10) may comprise an actuator. The camera device (10) may comprise a lens-driven actuator. The camera device (10) may comprise a sensor-driven actuator. The camera device (10) may comprise an autofocus actuator. The camera device (10) may comprise a handshake correction (image stabilization) actuator.

The camera device (10) may comprise a fixed part (100). The fixed part (100) may be a relatively fixed portion of the movement parts (200, 300) as they move. The fixed part (100) may be a relatively fixed portion when at least one of the first movement part (200) and the second movement part (300) is moved. The fixed part (100) may accommodate the first movement part (200) and the second movement part (300). The fixed part (100) may be disposed on an outer side of the first movement part (200) and the second movement part (300).

Throughout the specification, the first substrate (110) has been described as a component of the fixed part (100), but the first substrate (110) may also be understood as a separate configuration from the fixed part (100). The fixed part (100) may be disposed on the first substrate (110). The fixed part (100) may be disposed on the first substrate (110). The fixed part (100) may be disposed on top of the first substrate (110).

The camera device (10) may comprise a first substrate (110). The fixed part (100) may comprise the first substrate (110). The first substrate (110) may be a main substrate (board). The first substrate (110) may be a substrate. The first substrate (110) may be a printed circuit board (PCB). The first substrate (110) may be connected to a power source of the optical instrument (1). The first substrate (110) may comprise a connector in connection with a power source of the optical instrument (1).

The camera device (10) may comprise a base (120). The fixed part (100) may comprise the base (120). The base (120) may be disposed on the first substrate (110). The base (120) may be disposed on the first substrate (110). The base (120) may be disposed on top of the first substrate (110). The base (120) may be secured to the first substrate (110). The base (120) may be coupled to the first substrate (110). The base 120 may be adhesively bonded to the first substrate (110). The base (120) may be disposed between the first substrate (110) and a housing (130).

The base (120) may comprise a protrusion (121). The protrusion (121) may be formed on a top surface of the base (120). The protrusion (121) may protrude upwardly from the base (120). The protrusion (121) may be coupled to an elastic member (500). The elastic member (500) may comprise a hole into which the protrusion (121) of the base (120) is inserted. The protrusion (121) of the base (120) may engage the holes in the elastic member (500). The protrusion (121) may comprise a plurality of protrusions. The protrusion (121) may comprise four protrusions. The four protrusions (121) may be disposed at four corner regions of the top surface of the base (120).

The camera device (10) may comprise a housing (130). The fixed part (100) may comprise the housing (130). The housing (130) may be disposed on the base (120). The housing (130) may be disposed on the base (120). The housing (130) may be disposed on top of the base (120). The housing (130) may be secured to the base (120). The housing (130) may be coupled to the base (120). The housing (130) may be adhesively bonded to the base (120). The housing (130) may be disposed on the first substrate (110). The housing (130) may be disposed on top of the first substrate (110). The housing (130) may be formed as a separate member from the base (120).

The camera device (10) may comprise a cover member (140). The fixed part (100) may comprise the cover member (140). The cover member (140) may be coupled to the base (120). The cover member (140) may be coupled to the housing (130). The cover member (140) may be coupled to the first substrate (110). The cover member (140) may be secured to the base (120). The cover member (140) may be secured to the housing (130). The cover member (140) may be secured to the first substrate (110). The cover member (140) may cover at least a portion of the base (120). The cover member (140) may cover at least a portion of the housing (130).

The cover member (140) may be a "cover can" or "shield can". The cover member (140) may be formed of a metal material. The cover member (140) may block electromagnetic interference (EMI). The cover member (140) may be electrically connected to the first substrate (110). The cover member (140) may be grounded to the first substrate (110).

The cover member (140) may comprise a top plate. The cover member (140) may comprise a hole formed in the top plate. The hole may be formed at a location corresponding to that of a lens (220). The cover member (140) may comprise a side plate. The side plate may comprise a plurality of side plates. The side plate may comprise four side plates. The side plate may comprise a first to fourth side plate. The side plate may comprise a first and second side plate disposed opposite each other, and a third and fourth side plate disposed opposite each other. The cover member (140) may comprise a plurality of corners between the plurality of side plates.

Throughout the specification, the cover member (140) has been described as a component of the fixed part (100), but the cover member (140) may be understood as a separate configuration from the fixed part (100). The cover member (140) may be coupled to the fixed part (100). The cover member (140) may cover the first movement part (200).

The camera device (10) may comprise a first movement part (200). The first movement part (200) may be movable relative to the fixed part (100). The first movement part (200) may move in an optical axis direction relative to the fixed part (100). The first movement part (200) may be disposed within the fixed part (100). The first movement part (200) may be movably disposed within the fixed part (100). The first movement part (200) may be movably disposed in the fixed part (100) in an optical axis direction. An autofocus (AF) function may be performed by moving the first movement part (200) in an optical axial direction with respect to the fixed part (100). The first movement part (200) may be disposed on the second movement part (300).

The camera device (10) may comprise a bobbin (210). The first movement part (200) may comprise the bobbin (210). The bobbin (210) may be disposed on the first substrate (110). The bobbin (210) may be disposed on top of the first substrate (110). The bobbin (210) may be spaced apart on the first substrate (110). The bobbin (210) may be disposed within the housing (130). The bobbin (210) may be disposed on an inner side of the housing (130). At least a portion of the bobbin (210) may be housed in the housing (130). The bobbin (210) may be movably disposed in the housing (130). The bobbin (210) may be movably disposed in the housing (130) in the optical axis direction. The bobbin (210) may be coupled to the lens (220). The bobbin (210) may comprise a hollow or hole. The lens (220) may be disposed in the hollow or hole of the bobbin (210). An inner circumferential surface of the bobbin (210) may be coupled to an outer circumferential surface of the lens (220).

The bobbin (210) may comprise a protrusion (211). The protrusion (211) may protrude from a top surface of the bobbin (210). The protrusion (211) may be a boss. The protrusion (211) may be formed as a rib. The protrusion (211) may be disposed adjacent to a connection part (713) of an upper elastic member (710). The protrusion (211) may comprise a curved surface. The protrusion (211) may comprise a curved surface having a curvature that corresponds to a curvature of an adjacent portion of the connection part (713) of the upper elastic member (710). A damper may be disposed on the protrusion (211). The damper may connect the bobbin (210) and the upper elastic member (710). The damper may be viscous.

The damper may be epoxy having viscosity. The damper may connect the bobbin (210) and the connection part (713) of upper elastic member (710). The damper may connect the protrusion (211) of bobbin (210) and the upper elastic member (710). The damper may connect the protrusion (211) of bobbin (210) and the connection part (713) of upper elastic member (710). The protrusion (211) may comprise a plurality of protrusions. The protrusion (211) may comprise four (4) protrusions.

The camera device (10) may comprise a lens (220). The first movement part (200) may comprise a lens (220). The lens (220) may be coupled to the bobbin (210). The lens (220) may be secured to the bobbin (210). The lens (220) may integrally move with the bobbin (210). The lens (220) may be screw-coupled to the bobbin (210). The lens (220) may be bonded to the bobbin (210) using an adhesive. The lens (220) may be disposed in a corresponding position to that of the image sensor (330). An optical axis of the lens (220) may match to that of the image sensor (330). The optical axis may be a z-axis. The lens (220) may comprise a plurality of lenses. The lens (220) may comprise five sheets or six sheets of lenses.

The camera device (10) may comprise a lens module. The lens module may be coupled to the bobbin (210). The lens module may comprise a barrel and one or more lenses (220) disposed within the barrel.

The camera device (10) may comprise a second movement part (300). The second movement part (300) may move relative to the fixed part (100). The second movement part (300) may move to a direction perpendicular to the optical axis direction based on the fixed part (100). The second movement part (300) may be disposed inside of the fixed part (100). The second movement part (300) may be movably disposed within the fixed part (100). The second movement part (300) may be movably disposed to a direction perpendicular to an optical axis direction within the fixed part (100), whereby the OIS function may be performed. The second movement part (300) may be interposed between the first movement part (200) and the first substrate (110).

The camera device (10) may comprise a second substrate (310). The second movement part (300) may comprise a second substrate (310). The second substrate (310) may be a substrate. The second substrate (310) may be a printed circuit board (PCB). The second substrate (310) may be interposed between the first movement part (200) and the first substrate (110). The second substrate (310) may be interposed between the bobbin (210) and the first substrate (110). The second substrate (310) may be interposed between the lens (220) and the first substrate (110). The second substrate (310) may be spaced apart from the fixed part (100). The second substrate (310) may be spaced apart from the fixed part (100) to a direction perpendicular to an optical axis direction. The second substrate (310) may move to a direction perpendicular to an optical axis direction. The second substrate (310) may be electrically connected with the image sensor (330). The second substrate (310) may integrally move with the image sensor (330). The second substrate (310) may comprise a hole. The hole of second substrate (310) may be disposed with an image sensor (330).

The second substrate (310) may comprise a terminal (311). The terminal (311) may be disposed at a bottom surface of second substrate (310). The terminal (311) may be coupled with a terminal (321) of sensor substrate (320). The second substrate (310) may be separately formed from the sensor substrate (320). The second substrate (310) may be coupled by being separately formed from the sensor substrate (320). The terminal (311) of second substrate (310) may be soldered to a terminal (321) of sensor substrate (320).

The camera device (10) may comprise a sensor substrate (320). The second movement part (300) may comprise the sensor substrate (320). The sensor substrate (320) may be a substrate. The sensor substrate (320) may be a printed circuit board (PCB). The sensor substrate (320) may be coupled with an image sensor (330). The sensor substrate (320) may be coupled to the second substrate (310).

The sensor substrate (320) may comprise a terminal (321). The terminal (321) of sensor substrate (320) may be coupled to a terminal (311) of second substrate (310). The sensor substrate (320) may be coupled to a bottom side of the second substrate (310). The sensor substrate (320) may be disposed underneath the second substrate (310). The sensor substrate (320) may be coupled to the underside of the second substrate (310) with the image sensor (330) coupled thereto.

The camera device (10) may comprise an image sensor (330). The second movement part (300) may comprise the image sensor (330). The image sensor (330) may be disposed on the sensor substrate (320). The image sensor (330) may be disposed between the sensor substrate (320) and a sensor base (350). The image sensor (330) may be electrically coupled to the second substrate (310).

The image sensor (330) may be integrally movable with the second substrate (310). The image sensor (330) may receive light that has passed through the lens (220) and a filter (360), and an image may be formed. The image sensor (330) may be electrically connected to the sensor substrate (320), the second substrate (310), and the first substrate (110). The image sensor (330) may comprise an active image area. The image sensor (330) may convert light irradiating the active image area into an electrical signal. The image sensor (330) may comprise one or more of a charge coupled device (CCD), a metal oxide semi-conductor (MOS), a CPD, and a CID.

The camera device (10) may comprise a holder (340). The second movement par (300) may comprise the holder (340). The holder (340) may be formed of an insulating material. The holder (340) may be disposed on the second substrate (310). The holder (340) may be disposed on the second substrate (310). The holder (340) may be disposed on top of the second substrate (310). The holder (340) may be secured to the second substrate (310). The holder (340) may be coupled to the second substrate (310). The holder (340) may comprise a hollow or hole in which the image sensor (330) is disposed. A second coil (440) may be disposed in the holder (340). The holder (340) may comprise a protrusion around which the second coil (440) is wound. The holder (340) may comprise a hole in which a Hall sensor (445) is disposed.

The camera device (10) may comprise a sensor base (350). The second movement part (300) may comprise the sensor base (350). The sensor base (350) may be disposed on the sensor substrate (320). The sensor base (350) may comprise a hole formed in a position corresponding to that of the image sensor (330). The sensor base (350) may comprise a recess in which the filter (360) is disposed.

The camera device (10) may comprise a filter (360). The second movement part (300) may comprise the filter (360). The filter (360) may be disposed between the lens (220) and the image sensor (330). The filter (360) may be disposed on the sensor base (350). The filter (360) may block certain frequency bands of light from entering the image sensor (330) from light that has passed through the lens (220). The filter (360) may comprise an infrared cutoff filter. The filter (360) may block infrared light from entering the image sensor (330).

The camera device (10) may comprise a drive part. The drive part may move the movement parts (200, 300) relative to the fixed part (100). The drive part may perform an autofocus (AF) function. The actuator may perform the image stabilization (OIS) function. The drive part may move the lens (220). The drive part may move the image sensor (330). The drive part may comprise magnets and coils. The drive part may comprise a shape memory alloy (SMA).

The camera device (10) may comprise a first drive part. The first drive part may be an AF drive portion. The first drive part may move the first movement part (200) in the optical axis direction. The first drive part may move the bobbin (210) in the optical axis direction. The first drive part may move the lens (220) in the optical axis direction. The first drive part may perform an autofocus (AF) function. The first drive part may move the first movement part (200) in an upward direction of the optical axis direction. The first drive part may move the first movement part (200) in the downward direction of the optical axis direction.

The camera device (10) may comprise a second drive part. The second drive part may be an OIS drive part. The second drive part may move the second movement part (300) in a direction perpendicular to the optical axis direction. The second drive part may move the second substrate (310) in a direction perpendicular to the optical axis direction. The second drive part may move the sensor substrate (320) in a direction perpendicular to the optical axis direction. The second drive part may move the image sensor (330) in a direction perpendicular to the optical axis direction. The second drive part may move the holder (340) in a direction perpendicular to the optical axis direction. The second drive part may move the sensor base (350) in a direction perpendicular to the optical axis direction. The second drive part may move the filter (360) in a direction perpendicular to the optical axis direction. The second drive part may perform an image stabilization (OIS) function.

The second drive part may move the second movement part (300) in a first direction perpendicular to the optical axis direction. The second drive part may move the second movement part (300) in a second direction perpendicular to the optical axis direction and the first direction. The second drive part may rotate the second movement part (300) about the optical axis.

In a first exemplary embodiment of the present invention, the first drive part may comprise a first coil (430). The second drive part may comprise a second coil (440). The first drive part and the second drive part may comprise a drive magnet (410) that is used in common to interact with the first coil (430) and the second coil (440). That is, the first drive part and the second drive part may comprise individually controlled coils and a common magnet.

The camera device (10) may comprise a drive magnet (410). The drive part may comprise the drive magnet (410). The drive magnet (410) may be a magnet. The drive magnet (410) may be a permanent magnet. The drive magnet (410) may be a common magnet. The drive magnet (410) may be used commonly to autofocus (AF) and image stabilization (OIS).

The drive magnet (410) may be disposed on the fixed part (100). The drive magnet (410) may be secured to the fixed part (100). The drive magnet (410) may be coupled to the fixed part (100). The drive magnet (410) may be bonded to the fixed part (100) with an adhesive. The drive magnet (410) may be disposed in the housing (130). The drive magnet (410) may be secured to the housing (130). The drive magnet (410) may be coupled to the housing (130). The drive magnet (410) may be bonded to the housing (130) with an adhesive. The drive magnet (410) may be disposed at a corner of the housing (130). The drive magnet (410) may be disposed biased toward a corner of the housing (130).

The drive magnet (410) may be a two-pole magnetized magnet comprising one N-pole region and one S-pole region. Each of the unit magnets of the drive magnet (410) may be N-pole on the inner surface and S-pole on the outer surface. Conversely, each of the unit magnets of the drive magnet (410) may have an S-pole inner surface and an N-pole outer surface. As a modification, the drive magnet (410) may be a four-pole magnetized magnet comprising two N-pole regions and two S-pole regions. The drive magnet (410) may comprise a plurality of magnets. The drive magnet (410) may comprise four magnets. The drive magnet (410) may comprise a first to fourth magnet. The first to fourth magnets may be disposed symmetrically about the optical axis. The first and fourth magnets may be formed of the same size and shape as each other.

In a modification, the drive magnet (410) may comprise a first magnet disposed in a position corresponding to that of the first coil (430) and a second magnet disposed in a position corresponding to that of the second coil (440). In this case, the first magnet and the second magnet may be disposed on the fixed part (100) and the first coil (430) and the second coil (440) may be disposed on the movement parts (200, 300). Alternatively, the first magnet and the second magnet may be disposed on the movement parts (200, 300) and the first coil (430) and the second coil (440) may be disposed on the fixed part (100).

The camera device (10) may comprise a first coil (430). The drive part may comprise the first coil (430). The first coil (430) may be disposed in the first movement part (200). The first coil (430) may be fixed to the first movement part (200). The first coil (430) may be coupled to the first movement part (200). The first coil (430) may be bonded to the first movement part (200) with an adhesive. The first coil (430) may be disposed on the bobbin (210). The first coil (430) may be secured to the bobbin (210). The first coil (430) may be coupled to the bobbin (210). The first coil (430) may be bonded to the bobbin (210) by an adhesive. The first coil (430) may be electrically connected to the driver IC (480). The first coil (430) may be electrically connected to a lower elastic member (720), a sensing substrate (470), and the driver IC (480). The first coil (430) may receive a current supply from the driver IC (480).

The first coil (430) may be disposed in a position corresponding to that of the drive magnet (410). The first coil (430) may be disposed on the bobbin (210) in a position corresponding to that of the drive magnet (410). The first coil (430) may face the drive magnet (410). The first coil (430) may comprise a surface facing the drive magnet (410). The first coil (430) may be disposed adjacent to the drive magnet (410). The first coil (430) may interact with the drive magnet (410). The first coil (430) may electromagnetically interact with the drive magnet (410).

The first coil (430) may move the first movement part (200) in an optical axis direction. The first coil (430) may move the bobbin (210) in an optical axis direction. The first coil (430) may move the lens (220) in the optical axis direction. The first coil (430) may move the first drive part (200) in an upward direction of the optical axis direction. The first coil (430) may move the bobbin (210) in the upward direction of the optical axis direction. The first coil (430) may move the lens (220) in an upward direction of the optical axis direction. The first coil (430) may move the first movement part (200) in a downward direction of the optical axis direction. The first coil (430) may move the bobbin (210) in a downward direction of the optical axis direction. The first coil (430) may move the lens (220) in a downward direction of the optical axis direction.

The camera device (10) may comprise a second coil (440). The drive part may comprise the second coil (440). The second coil (440) may be disposed on the second movement part (300). The second coil (440) may be secured to the second movement part (300). The second coil (440) may be coupled to the second movement part (300). The second coil (440) may be adhesively bonded to the second movement part (300). The second coil (440) may be disposed in the holder (340). The second coil (440) may be secured to the holder (340). The second coil (440) may be coupled to the holder (340). The second coil (440) may be bonded to the holder (340) by an adhesive. The second coil (440) may be disposed by being wound around a protrusion of the holder (340). The second coil (440) may be disposed on the holder (340). The second coil (440) may be electrically connected to the second substrate (310). Both ends of the second coil (440) may be soldered to the second substrate (310). The second coil (440) may be electrically connected to the driver IC (495). The second coil (440) may be electrically connected to the second substrate (310) and the driver IC (495). The second coil (440) may receive current from the driver IC (495).

The second coil (440) may be disposed in a position corresponding to that of the drive magnet (410). The second coil (440) may be disposed in the holder (340) in a position corresponding to that of the drive magnet (410). The second coil (440) may face the drive magnet (410). The second coil (440) may comprise a surface facing the drive magnet (410). The second coil (440) may be disposed adjacent to the drive magnet (410). The second coil (440) may interact with the drive magnet (410). The second coil (440) may electromagnetically interact with the drive magnet (410).

The second coil (440) may move the second movement part (300) in a direction perpendicular to the optical axis direction. The second coil (440) may move the second substrate (310) in a direction perpendicular to the optical axis direction. The second coil (440) may move the sensor substrate (320) in a direction perpendicular to the optical axis direction. The second coil (440P) may move the image sensor (330) in a direction perpendicular to the optical axis direction. The second coil (440) may move the holder (340) in a direction perpendicular to the optical axis direction. The second coil (440) may rotate the second movement part (300) about the optical axis. The second coil (440) may rotate the second substrate (310) about the optical axis. The second coil (440) can rotate the sensor substrate (320) about the optical axis. The second coil (440) may rotate the image sensor (330) about the optical axis. The second coil (440) may rotate the holder (340) about the optical axis.

The second coil (440) may comprise a plurality of coils. The second coil (440) may comprise four coils. The second coil (440) may comprise a coil for an x-axis shift. The second coil (440) may comprise a coil for y-axis shift.

The second coil (440) may comprise a second-1 coil (441). The second-1 coil (441) may be a first-sub coil. The second-1 coil (441) may be a coil for the x-axis shift. The second coil (441) may shift the second movement part (300) in the x-axis direction. The second-1 coil (441) may be elongated in the y-axis. The second-1 coil (441) may comprise a plurality of coils. The second coil (441) may comprise two coils. The two coils of the second coil (441) may be electrically connected to each other. The second coil (441) may comprise a connection coil connecting the two coils. In this case, the two coils of the second coil (441) may be applied a current together. Alternatively, the two coils of the second coil (441) may be electrically isolated from each other and may be energized separately.

The second coil (440) may comprise a second-2 coil (442). Second-2 coil (442) may be a second sub coil. The second-2 coil (442) may be a coil for the y-axis shift. The second-2 coil (442) may shift the second movement part (300) in the y-axis direction. The second-2 coil (442) may be elongated in the x-axis. The second-1 coil (441) may comprise a plurality of coils. The second-2 coil (442) may comprise two coils. The two coils of the second-2 coil (442) may be electrically connected to each other. The second-2 coil (442) may comprise a connection coil connecting the two coils. In this case, the two coils of the second-2 coil (442) may be applied current together. Alternatively, the two coils of the second-2 coil (442) may be electrically isolated from each other and may be applied current individually.

The camera device (10) may comprise a Hall sensor (445). The Hall sensor (445) may be disposed on the second substrate (310). The Hall sensor (445) may be disposed in a hole in the holder (340). The Hall sensor (445) may comprise a Hall IC. The Hall sensor (445) may sense the drive magnet (410). The Hall sensor (445) may detect a magnetic force of the drive magnet (410). The Hall sensor (445) may face the drive magnet (410). The Hall sensor (445) may be disposed at a location corresponding to that of the drive magnet (410). The hall sensor (445) may be disposed adjacent to the drive magnet (410). The hall sensor (445) may detect the position of the second movement part (300). The hall sensor (445) may detect movement of the second-ary movement part (300). The hall sensor (445) may be disposed in a hollow of the second coil (440). The sensed value detected by the Hall sensor 445 may be used to feedback the image stabilization drive. The Hall sensor (445) may be electrically connected to driver IC (495).

The Hall sensor (445) may comprise a plurality of Hall sensors. The Hall sensor (445) may comprise three Hall sensors. The Hall sensor (445) may comprise a first to a third Hall sensor. The first Hall sensor may detect a displacement of the second movement part (300) in the x-axis direction. The second Hall sensor may detect a displacement of the second movement part (300) in the y-axis direction. The third Hall sensor may detect a rotation of the second movement part (300) about the z-axis, either alone or in combination with one or more of the first and second hall sensors.

The camera device (10) may comprise a sensing magnet (450). The sensing magnet (450) may be disposed on the first movement part (200). The sensing magnet (450) may be fixed to the first movement part (200). The sensing magnet (450) may be coupled to the first movement part (200). The sensing magnet (450) may be bonded to the first movement part (200) with an adhesive. The sensing magnet (450) may be disposed on the bobbin (210). The sensing magnet (450) may be secured to the bobbin (210). The sensing magnet (450) may be coupled to the bobbin (210). The sensing magnet (450) may be bonded to the bobbin (210) with an adhesive. The sensing magnet (450) may be formed to a smaller size than the drive magnet (410). By doing so, the impact of the sensing magnet (450) on the drive magnet 410 may be minimized.

The sensing magnet (450) may be disposed opposite a calibration magnet (460). The sensing magnet (450) and the calibration magnet (460) may be disposed opposite each other on the first movement part (200). The sensing magnet (450) and the calibration magnet (460) may be disposed opposite each other on the bobbin (210).

The camera device (10) may comprise a calibration magnet (460). The calibration magnet (460) may be a compensation magnet. The compensation magnet (460) may be disposed in the first movement part (200). The compensation magnet (460) may be fixed to the first movement part (200). The calibration magnet (460) may be coupled to the first movement part (200). The calibration magnet (460) may be bonded to the first movement part (200) with an adhesive. The calibration magnet (460) may be disposed on the bobbin (210). The calibration magnet (460) may be secured to the bobbin (210). The calibration magnet (460) may be coupled to the bobbin (210). The calibration magnet (460) may be bonded to the bobbin (210) with an adhesive. The calibration magnet (460) may be formed to a smaller size than the drive magnet (410). By doing so, the impact of the calibration magnet (460) on the drive magnet (410) may be minimized. Additionally, the calibration magnet (460) may be disposed on the opposite side of the sensing magnet (450) to form a magnetic equilibrium with the sensing magnet (450). This may inhibit tilting that may be caused by the sensing magnet (450).

The camera device (10) may comprise a sensing substrate (470). The sensing substrate (470) may be a substrate. The sensing substrate (470) may be a printed circuit board (PCB). The sensing substrate (470) may be a flexible substrate. The sensing substrate (470) may be an FPCB. The sensing substrate (470) may be coupled to the first substrate (110). The sensing substrate (470) may be connected to the first substrate (110). The sensing substrate (470) may be electrically connected to the first substrate (110). The sensing substrate (470) may be soldered to the first substrate (110). The sensing substrate (470) may be disposed in the housing (130). The sensing substrate (470) may be secured to the housing (130). The sensing substrate (470) may be coupled to the housing (130). The housing (130) may comprise a groove or a hole shaped to correspond to the sensing substrate (470). The sensing substrate (470) may be disposed in the groove or hole in the housing (130).

The camera device (10) may comprise a driver IC (480). The driver IC (480) may be an AF driver IC. The driver IC (480) may be electrically connected to the first coil (430). The driver IC (480) may apply a current to the first coil (430) to perform AF driving. The driver IC (480) may apply a power to the first coil (430). The driver IC (480) may apply a current to the first coil (430). The driver IC (480) may apply a voltage to the first coil (430). The driver IC (480) may be disposed on the sensing substrate (470). The driver IC (480) may be disposed in a position corresponding to that of the sensing magnet (450). The driver IC (480) may be disposed facing the sensing magnet (450). The driver IC (480) may be disposed adjacent to the sensing magnet (450).

The driver IC (480) may comprise a sensor. The sensor may comprise a Hall IC. The sensor may be disposed in a position corresponding to that of the sensing magnet (450). The sensor may be disposed facing the sensing magnet (450). The sensors may be disposed adjacent to the sensing magnet (450). The sensor may detect the sensing magnet (450). The sensor may detect a magnetic force of the sensing magnet (450). The sensor may detect a position of the first movement part (200). The sensor may detect a movement of the first movement part (200). The sensed value detected by the sensor may be used for feedback to drive the autofocus.

The camera device (10) may comprise a gyro sensor (490). The gyro sensor (490) may be disposed on the first substrate (110). The gyro sensor (490) may detect a shake (shaking) of the camera device (10). The gyro sensor (490) may sense an angular velocity or a linear velocity caused by the shaking of the camera device (10). The gyro sensor (490) may be electrically coupled to the driver IC (495). The shaking of the camera device (10) detected by the gyro sensor (490) may be used to drive the image stabilization (OIS).

The camera device (10) may comprise a driver IC (495). The driver IC (495) may be an OIS driver IC. The driver IC (495) may be electrically coupled to the second coil (440). The driver IC (495) may apply a current to the second coil (440) to perform OIS driving. The driver IC (495) may apply a power to the second coil (440). The driver IC (495) may apply a current to the second coil (440). The driver IC (495) can apply a voltage to the second coil (440). The driver IC (495) may be disposed on the second substrate (310).

The camera device 10 may comprise an elastic member (500). The elastic member (500) may comprise a leaf spring. The elastic member (500 may comprise a spring. The elastic member (500) may be an OIS elastic member. The elastic member (500) may connect the fixed part (100) and the second movement part (300). The elastic member (500) may connect the base (120) and the second movement part (300). The elastic member (500) may connect the fixed part (100) and the holder (340). The elastic member (500) may connect the base (120) and the holder (340).

The elastic member (500) may not be electrically connected to the first substrate (110). The elastic member (500) may be spaced apart from the first substrate (110). The elastic member (500) may be separated from a metal plate (650) that is electrically connected to the first substrate (110). The elastic member (500) may be separated from a connection substrate (600) that is electrically connected to the first substrate (110). The elastic member (500) may be spaced apart from the metal plate (650). The elastic member (500) may be spaced apart from the connection substrate (600). The elastic member (500) may be spaced apart from a wire (800).

In the first exemplary embodiment of the present invention, the total spring constant K of the member elastically supporting the second movement part (300) to the fixed part (100) may be the sum of the spring constant of the coupling member of the connecting substrate (600) and the metal plate (650) and the spring constant of the elastic member (500). In this case, the coupling member of the connecting substrate (600) and the metal plate (650) may act as a composite member, which may make it difficult to manage the known frequency. In the first exemplary embodiment of the present invention, the elastic member (500) may be provided separately from the composite member.

The connection substrate (600) may be only a single layer of copper foil to increase sensitivity. In a first exemplary embodiment of the present invention, the total spring constant may be from 50 to 400 mN/mm. The spring constant of the elastic member (500) may be greater than the spring constant of the composite member. The spring constant of the elastic member (500) and the spring constant of the composite member may each be from 20 to 250 mN/mm.

The elastic member (500) may comprise an outer part (510) coupled to the fixed part (100), an inner part (520) coupled to the second movement part (300), and a connection portion (530) connecting the outer part (510) and the inner part (520). The connection portion (530) may extend in a direction perpendicular to the optical axis direction. The height of the connection portion (530) in the optical axis direction (see a in FIG. 16) may be 0.5 times to 5 times the width in the direction perpendicular to the optical axis direction (see b in FIG. 16). The spring constant in the direction perpendicular to the optical axis direction of the connection portion (530) may be less than the spring constant in the optical axis direction. This allows the movement of the connection portion (530) in the optical axis direction to be less than the movement in the direction perpendicular to the optical axis direction. That is, the elastic member (500) may guide the second movement part (300) to move in a direction perpendicular to the optical axis direction while limiting movement in the optical axis direction. The connection portion (530) may be formed of at least three strands. The elastic member (500) may comprise a structure that facilitates movement from side to side and requires more current to move in the z-direction. The elastic member (500) may comprise a structure that inhibits sagging of the mover up and down. One of the elastic member (500) and the elastic member (700) may be referred to as the first elastic member and the other as the second elastic member.

The camera device (10) may comprise a damper. The damper may be viscous. The damper may comprise a viscous epoxy. The damper may be disposed on the elastic member (500). The damper may be applied to the elastic member (500). The damper may be in contact with the elastic member (500). The damper may be connected to the elastic member (500). The damper may be disposed at the connection portion (530) of the elastic member (500). The damper may be applied to the connection portion (530) of the elastic member (500). The damper may be in contact with the connection portion (530) of the elastic member (500). The damper may be connected to the connection portion (530) of the elastic member (500). The damper may connect the outer part (510) of the elastic member (500) to the connection portion (530). In a modification, the damper may be connected to the inner part (520) of the elastic member (500) and the connection portion (530).

The camera device (10) may comprise a connection member. The connection member may be an interposer. The connection member may support the movement of the second movement part (300). The connection member may movably support the movement of the second movement part (300). The connection member may connect the second movement part (300) and the fixed part (100). The connection member may connect the first substrate (110) and the second substrate (310). The connection member may electrically connect the first substrate (110) and the second substrate (310). The connection member may connect the first substrate (110) and the second movement part (300). The connecting member may guide the movement of the second movement part (300). The connection member may guide the second movement part (300) to move in a direction perpendicular to the optical axis direction. The connection member may guide the second movement part (300) to rotate about the optical axis. The connection member may limit the movement of the second movement part (300) in the optical axis direction.

The connection member may comprise a connection substrate (600). The connection member may comprise an elastic member connecting the fixed part (100) and the second movement part (300). The connection member may comprise a leaf spring. The connection member may comprise a wire (800). The connection member may comprise a ball disposed between the fixed part (100) and the second movement part (300).

The camera device (10) may comprise a connection substrate (600). The connection substrate (600) may be a connection portion. The connection substrate (600) may be a connection member. The connection substrate (600) may be a flexible substrate. The connection substrate (600) may be a flexible substrate.

The connection substrate (600) may be a flexible printed circuit board. The connection substrate (600) may be a flexible printed circuit board (FPCB). The connection substrate (600) may be flexible in at least some portions. The second substrate (310) and the connection substrate (600) may be integrally formed.

The connection substrate (600) may support the second movement part (300). The connection substrate (600) may support movement of the second movement part (300). The connection substrate (600) may movably support the second movement part (300). The connection substrate (600) may connect the second movement part (300) to the fixed part (100).

The connection substrate (600) may connect the first substrate (110) and the second substrate (310). The connection substrate (600) can electrically connect the first substrate (110) and the second substrate (310). The connection substrate (600) may guide the movement of the second movement part (300). The connection substrate (600) may guide the second movement part (300) to move in a direction perpendicular to the optical axis direction. The connection substrate (600) may guide the second movement part (300) to rotate about the optical axis. The connection substrate (600) may limit the movement of the second movement part (300) in the optical axis direction. A portion of the connection substrate (600) may be coupled to the base (120).

The connection substrate (600) may comprise two connection substrates (600) spaced apart from each other and formed symmetrically. The two connection substrate (600) may be disposed on either side of the second substrate (310). The connection substrate (600) may be formed to connect the first substrate (110) and the second substrate (310) by bending a total of six times.

The connection substrate (600) may comprise a first region that is connected to the second substrate (310) and is bent in an optical axis direction. The first region may be connected to the second substrate (310) and may be bent in an optical axis direction. The first region may be connected to the second substrate (310) and extend in the optical axis direction. The first region may be connected to the second substrate (310) and extend in a bend in the optical axis direction. The connection substrate (600) may comprise a second region extending from the first region. The connection substrate (600) may comprise a third region extending from the second region in a direction perpendicular to the optical axis. The third region may be bent in an optical axis direction and a perpendicular direction from the second region. The third region may extend from the second region in a direction perpendicular to an optical axis direction. The third region may bend from the second region in a direction perpendicular to an optical axis direction.

The connection substrate (600) may comprise a connection portion (610) comprising a first region. The connection substrate (600) may comprise an extension portion (620) comprising a second region and a third region. The connection substrate (600) may comprise a connection portion (610) that connects to the second substrate (310). The connection substrate (600) may comprise an extension portion (620) extending from the connection portion (610). The connection substrate (600) may comprise a terminal portion (630) that is connected to the extension portion (620) and comprises terminals.

The connection substrate (600) may comprise a connection portion (610). The connection portion (610) may be connected to the second movement part (300). The connection portion (610) may be coupled to the second movement part (300). The connection portion (610) may be secured to the second movement part (300). The connection portion (610) may be connected to the second substrate (310). The connection portion (610) may be coupled to the second substrate (310). The connection portion (610) may be secured to the second substrate (310). The connection portion (610) may comprise a bending region that is bent in the optical axis direction. The connection portion (610) may comprise a first region that is bent in an optical axis direction with respect to the second substrate (310) and a second region that extends from the first region and is bent in a direction perpendicular to the optical axis direction.

The connection substrate (600) may comprise an extension portion (620). The extension portion (620) may connect the connection portion (610) and the terminal portion (630). The extension portion (620) may extend from the connection portion (610). The extension portion (620) may comprise bending regions that bend in a direction perpendicular to an optical axis direction. The bending angle of the extension portion (620) may be 80 to 100 degrees. The bending angle of the extension portion (620) may be 85 to 95 degrees. Any one of the bending region of the connection portion (610) and the bending region of the extension portion (620) may be referred to as the first bending region and the other as the second bending region.

The connection substrate (600) may comprise a terminal portion (630). The terminal portion (630) may be coupled to the fixed part (100). The terminal portion (630) may be secured to the fixed part (100). The terminal portion (630) may be connected to the extension portion (620). The terminal portion (630) may be coupled to the first substrate (110). The terminal portion (630) may be connected to the first substrate (110). The terminal portion (630) may be soldered to the first substrate (110). The terminal portion (630) may be secured to the first substrate (110). The terminal portion (630) may be coupled to the base (120). The terminal portion (630) may be secured to the base (120). The terminal portion (630) may comprise a terminal (631) that is coupled with the first substrate (110). The terminal portion (630) may comprise terminal (631). The terminal (631) may be coupled to the first substrate (110).

The camera device (10) in the first exemplary embodiment of the present invention may comprise a flexible substrate. The flexible substrate may connect the fixed part (100) and the second movement part (300). The flexible substrate may comprise a connection portion (610) connecting with the second movement part (300), an extension portion (620) extending from the connection portion (610), and a terminal portion (630) connecting with the extension portion (620) and comprising a terminal.

The connection substrate (600) in a first exemplary embodiment of the present invention may comprise a first portion coupled to the first substrate (110), a second portion coupled to the second substrate (310), and a third portion connecting the first and second portions. The third portion may be disposed at least partially parallel to the optical axis. The third portion may be formed such that its length along the optical axis is longer than its thickness. The second portion of the connection substrate (600) may be disposed parallel to the second substrate (310) in at least some portions. A third portion of the connection substrate (600) may be disposed perpendicular to the second portion in at least some portions. The third portion of the connection substrate (600) may be rounded at portions corresponding to corners of the second substrate (310). The second substrate (310) may comprise a first side and a second side disposed opposite each other, and a third side and a fourth side disposed opposite each other. A second portion of the connection substrate (600) may be coupled to the first and second sides of the second substrate (310). The first portion of the connection substrate (600) may be coupled to portions of the first substrate (110) that correspond to the third and fourth sides of the second substrate (310).

The camera device (10) may comprise a metal plate (650). The connection member may comprise the metal plate (650). The connection substrate (600) may comprise the metal plate (650). However, the metal plate (650) may also be understood as a separate configuration from the connection substrate (600). The metal plate (650) may be a metal member. The metal plate (650) may be a metal portion. The metal plate (650) may be a metal layer. The metal plate (650) may be a metallic film. The metal plate (650) may be formed of metal. The metal plate (650) may be formed of an alloy. The metal plate (650) may be formed of a copper alloy. The metal plate (650) may be formed of a conductive material. The metal plate (650) may be distinct from a conductive (energized) layer (602) of the connection substrate (600). The metal plate (650) may be formed of a different material than the energized layer (602) of the connection substrate (600). The metal plate (650) may be disposed on the connection substrate (600). The metal plate (650) may be bonded to the connection substrate (600). The metal plate (650) may be secured to the connection substrate (600). The metal plate (650) may be integrally formed with the connection substrate (600). The metal plate (650) may be elastic.

In the optical axis direction, in at least some portions, the length of the metal plate (650) may be the same as the length of the extension portion (620). The metal plate (650) may extend the same length in the optical axis direction as the extension portion (620). The thickness of the metal plate (650) may be the same as the thickness of the connection substrate (600). The thickness of the metal plate (650) may be thicker than the thickness of the connection substrate (600). The thickness of the energized layer (602) may be from 7 to 50 um. The thickness of the metal plate (650) may be 20 to 150 um. The metal plate (650) may be used in connection with the ground (GND) for impedance matching and noise suppression.

At least a portion of the metal plate (650) may be disposed on an extension portion (620) of the connection substrate (600). The extension portion (620) may comprise a bending region that bends in a direction perpendicular to an optical axis direction. At this time, the metal plate (650) may be disposed in the bending region. The metal plate (650) may be disposed on an inner surface of the extension portion (620). The metal plate (650) may be disposed on an outer surface of the extension (620).

The metal plate (650) may be formed of a conductive material. The metal plate (650) may be electrically connected to the second substrate (310). The metal plate (650) may be electrically connected to the image sensor (330). The metal plate (650) may be electrically connected to the driver IC (495). The metal plate (650) may be connected to a terminal (631) of the connection substrate (600). The metal plate (650) may be electrically connected to the terminal (631) of the connection substrate (600). The metal plate (650) may be in direct contact with the terminal (631) of the connection substrate (600). The metal plate (650) may be coupled to the terminal (631) of the connection substrate (600) by a conductive member. The metal plate (650) may be used as a ground (GND). The metal plate (650) may be connected to a ground terminal of the connection substrate (600). The metal plate (650) may be electrically connected to the first substrate (110). In this case, the number of power connection patterns on the connector board (600) may be reduced.

The metal plate (650) may comprise a body portion disposed on the extension portion (620), and a protrusion (660) extending from the body portion down to the terminal (631) of the connection substrate (600). The protrusion (660) may be a protruder. The protrusion (660) may be connected to the terminal (631) of the connection substrate (600). The protrusion (660) may be electrically connected to the terminal (631) of the connection substrate (600). The protrusion 660 may be coupled to the terminal (631) of the connection substrate (600). The protrusion (660) may be coupled to the terminal (631) of the connection substrate (600) by a conductive member. The protrusion (660) may be secured to the terminal (631) of the connection substrate (600). The protrusion (660) may be in direct contact with the terminal (631) of the connection substrate (600). The protrusion (660) may be connected to a ground terminal of the connection substrate (600).

As shown in (b) of FIG. 20, the connection substrate (600) may comprise two insulating layers 601 and an energized layer (602) disposed between the two insulating layers (601). The metal plate (650) may comprise a different material than the energized layer (602). The energized layer (602) may be a conductive layer. The conductive layer (602) may be formed of copper. The metal plate (650) may be formed of a copper alloy. The metal plate (650) may comprise one or more of an alloy of copper and titanium and an alloy of copper and nickel. The thickness of the metal plate (650) may be thicker than the thickness of the energized layer (602). The thickness of the energized layer (602) may correspond to a distance between the two insulating layers (601). In a first exemplary embodiment of the present invention, the connection substrate (600) may be formed with only two insulating layers (601) and an energized layer (602) disposed between the two insulating layers (601). The insulating layer (601) may be formed of polyimide (Pi).

As shown in (a) of FIG. 22, the metal plate (650a) may comprise a plurality of first grooves (375) recessed from the top, and a plurality of second grooves (375) recessed from the bottom. The plurality of first grooves (375) and the plurality of second grooves (375) may each be disposed at positions corresponding to each other in the optical axis direction. The width of each individual groove of the first groove (375) and the second groove (375) may be less than a length in the optical axis direction of the metal plate (650a).

As shown in (b) of FIG. 22, the metal plate (650b) may comprise a first portion (653) and a second portion (654) formed to be shorter than the first portion (653) in the optical axis direction. At least a portion of the second portion (654) of the metal plate (650) may be disposed in a bending region of the extension portion (620) of the connection substrate (600).

As shown in (c) of FIG. 22, the metal plate (650c) may extend in a zigzag manner in an optical axis direction with a width shorter than a length in the optical axis direction of the extension portion (620). The metal plate (650c) may extend in a direction inclined to the optical axis and in a direction perpendicular to the optical axis. The metal plate (650c) may comprise a first portion (655) and a second portion (656) extending in a zigzag shape from the first portion (655).

As shown in (d) of FIG. 22, the metal plate (650d) may comprise a plurality of first grooves recessed from the top, and a plurality of second grooves recessed from the bottom. The plurality of first grooves and the plurality of second grooves may each be disposed at positions corresponding to each other in the optical axis direction. The width of each of the individual grooves of the first groove and the second groove may be less than the length in the optical axis direction of the metal plate (650d). The metal plate (650d) may comprise a first portion (657) and a second portion (658) connecting the first portion (657) and comprising the first and second grooves. The first portion (657) of the metal plate (650d) may be disposed at a bending region of the extension portion (620).

The camera device (10) may comprise an insulating layer. The connection member may comprise an insulating layer. The connection substrate (600) may comprise an insulating layer. The insulating layer may cover the metal plate (650). The insulating layer may be disposed on an outer surface of the metal plate (650). The metal plate (650) may be disposed between the insulating layers. The insulating layer may comprise an insulating material. The insulating layer may be formed of polyimide (Pi). The insulating layer may protect the metal plate (650).

The camera device (10) may comprise an elastic member (700). The elastic member (700) may be an AF elastic member. The elastic member (700) may be a support member. The elastic member (700) may connect the fixed part (100) and the first movement part (200). The elastic member (700) may elastically connect the fixed part (100) and the first movement part (200). The elastic member (700) may connect the bobbin (210) and the housing (130). The elastic member (700) may elastically connect the bobbin (210) and the housing (130). The elastic member (700) may moveably support the first movement part (200) relative to the fixed part (100). The elastic member (700) may deform upon movement of the first movement part (200). The elastic member (700) may return the first movement part (200) to an initial position via an elastic (resilient) force when the movement of the first movement part (200) ends. The elastic member (700) may comprise a leaf spring. The elastic member (700) may comprise a spring. The elastic member (700) may be elastic in at least a portion. The elastic member (700) may provide a restoring (resilient) force to the first movable portion.

The elastic member (700) may comprise an outer part coupled to the fixed part (100), an inner part coupled to the first movement part (200), and a connection portion connecting the outer and inner parts. A spring constant in the optical axis direction of the connection portion may be less than a spring constant in a direction perpendicular to the optical axis direction. This allows the elastic member (700) to have a movement in the optical axis direction that is greater than the movement in the direction perpendicular to the optical axis direction. In other words, the elastic member (700) can guide the first movement part (200) to move in the optical axis direction relative to the fixed part (100).

The camera device (10) may comprise an upper elastic member (710). The elastic member (700) may comprise the upper elastic member (710). The upper elastic member (710) may be disposed on top of a lower elastic member (720). The upper elastic member (710) may comprise an inner part (712) that engages the bobbin (210). The inner part (712) of the upper elastic member (710) may be coupled to an upper portion of the bobbin (210). The inner part (712) of the upper elastic member (710) may be disposed on a top surface of the bobbin (210). The upper elastic member (710) may comprise an outer part (711) that is coupled to the housing (130). The outer part (711) of the upper elastic member (710) may be coupled to a lower portion of the housing (130). The outer part (711) of the upper elastic member (710) may be disposed on a bottom side of the housing (130). The upper elastic member (710) may comprise a connection portion (713) connecting the inner part (712) and the outer part (711). The connection (713) may be elastic.

The camera device (10) may comprise a lower elastic member (720). The elastic member (700) may comprise the lower elastic member (720). The lower elastic member (720) may be disposed below the upper elastic member (710). The lower elastic member (720) may comprise an inner part that engages the bobbin (210). The inner part of the lower elastic member (720) may be coupled to a lower portion of the bobbin (210). The inner part of the lower elastic member (720) may be disposed on a bottom side of the bobbin (210). The lower elastic member (720) may comprise an outer part that is coupled to the housing (130). An outer part of the lower elastic member (720) may be coupled to an upper portion of the housing (130). An outer part of the lower elastic member (720) may be disposed on a top surface of the housing (130). The lower elastic member (720) may comprise a connection portion connecting the inner and outer parts. The connection portion may be elastic (resilient). The lower elastic member (720) may comprise a terminal portion (721). The terminal portion (721) may extend from the outer part. The terminal portion (721) may be electrically connected to the sensing substrate (470). The terminal portion (721) may be coupled to a terminal on the sensing board (470) via a conductive member.

The lower elastic member (720) may comprise a plurality of lower elastic units. The lower elastic member (720) may comprise first and second lower elastic units (720-1, 720-2). The lower elastic member (720) may comprise two lower elastic units (720-1, 720-2). The two lower elastic units (720-1, 720-2) may be spaced apart from each other to electrically connect the sensing substrate (470) and the first coil (430).

The camera device (10) may comprise a wire (800). The wire (800) may be a wire spring. The wire (800) may be an elastic member. The wire (800) may be a leaf spring, as a modification. The wire (800) may connect the fixed part (100) and the second movement part (300). The wire (800) may be elastically connected to the fixed part (100) and the second movement part (300). The wire (800) may connect the housing (130) and the second substrate (310). The wire (800) may resiliently connect the housing (130) and the second substrate (310). The wire (800) may moveably support the second movement part (300). The wire (800) may support the second movement part (300) to move or rotate in a direction perpendicular to the optical axis direction. The wire (800) may comprise four wires disposed at corner regions of the housing (130).

An interposer that simultaneously serves as an electrical connection for connecting the image sensor (330) and driver IC (495) signals of the Sensor Shift OIS to the main PCB, the first substrate (110), and a mechanical role, such as shock reliability, may be essential. The first exemplary embodiment of the present invention may comprise an interposer that can achieve the same characteristics. The interposer may be a connecting member. The interposer may comprise a connection substrate (600) and a metal plate (650). The sensing substrate (470) may be electrically connected to the connection substrate (600). The connection substrate (600) may be an interposer PCB.

The metal plate (650) may be formed of a copper material. The metal plate (650) may be formed from a copper (Cu) and titanium (Ti) alloy. The metal plate (650) may be a spring. The metal plate (650) may be an elastic member. The metal plate (650) may be elastic. The spring may be used as ground (GND) reinforcement. The GND connection through the metal plate (650) according to the first exemplary embodiment of the present invention may also facilitate impedance matching, even if the increased size of the image sensor (330) requires a higher allowable current. The spring shape can be varied in other ways besides FIG. 22 to reduce the spring constant (Spring K). The spring constant may be at least one order of magnitude higher in the rotational direction than in the X, Y direction, and at least 50 orders of magnitude higher in the Z direction. The metal plate (650) may be omitted. However, in this case, the target value of the spring constant may be set to be the same. The interposer may be easy to move in the X, Y direction and difficult to move in the Z direction. By applying the connection substrate (600) and the metal plate (650), the bending area may be easily managed and tolerance controlled. The spring constant (Spring K) may be increased relative to the connection substrate (600) alone, to reduce the influence of the connection substrate (600) relative to the influence of the spring. To facilitate tuning, the first resonant frequency of the OIS may be within 40 to 150 [Hz] and the resonant frequency for the rotational direction may be higher than the first resonant frequency.

The weight of the second movement part (300), comprising the image sensor (330) and the second substrate (310), may be 2 grams or less, and the spring constant (K) value may be 100 N/m or more. The first resonant frequency and the third resonant frequency may be managed to be above 100 Hz to facilitate tuning. The interposer substrate may be a second substrate (310). A center of the interposer substrate may be formed with a hole.

Driver ICs and Hall elements are disposed on the second substrate (310), and the rigid portion of the second substrate (310) and the FPCB portion of the connection substrate (600) may be electrically connected in two or more portions. In this case, the connection may be at two to four locations. The FPCB may be bended twice. The bended portions of the connection substrate (600) may have wider springs or GNDs than other locations because the driving displacement is not large and the shape must be maintained. The bending angle of the connection substrate (600) may be 80 to 100 degrees. A first exemplary embodiment of the present invention may comprise an actuator that utilizes the connection substrate (600) of the sensor shift to connect circuit signals to the main PCB.

In a first exemplary embodiment of the invention, a spring may be added to a portion of the interposer. The interposer may be electrically connected to a ground (GND). The first resonant frequency may be within 40 to 150 Hz. The rotation mode may be located between the first resonant frequency and the tilt mode, and the rotation frequency may be at least one order of magnitude greater than the first resonant frequency. The spacing between the first resonant frequency and the third resonant frequency may be 100 Hz or more. The spring constants K in the X, Y and Z directions of the connection member, which is a combination of the connection substrate (600) and the metal plate (650), may be 50 times higher than K in the Z direction.

In a first exemplary embodiment of the present invention, the first resonance point may be located within 60 to 80 Hz, the second resonance point may be located within 150 to 170 Hz, and the third resonance point may be located within 290 to 310 Hz. The gain value may be higher at the first resonance point than at the second resonance point, and higher at the second resonance point than at the third resonance point. For reference, the point at which the output voltage is maximized over the input voltage when the voltage forming the x-axis force is applied as a sine wave may be the first resonance point. The point where rotation occurs may be the secondary resonance point. The point where tilt occurs may be the third resonance point. The waveform at the resonance point measurement may be a sine wave. The frequency may be between 5 Hz and 10 KHz. The sweep may be 300 steps/sweep. The source can be 0 Vdc, 100 mV p-p. The lens can weigh 0.097 grams.

Hereinafter, operation of the camera device according to the first exemplary embodiment of the present invention will be described with reference to the drawings.

Figure 25:
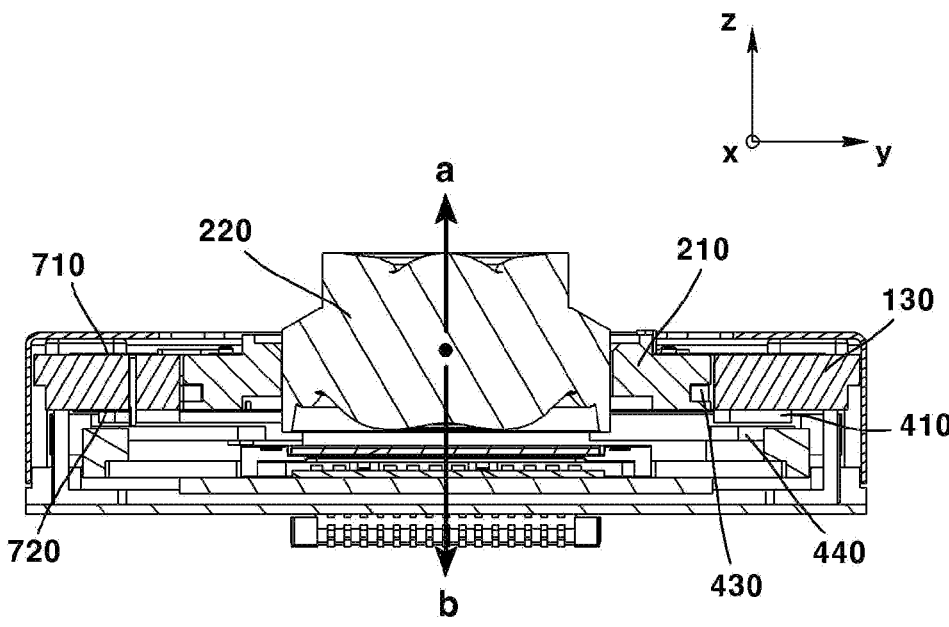
FIG. 25 is a diagram to illustrate the operation of the autofocus function of a camera device according to a first exemplary embodiment of the present invention.

FIG. 25 is a drawing to illustrate operation of an autofocus function of a camera device according to a first exemplary embodiment of the present invention.

When power is applied to the first coil (430) of the camera device (10) according to the first exemplary embodiment of the present invention, an electromagnetic field is formed in the first coil (430) such that the first coil (430) may move in the optical axis direction (z-axis direction) through electromagnetic interaction with the drive magnet (410). At this time, the first coil (430) may move in the optical axis direction along with the first movement part (200) comprising the lens (220). In this case, the lens (220) may be moved away from or closer to the image sensor (330) so that the focus of the subject may be adjusted. One or more of a current and a voltage may be applied to energize the first coil (430).

When a current in the first direction is applied to the first coil (430) of the camera device (10) according to the first exemplary embodiment of the present invention, the first coil (430) may move in the upward direction of the optical axis direction (see a in FIG. 25) through electromagnetic interaction with the drive magnet (410). At this time, the first coil (430) may move the lens (220) in the upward direction of the optical axis direction to move away from the image sensor (330).

When a current in a second direction opposite to the first direction is applied to the first coil (430) of the camera device (10) according to the first exemplary embodiment of the present invention, the first coil (430) may be moved in the lower direction of the optical axis direction (see b in FIG. 25) through electromagnetic interaction with the drive magnet (410). At this time, the first coil (430) may move the lens (220) in the lower direction of the optical axis direction to be closer to the image sensor (330).

Figure 26:
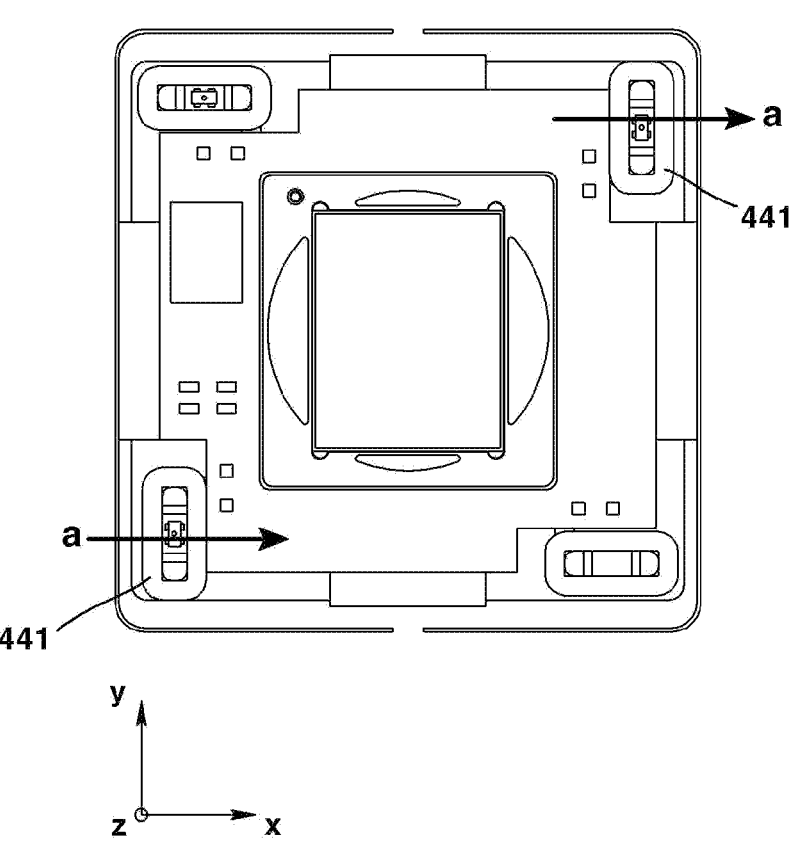
FIGS. 26 to 28 are drawings to illustrate the operation of an image stabilization function of a camera device according to a first exemplary embodiment of the present invention. More specifically.
Figure 27:
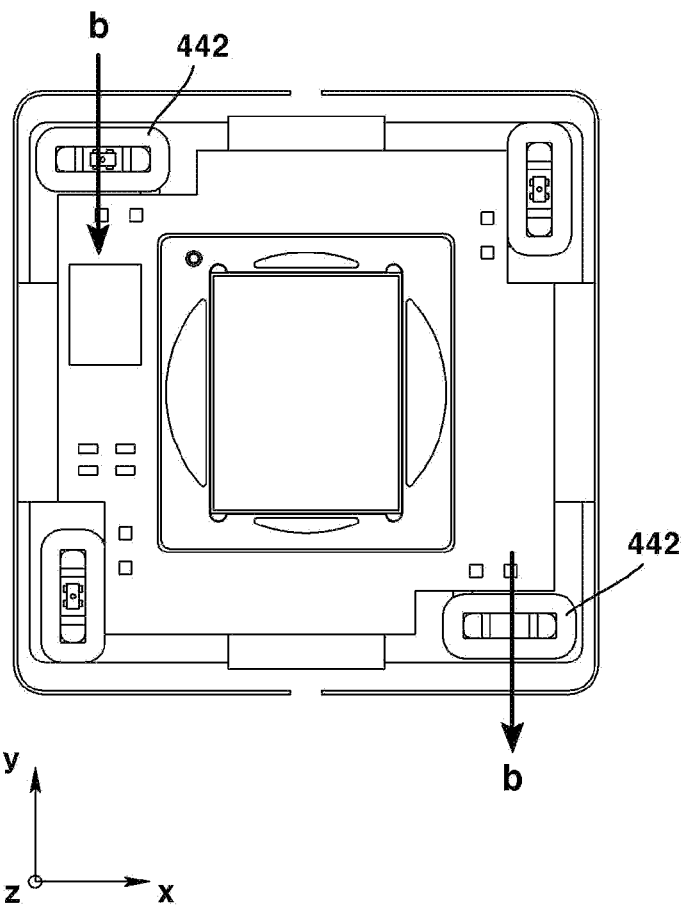
Figure 28:
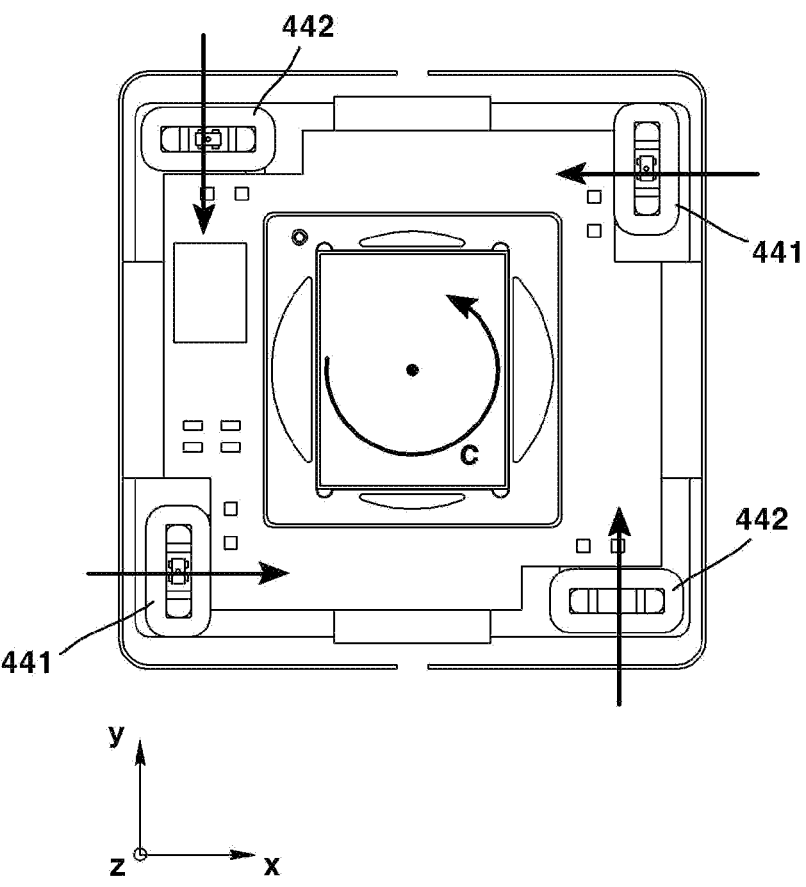

FIGS. 26 through 28 are drawings to illustrate operation of an image stabilization function of a camera device according to a first exemplary embodiment of the present invention. When power is applied to the second coil (440) of the camera device (10) according to the first exemplary embodiment of the present invention, an electromagnetic field is formed in the second coil (440) such that the second coil (440) may move in a direction perpendicular to the optical axis direction through electromagnetic interaction with the drive magnet (410). In addition, the second coil (440) may be rotated about the optical axis through electromagnetic interaction with the driving magnet (410). In this case, the second coil (440) may move or rotate with the second movement par (300), which comprises the image sensor (330). In a first exemplary embodiment of the present invention, the second coil (440) may move the image sensor (330) to compensate for a shake of the camera device (10) detected by the gyro sensor (490).

FIG. 26 is a drawing to illustrate a drive in which the image sensor of the camera apparatus according to the first embodiment of the present invention is shifted along the x-axis. When a current in a first direction is applied to the second-1 coil (441) of the camera device (10) according to the first exemplary embodiment of the present invention, the second-1 coil (441) may be moved in one of the first directions (x-axis direction) perpendicular to the optical axis direction (see a in FIG. 26) through electromagnetic interaction with the drive magnet (410). At this time, the second-1 coil (441) may move the image sensor (330) in one of the first directions perpendicular to the optical axis direction. Conversely, when current is applied to the second coil (441) in a second direction opposite to the first direction, the second coil (441) may move in the other direction of the first direction perpendicular to the optical axis (x-axis direction) through electromagnetic interaction with the drive magnet (410.) At this time, the second-1 coil (441) may move the image sensor (330) in the other of the first directions perpendicular to the optical axis direction.

FIG. 27 is a drawing to illustrate a drive in which image sensor of the camera apparatus according to the first embodiment of the present invention is shifted along the y-axis.

When a current in the first direction is applied to the second-2 coil (442) of the camera device 10 according to first exemplary embodiment of the present invention, the second-2 coil (442) may be moved in one of the second directions (y-axis direction) perpendicular to the optical axis direction (see b in FIG. 27) through electromagnetic interaction with the drive magnet (410). In this case, the second coil (442) may move the image sensor (330) in one of the second directions perpendicular to the optical axis direction. Conversely, when current is applied to the second coil (442) in a second direction opposite to the first direction, the second coil 442 may move in the other of the second directions perpendicular to the optical axis direction (y-axis direction) through electromagnetic interaction with the drive magnet (410). At this time, the second coil (442) may move the image sensor (330) in the other of the second directions perpendicular to the optical axis direction.

FIG. 28 is a drawing to illustrate a drive for rolling an image sensor of a camera device about a z-axis, according to a first exemplary embodiment of the present invention.

When a current in the first direction is applied to the second-1 coil (441) and the second-2 coil (442) of the camera device (10) according to the first exemplary embodiment of the present invention, the second-1 coil (441) and the second-2 coil (442) may be rotated unidirectionally about the optical axis through electromagnetic interaction with the drive magnet (410) (see c in FIG. 28). At this time, the second-1 coil (441) and the second-2 coil (442) may rotate the image sensor (330) in a unidirectional direction about the optical axis. In this case, the unidirectional direction may be counterclockwise. Conversely, when current is applied to the second-1 coil (441) and the second-2 coil (442) in a second direction that is opposite to the first direction, the second-1 coil (441) and the second-2 coil (442) can rotate in the other direction about the optical axis through electromagnetic interaction with the drive magnet (410). At this time, the second-1 coil (441) and the second-2 coil (442) may rotate the image sensor (330) in a different direction about the optical axis. In this case, the other direction may be clockwise.

Hereinafter, an optical instrument according to a first exemplary embodiment of the present invention will be described with reference to the drawings.

Figure 29:
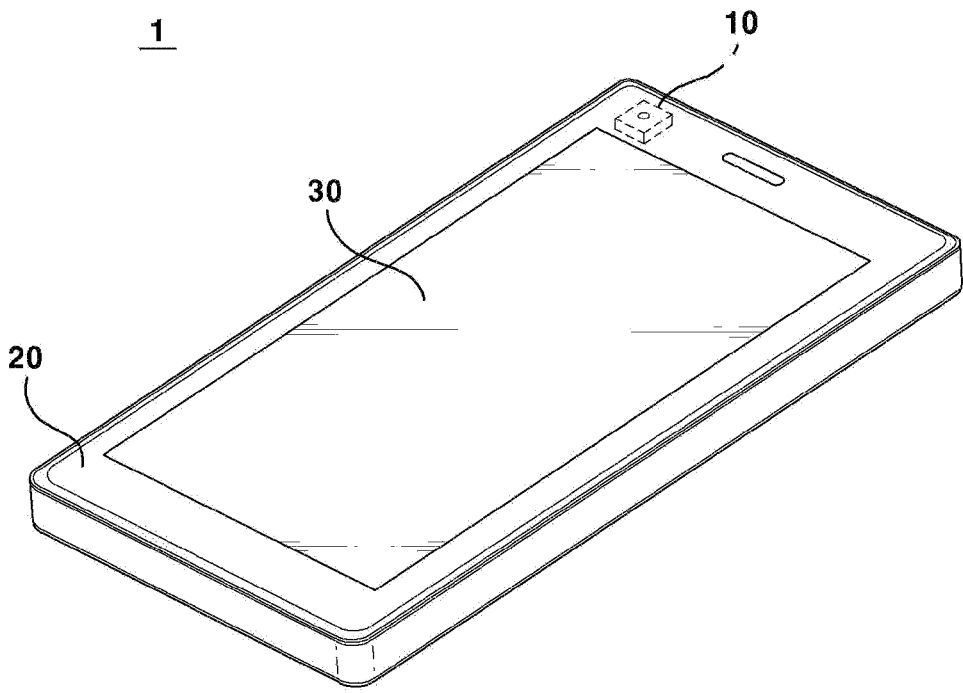
FIG. 29 is a perspective view of an optical instrument according to a first exemplary embodiment of the present invention.
Figure 30:
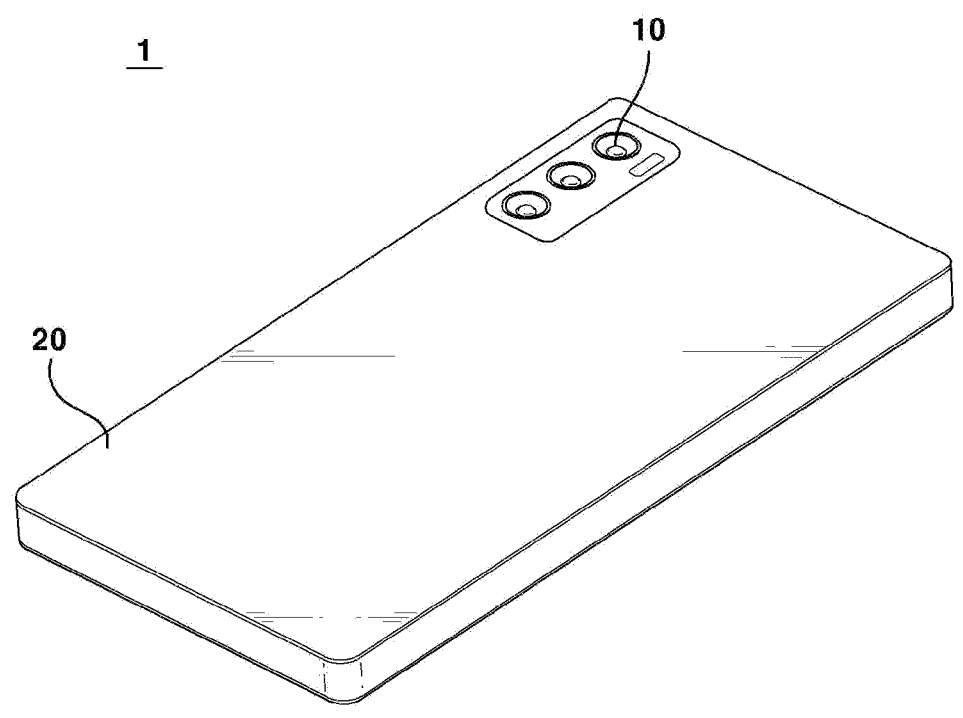
FIG. 30 is a perspective view of an optical instrument according to a first exemplary embodiment of the present invention from a different direction than FIG. 29.

FIG. 29 is a perspective view of an optical instrument according to the first exemplary embodiment of the present invention, and FIG. 30 is a perspective view of an optical instrument according to the first exemplary embodiment of the present invention from a direction different from FIG. 29.

The optical instrument (1) may comprise one or more of a cell phone, a mobile phone, a handheld device, a smart phone, a smart pad, a portable smart device, a digital camera, a laptop computer, a digital broadcasting device, a personal digital assistant (PDA), a portable multimedia player (PMP), and a navigation device. The optical instrument (1) may comprise any device for taking images or photographs.

The optical instrument (1) may comprise a main body (20). The optical instrument (1) may comprise a camera device (10). The camera device (10) may be disposed on the main body (20). The camera device (10) may photograph a subject. The optical instrument (1) may comprise a display (30). The display (30) may be disposed on the main body (20). The display (30) may output at least one of a video and an image taken by the camera device (10). The display (30) may be disposed on a first side of the main body (20). The camera device (10) may be disposed on one or more of a first surface of the main body (20) and a second surface opposite the first surface.

Hereinafter, a camera device according to the second exemplary embodiment of the present invention will be described with reference to the drawings.

Figure 31:
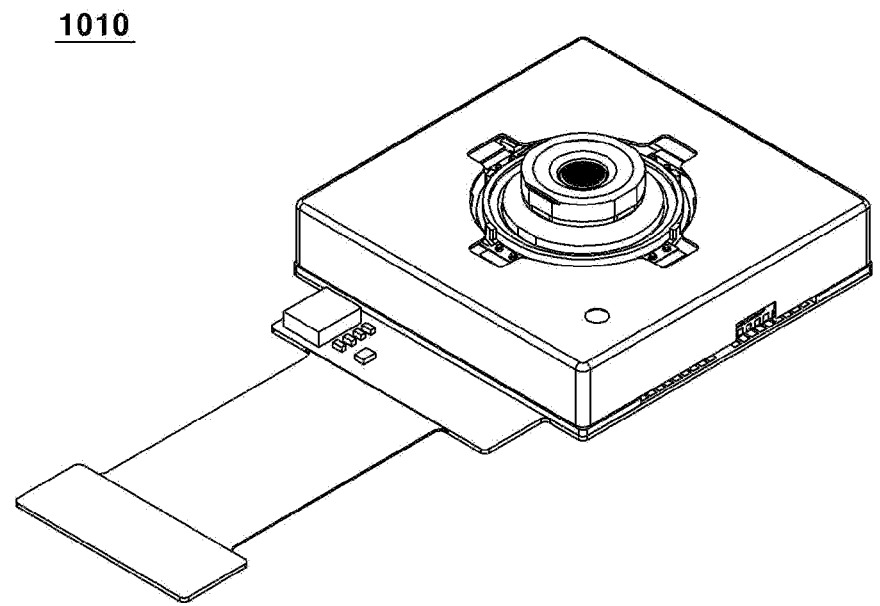
FIG. 31 is a perspective view of a camera device according to a second exemplary embodiment of the present invention.
Figure 32:
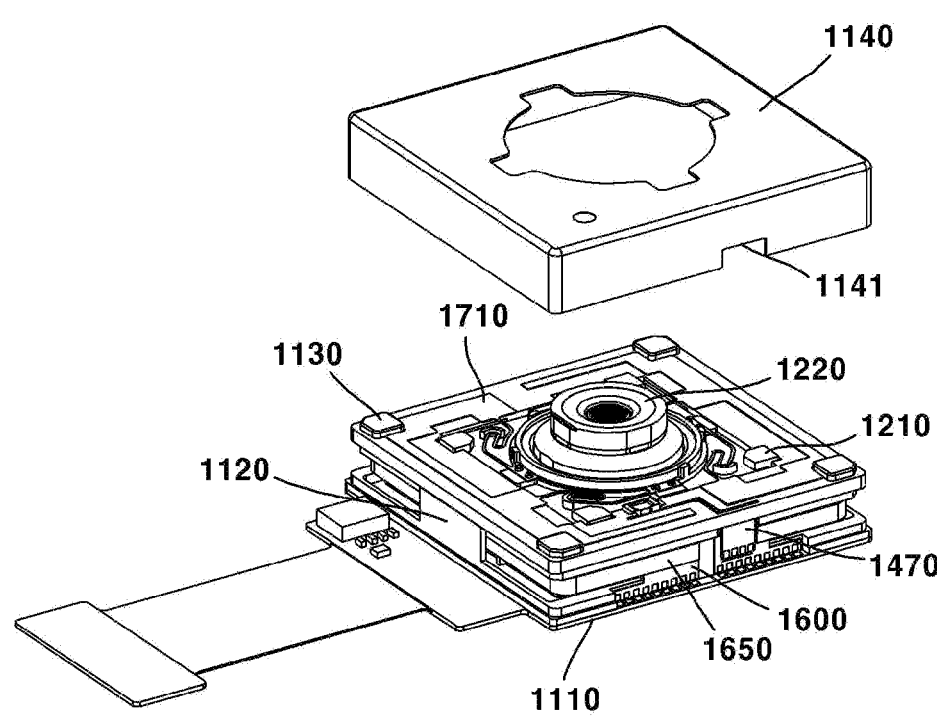
FIG. 32 is an exploded view of the camera device according to the second exemplary embodiment of the present invention with the cover member removed.
Figure 33:
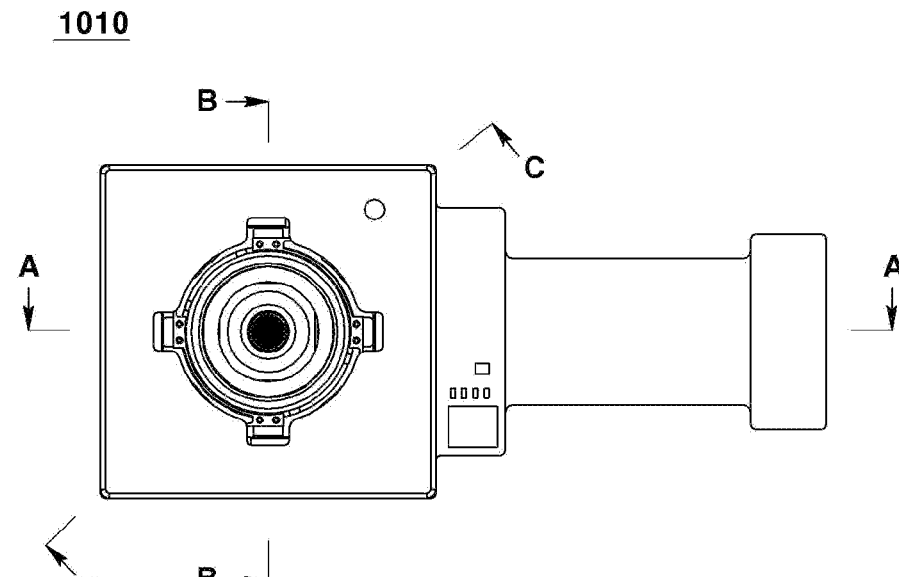
FIG. 33 is a top view of a camera device according to a second exemplary embodiment of the present invention.
Figure 34:
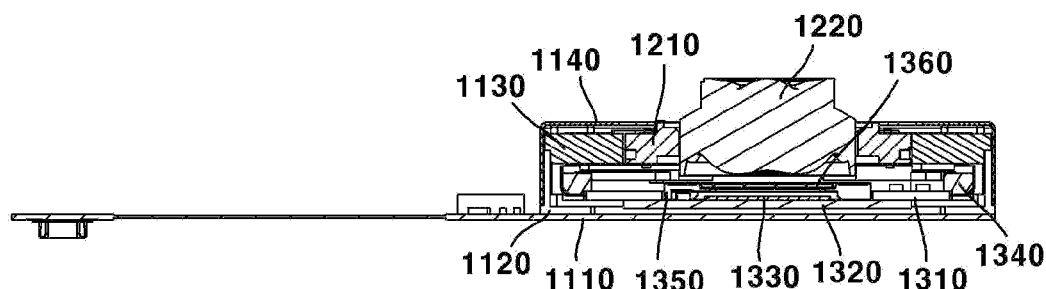
FIG. 34 is a cross-sectional view from A-A of FIG. 33.
Figure 35:
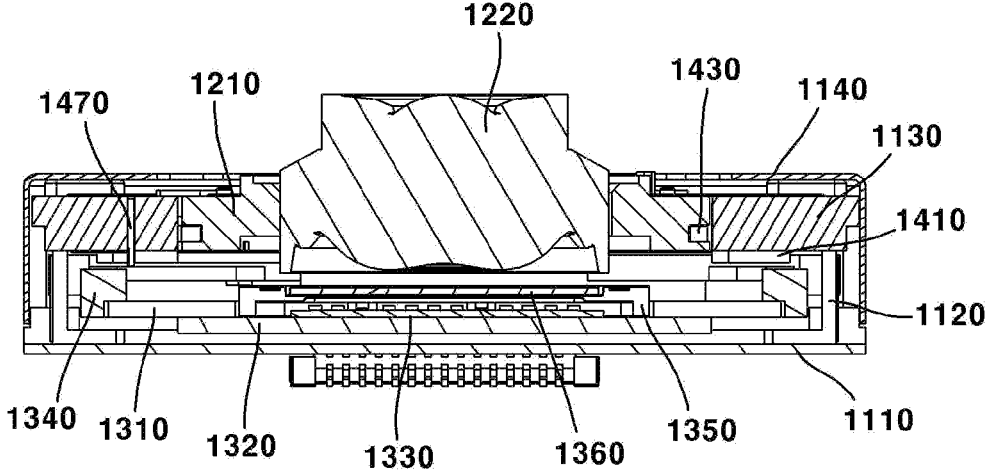
FIG. 35 is a cross-sectional view from B-B of FIG. 33.
Figure 36:
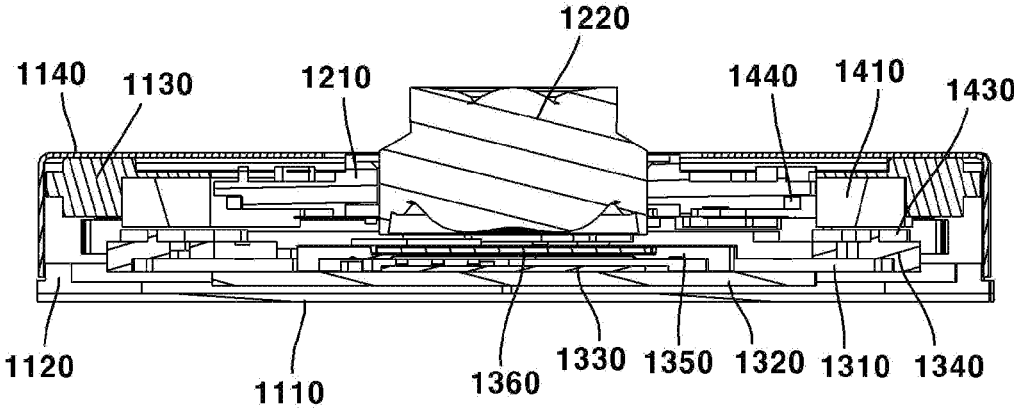
FIG. 36 is a cross-sectional view from C-C of FIG. 33.
Figure 37:
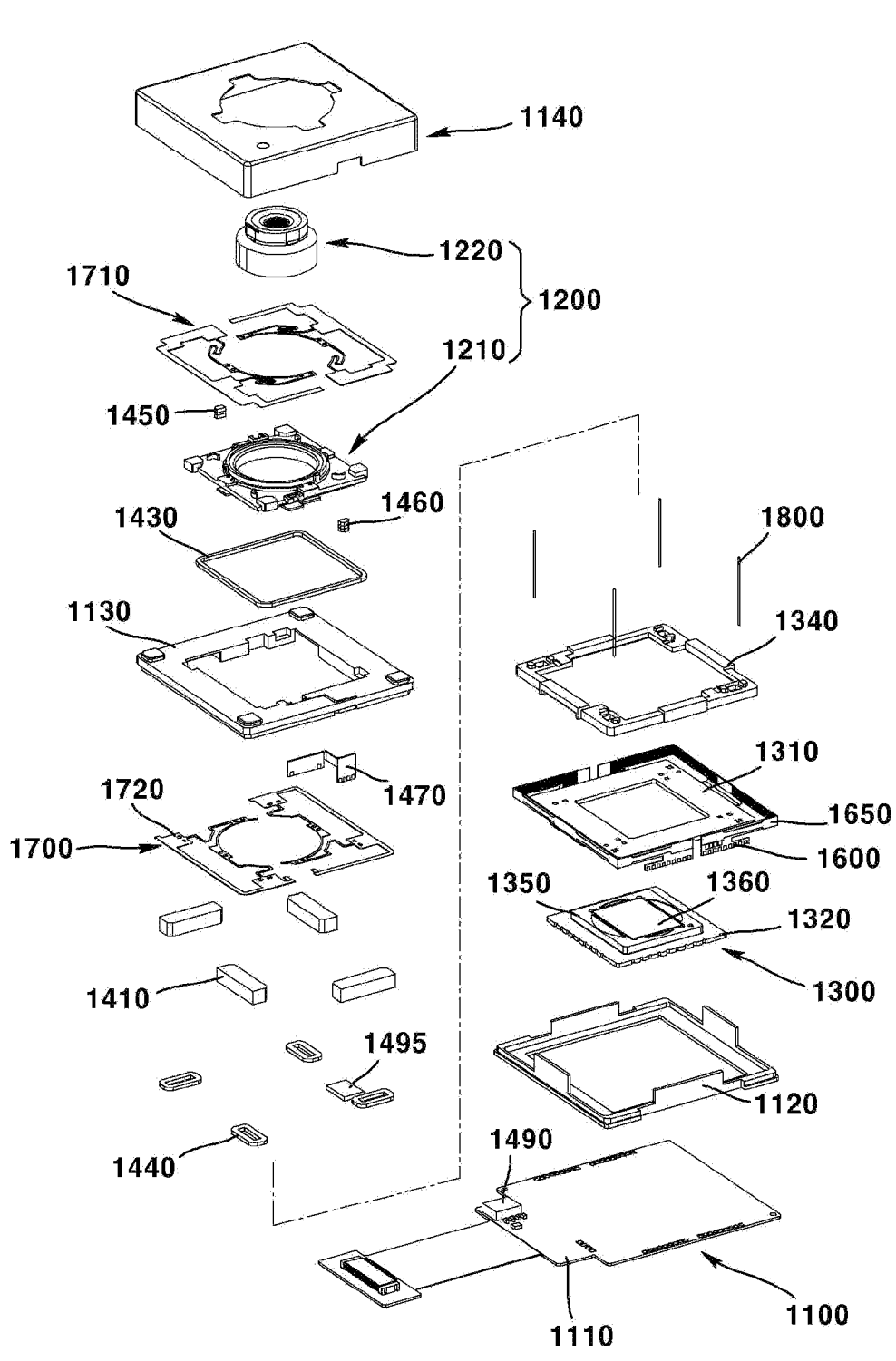
FIG. 37 is an exploded view of a camera device according to a second exemplary embodiment of the present invention.
Figure 38:
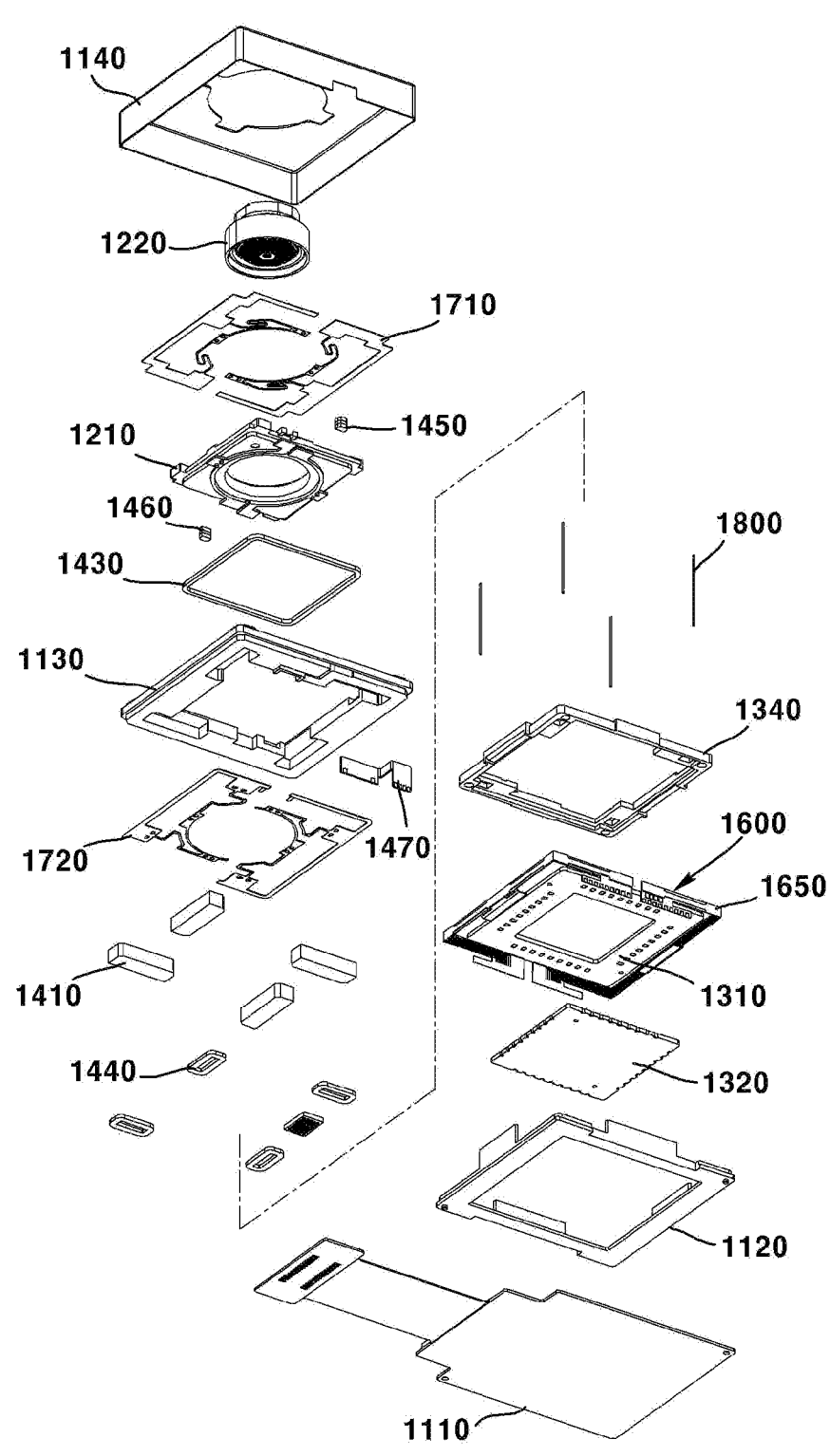
FIG. 38 is an exploded view of a camera device according to a second exemplary embodiment of the present invention from a different direction than FIG. 37.
Figure 39:
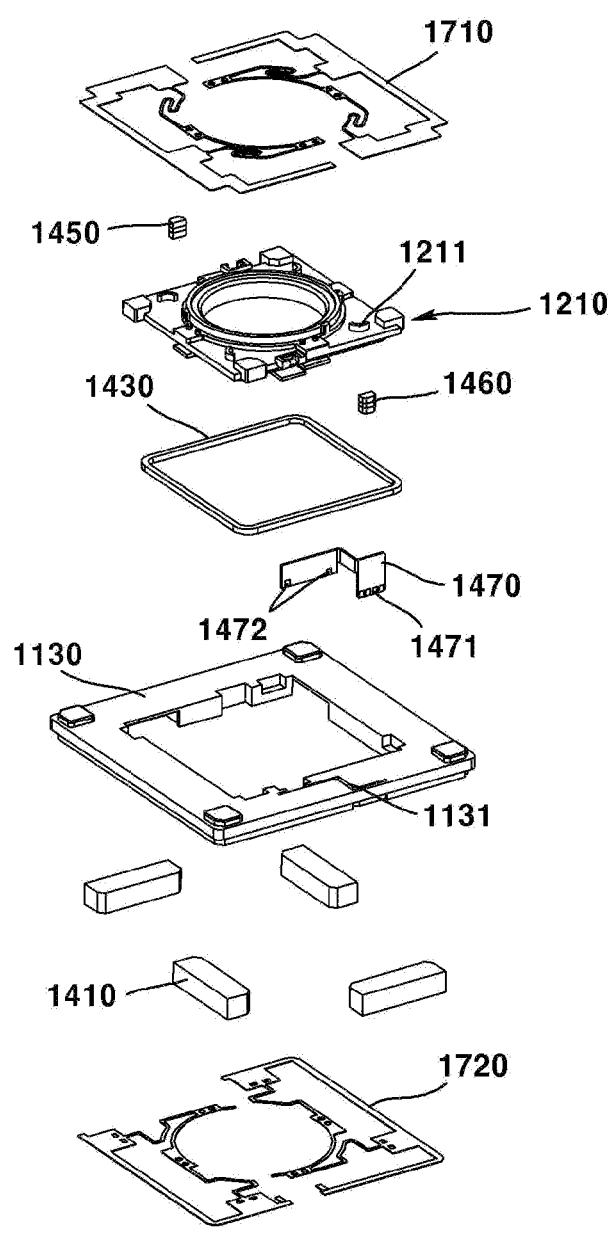
FIG. 39 is an exploded view of the first movement part and associated configuration of a camera device according to a second exemplary embodiment of the present invention.
Figure 40:
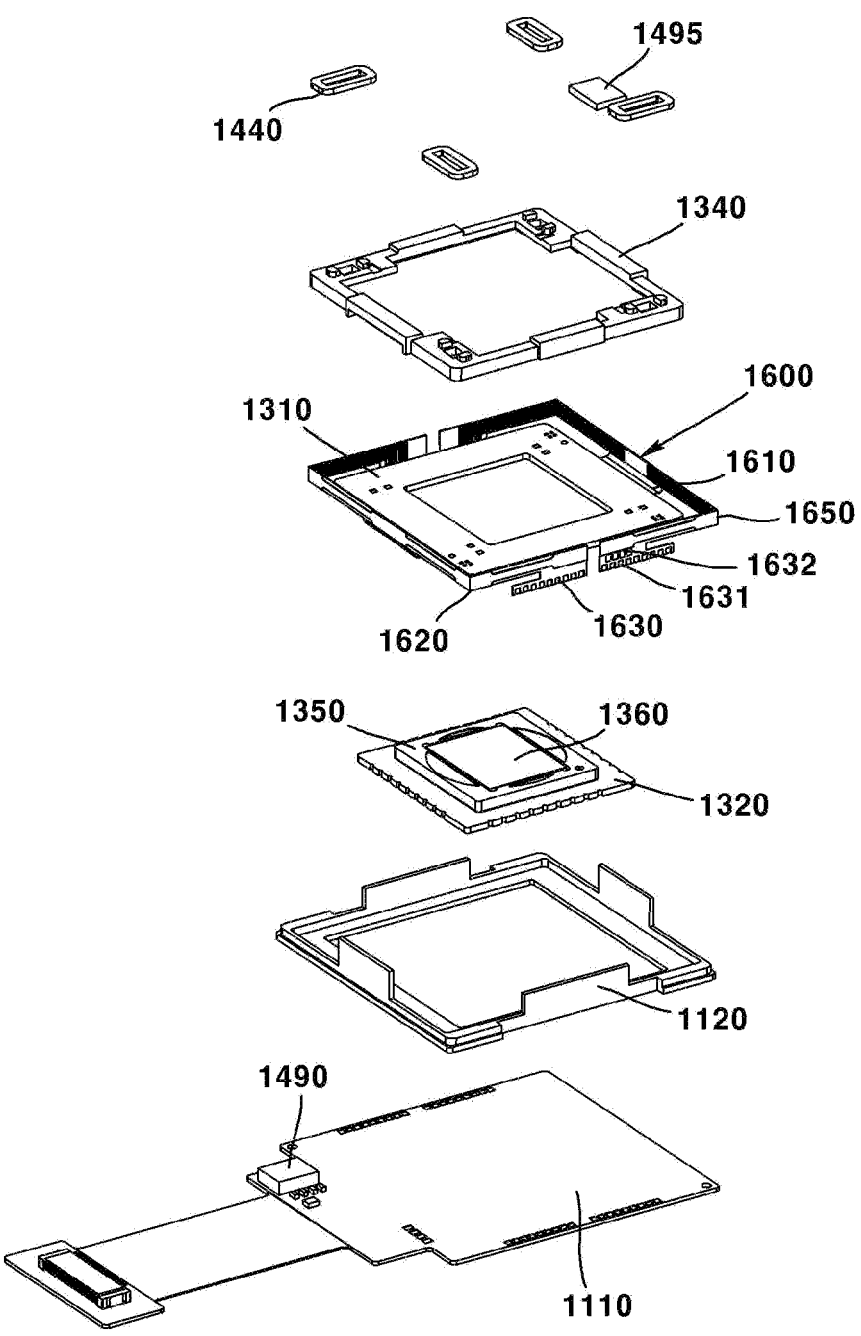
FIG. 40 is an exploded view of the second movement part and associated configuration of the camera device according to the second exemplary embodiment of the present invention.
Figure 41:
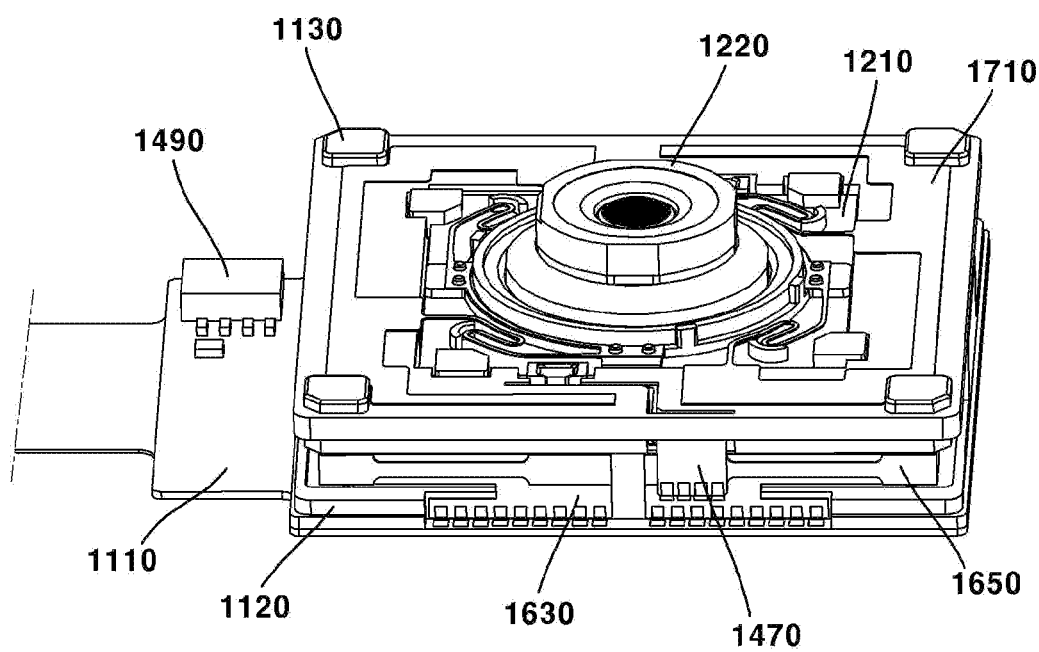
FIG. 41 is a perspective view of the camera device according to the second exemplary embodiment of the present invention with the cover member omitted.
Figure 42:
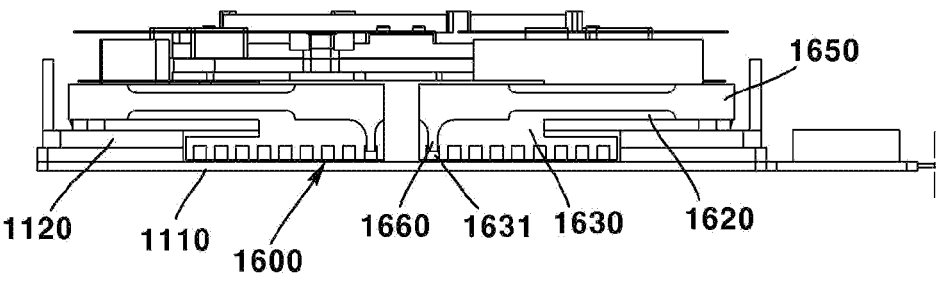
FIG. 42 is a side view of a camera device according to a second exemplary embodiment of the present invention with the cover member omitted.
Figure 43A:
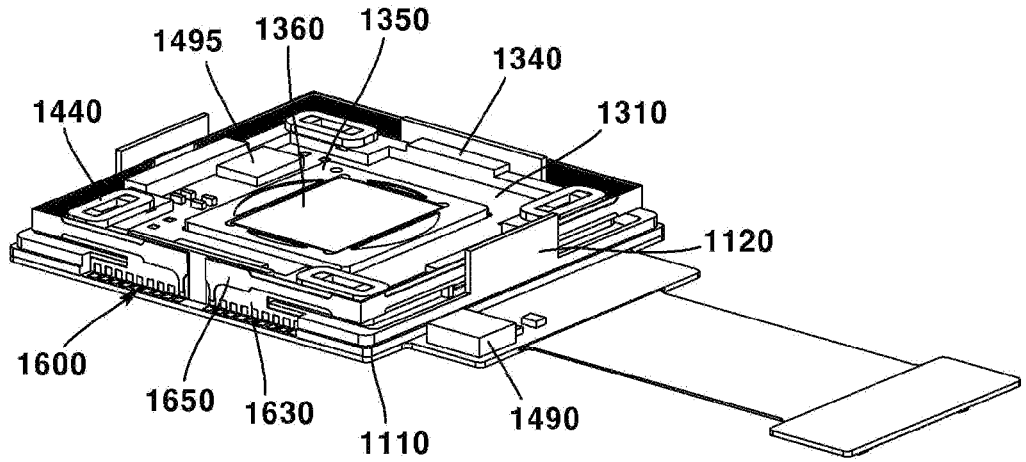
FIG. 43*a* is a perspective view illustrating a second movement part, a fixed part, and a connection substrate of a camera device according to a second exemplary embodiment of the present invention.
Figure 43B:
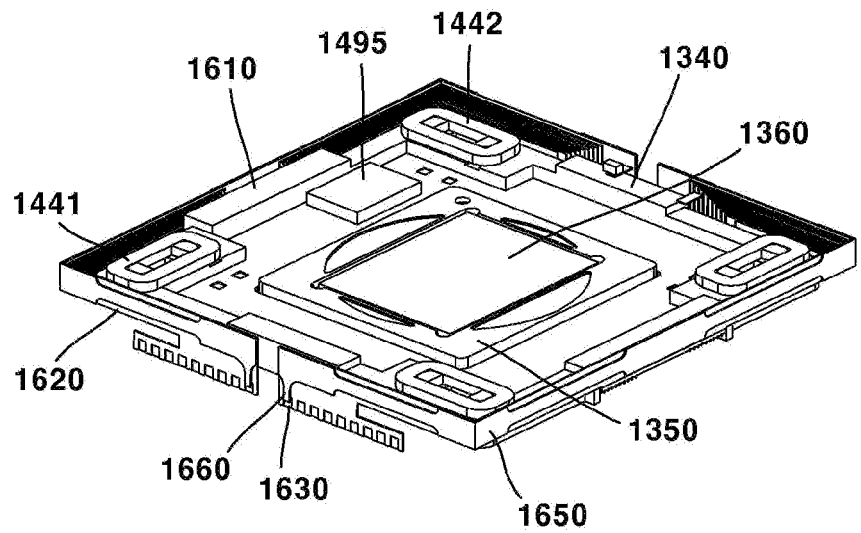
FIG. 43*b* is a perspective view of a partial configuration of a camera device according to a second exemplary embodiment of the present invention.
Figure 44:
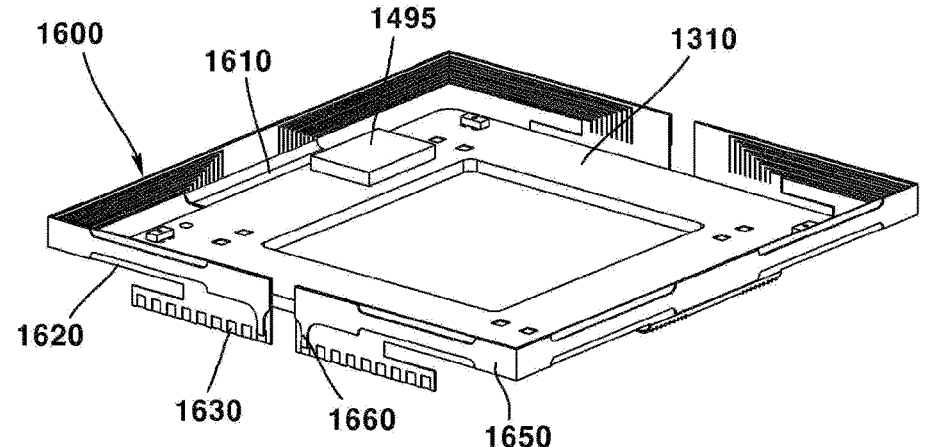
FIG. 44 is a perspective view illustrating a portion of a second movement part and a connection substrate of a camera device according to a second exemplary embodiment of the present invention.
Figure 45:
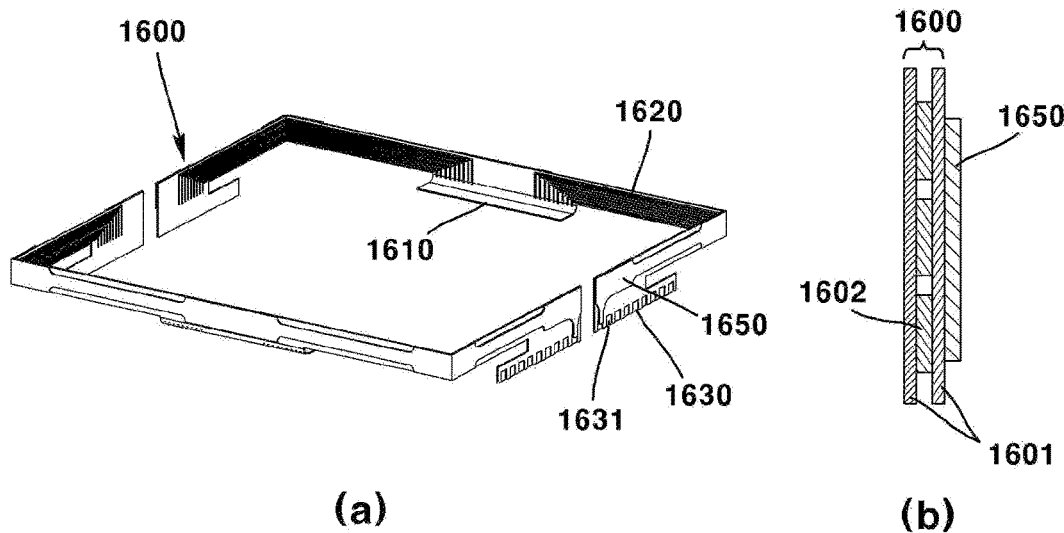
FIG. 45(*a*) is a perspective view of a connection substrate and a metal member of a camera device according to the second exemplary embodiment of the present invention, and FIG. 45(*b*) is a cross-sectional view of a connection substrate and a metal member of a camera device according to the second exemplary embodiment of the present invention.
Figure 46:
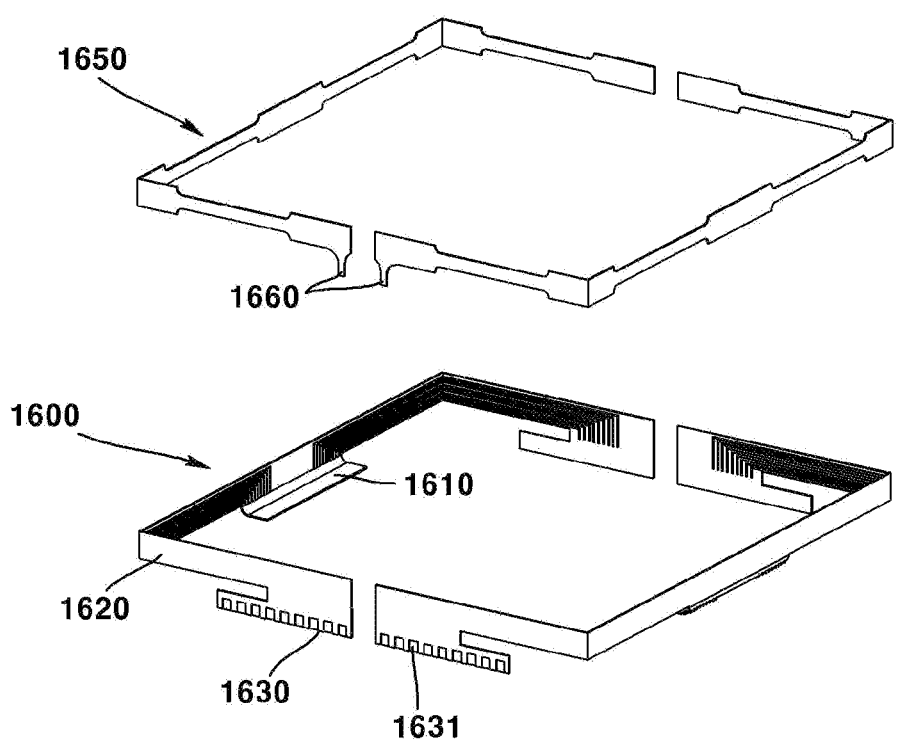
FIG. 46 is an exploded view of the connection substrate and the metal member of the camera device according to the second exemplary embodiment of the present invention.
Figure 47:
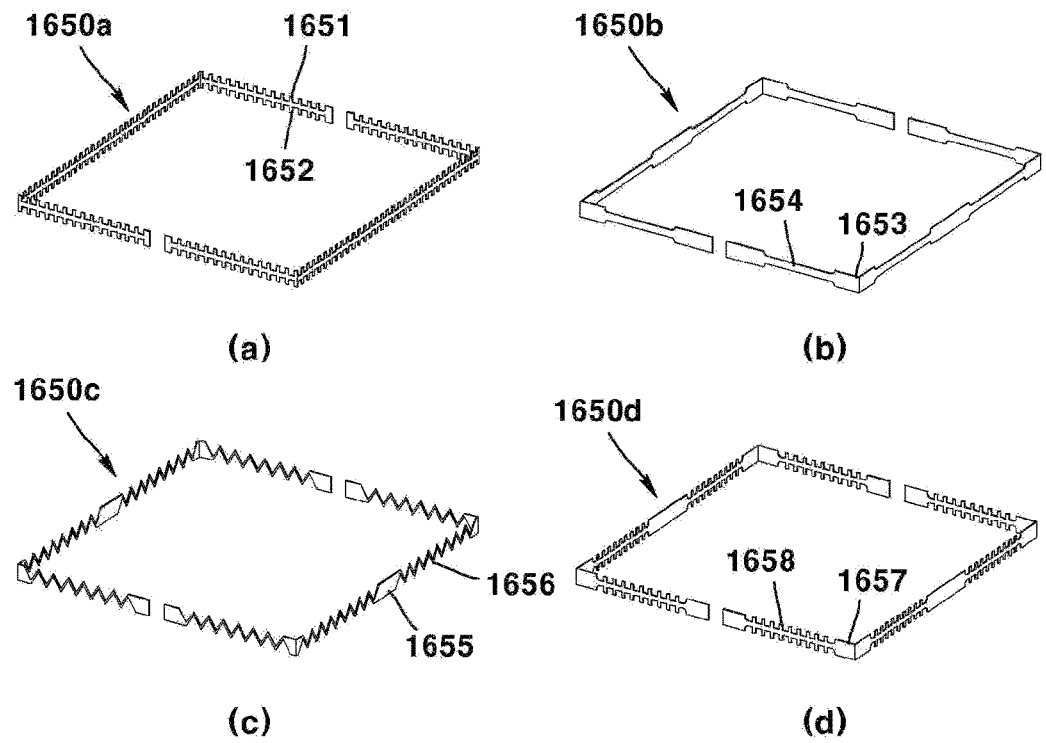
FIG. 47(*a*)-(*d*) are diagrams illustrating various embodiments of a metal member of a camera device according to a second exemplary embodiment of the present invention.
Figure 48:
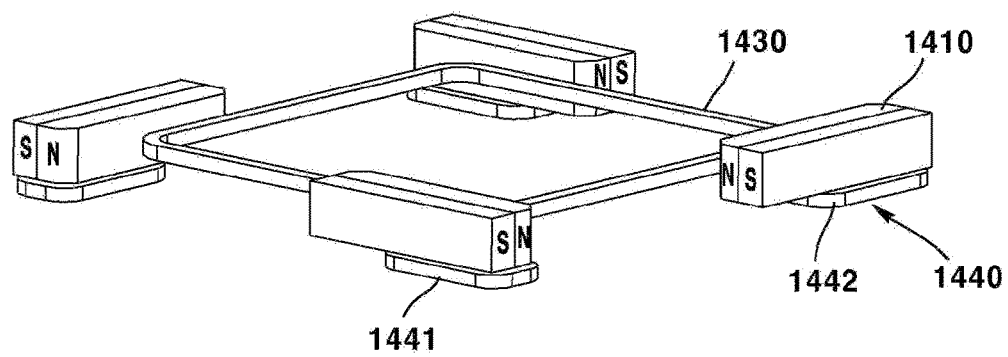
FIG. 48 is a perspective view of a magnet and coil of a camera device according to a second exemplary embodiment of the present invention.
Figure 49:
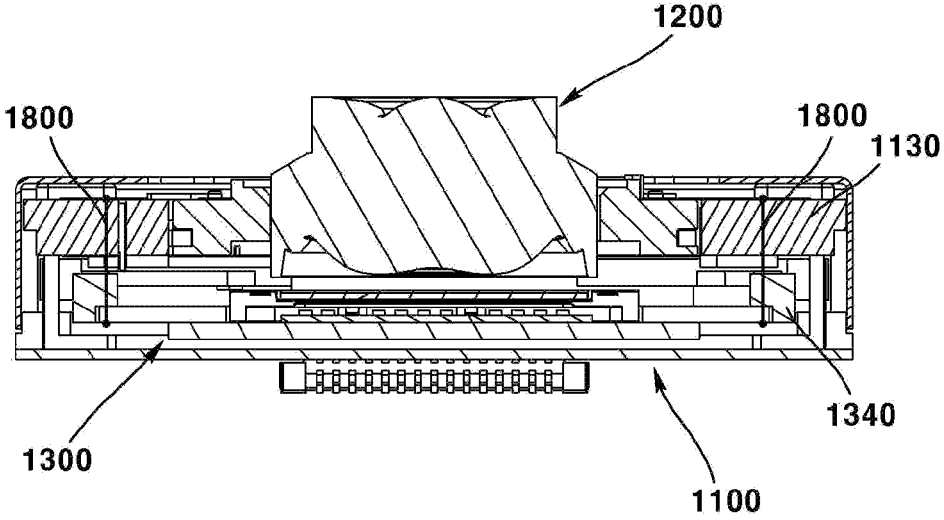
FIG. 49 is a cross-sectional view of a camera device according to a second exemplary embodiment of the present invention. The wires of the camera device according to a second exemplary embodiment of the present invention may be omitted in some drawings.

FIG. 31 is a perspective view of a camera device according to a second exemplary embodiment of the present invention, FIG. 32 is an exploded view of the camera device according to the second exemplary embodiment of the present invention with the cover member removed, FIG. 33 is a top view of a camera device according to a second exemplary embodiment of the present invention, FIG. 34 is a cross-sectional view from A-A of FIG. 33, FIG. 35 is a cross-sectional view from B-B of FIG. 33, FIG. 36 is a cross-sectional view from C-C of FIG. 33, FIG. 37 is an exploded view of a camera device according to a second exemplary embodiment of the present invention, FIG. 38 is an exploded view of a camera device according to a second exemplary embodiment of the present invention from a different direction than FIG. 37, FIG. 39 is an exploded view of the first movement part and associated configuration of a camera device according to a second exemplary embodiment of the present invention, FIG. 40 is an exploded view of the second movement part and associated configuration of the camera device according to the second exemplary embodiment of the present invention, FIG. 41 is a perspective view of the camera device according to the second exemplary embodiment of the present invention with the cover member omitted, FIG. 42 is a side view of a camera device according to a second exemplary embodiment of the present invention with the cover member omitted, FIG. 43*a* is a perspective view illustrating a second movement part, a fixed part, and a connection substrate of a camera device according to a second exemplary embodiment of the present invention, FIG. 43*b* is a perspective view of a partial configuration of a camera device according to a second exemplary embodiment of the present invention, FIG. 44 is a perspective view illustrating a portion of a second movement part and a connection substrate of a camera device according to a second exemplary embodiment of the present invention, FIG. 45(*a*) is a perspective view of a connection substrate and a metal member of a camera device according to the second exemplary embodiment of the present invention, and FIG. 45(*b*) is a cross-sectional view of a connection substrate and a metal member of a camera device according to the second exemplary embodiment of the present invention, FIG. 46 is an exploded view of the connection substrate and the metal member of the camera device according to the second exemplary embodiment of the present invention, FIG. 47 is a diagram illustrating various embodiments of a metal member of a camera device according to a second exemplary embodiment of the present invention, FIG. 48 is a perspective view of a magnet and coil of a camera device according to a second exemplary embodiment of the present invention, and FIG. 49 is a cross-sectional view of a camera device according to a second exemplary embodiment of the present invention. The wires of the camera device according to a second exemplary embodiment of the present invention may be omitted in some drawings.

A camera device (1010) can take at least one of an image and a video. The camera device (1010) may be a camera. The camera device (1010) may be a camera module. The camera device (1010) may be a camera assembly. The camera device (1010) may be a camera unit. The camera device (1010) may comprise a lens driving device. The camera device (1010) may comprise a sensor driving device. The camera device (1010) may comprise a voice coil motor (VCM). The camera device (1010) may comprise an autofocus assembly. The camera device (1010) may comprise an image stabilization assembly. The camera device (1010) may comprise an autofocus unit. The camera device (1010) may comprise an image stabilization device. The camera device (1010) may comprise an actuator. The camera device (1010) may comprise a lens-driven actuator. The camera device (1010) may comprise a sensor-driven actuator. The camera device (1010) may comprise an autofocus actuator. The camera device (1010) may comprise an image stabilization actuator.

The camera device (1010) may comprise a fixed part (1100). The fixed part (1100) may be a relatively fixed portion of the movement parts (1200, 1300) as they move. The fixed part (1100) may be a relatively fixed portion when at least one of the first movement part (1200) and the second movement part (1300) is moved. The fixed part (1100) may accommodate the first movement part (1200) and the second movement part (1300). The fixed part (1100) may be disposed on an outer side of the first movement part (1200) and the second movement part (1300).

Throughout the specification, a first substrate (1110) has been described as a component of fixed part (1100), but the first substrate (1110) may also be understood as a separate configuration from fixed part (1100). The fixed part (1100) may be disposed on the first substrate (1110). The fixed part (1100) may be disposed on the first substrate (1110). The fixed part (1100) may be disposed on top of the first substrate (1110). The camera device (1010) may comprise the first substrate (1110). The fixed part (1100) may comprise the first substrate (1110). The first substrate (1110) may be a main substrate. The first substrate (1110) may be a substrate. The first substrate (1110) may be a printed circuit board (PCB). The first substrate (1110) may be connected to a power source of the optical instrument (1001). The first substrate (1110) may comprise a connector for connecting to a power source of the optical instrument (1001).

The camera device (1010) may comprise a base (1120). The fixed part (1100) may comprise the base (1120). The base (1120) may be disposed on the first substrate (1110). The base (1120) may be disposed on the first substrate (1110). The base (1120) may be disposed on top of the first substrate (1110). The base (1120) may be secured to the first substrate (1110). The base (1120) may be coupled to the first substrate (1110). The base (1120) may be bonded to the first substrate (1110) with an adhesive. The base (1120) may be disposed between the first substrate (1110) and a housing (1130).

The camera device (1010) may comprise a housing (1130). The fixed part (1100) may comprise the housing (1130). The housing (1130) may be disposed on the base (1120). The housing (1130) may be disposed on the base (1120). The housing (1130) may be disposed on top of the base (1120). The housing (1130) may be secured to the base (1120). The housing (1130) may be coupled to the base (1120). The housing (1130) may be adhesively bonded to the base (1120). The housing (1130) may be disposed on the first substrate (1110). The housing (1130) may be disposed on top of the first substrate (1110). The housing (1130) may be formed as a separate member from the base (1120).

The camera device (1010) may comprise a cover member (1140). The fixed part (1100) may comprise the cover member (1140). The cover member (1140) may be coupled to the base (1120). The cover member (1140) may be coupled to the housing (1130). The cover member (1140) may be coupled to the first substrate (1110). The cover member (1140) may be secured to the base (1120). The cover member (1140) may be secured to the housing (1130). The cover member (1140) may be secured to the first substrate (1110). The cover member (1140) may cover at least a portion of the base (1120). The cover member (1140) may cover at least a portion of the housing (1130).

The cover member (1140) may be a "cover can" or "shield can". The cover member (1140) may be formed of a metal material. The cover member (1140) may block electromagnetic interference (EMI). The cover member (1140) may be electrically connected to the first substrate (1110). The cover member (1140) may be grounded to the first substrate (1110).

The cover member (1140) may comprise a top plate. The cover member (1140) may comprise a hole formed in the top plate. The hole may be formed at a location corresponding to that of a lens (1220). The cover member (1140) may comprise a side plate. The side plate may comprise a plurality of side plates. The side plate may comprise four side plates. The side plate may comprise a first to fourth side plate. The side plate may comprise a first and second side plate disposed opposite each other, and a third and fourth side plate disposed opposite each other. The cover member (1140) may comprise a plurality of corners between the plurality of side plates.

Throughout the specification, cover member (1140) has been described as a component of fixed part (1100), but the cover member (1140) may be understood as a separate configuration from fixed part (1100). The cover member (1140) may be coupled to the fixed part (1100). The cover member (1140) may cover the first movement part (1200).

The camera device (1010) may comprise a first movement part (1200). The first movement part (1200) may be movable relative to the fixed part (1100). The first movement part (1200) may move in an optical axis direction relative to the fixed part (1100). The first movement part (1200) may be disposed within the fixed part (1100). The first movement par (1200) may be movably disposed within the fixed part (1100). The first movement part (1200) may be movably disposed within the fixed part (1100) in an optical axis direction. By moving the first movement part (1200) in the optical axial direction with respect to the fixed part (1100), an autofocus (AF) function may be performed. The first movement part (1200) may be disposed on the second movement part (1300).

The camera device (1010) may comprise a bobbin (1210). The first movement part (1200) may comprise the bobbin (1210). The bobbin (1210) may be disposed on the first substrate (1110). The bobbin (1210) may be disposed on top of the first substrate (1110). The bobbin (1210) may be spaced apart on the first substrate (1110). The bobbin (1210) may be disposed within the housing (1130). The bobbin (1210) may be disposed on an inner side of the housing (1130). At least a portion of the bobbin (1210) may be housed in the housing (1130). The bobbin (1210) may be movably disposed in the housing (1130). The bobbin (1210) may be movably disposed in the housing (1130) in the optical axis direction. The bobbin (1210) may be coupled to the lens (1220). The bobbin (1210) may comprise a hollow or a hole. The lens (1220) may be disposed in the hollow or hole of the bobbin (1210). The inner circumferential surface of the bobbin (1210) may be coupled to the outer circumferential surface of the lens (1220).

The camera device (1010) may comprise a lens (1220). The first movement part (1200) may comprise the lens (1220). The lens (1220) may be coupled to the bobbin (1210). The lens (1220) may be secured to the bobbin (1210). The lens (1220) may be integrally movable with the bobbin (1210). The lens (1220) may be threadedly coupled to the bobbin (1210). The lens (1220) may be adhesively bonded to the bobbin (1210). The lens (1220) may be disposed in a position corresponding to that of the image sensor (1330). An optical axis of the lens (1220) may be aligned with an optical axis of the image sensor (1330). The optical axis may be the z-axis. The lens (1220) may comprise a plurality of lenses. The lens (1220) may comprise five sheets or six sheets of lenses.

The camera device (1010) may comprise a lens module. The lens module may be coupled to a bobbin (1210). The lens module may comprise a barrel, and one or more lenses (1220) disposed within the barrel.

The camera device (1010) may comprise a second movement part (1300). The second movement part (1300) may be movable about the fixed part (1100). The second movement part (1300) may move in a direction perpendicular to the optical axis direction relative to the fixed part (1100). The second movement part (1300) may be disposed within the fixed part (1100). The second movement part (1300) may be movably disposed within the fixed part (1100). The second movement part (1300) may be movably disposed within the fixed part (1100) in a direction perpendicular to the optical axis direction. By moving the second movement part (1300) in a direction perpendicular to the optical axis direction with respect to the fixed part (1100), the image stabilization (OIS) function may be performed. The second movement part (1300) may be disposed between the first movement part (1200) and the first substrate (1110).

The camera device (1010) may comprise a second substrate (1310). The second movement part (1300) may comprise the second substrate (1310). The second substrate (1310) may be a substrate. The second substrate (1310) may be a printed circuit board (PCB). The second substrate (1310) may be disposed between the first movement part (1200) and the first substrate (1110). The second substrate (1310) may be disposed between the bobbin (1210) and the first substrate (1110). The second substrate (1310) may be disposed between the lens (1220) and the first substrate (1110). The second substrate (1310) may be spaced apart from the fixed part (1100). The second substrate (1310) may be spaced apart from the fixed part (1100) in an optical axis direction and a direction perpendicular to the optical axis direction. The second substrate (1310) may be moved in a direction perpendicular to the optical axis direction. The second substrate (1310) may be electrically connected to the image sensor (1330). The second substrate (1310) may be co-movable with the image sensor (1330). The second substrate (1310) may comprise a hole. The image sensor (1330) may be disposed in the hole in the second substrate (1310).

The second substrate (1310) may comprise a terminal (1311). The terminal (1311) may be disposed on a bottom side of second substrate (1310). The terminal (1311) may be coupled to a terminal (1321) of sensor substrate (1320). The second substrate (1310) may be formed separately from the sensor substrate (1320). The second substrate (1310) may be formed separately from and coupled to the sensor substrate (1320). The terminal (1311) of the second substrate (1310) may be soldered to a terminal (1321) of the sensor substrate (1320).

The camera device (1010) may comprise the sensor substrate (1320). The second movement part (1300) may comprise the sensor substrate (1320). The sensor substrate (1320) may be a substrate. The sensor substrate (1320) may be a printed circuit board (PCB). The sensor substrate (1320) may be coupled to the image sensor (1330). The sensor substrate (1320) may be coupled to the second substrate (1310).

The sensor substrate (1320) may comprise a terminal (1321). The terminal (1321) of sensor substrate (1320) may be coupled to a terminal (1311) of second substrate (1310). The sensor substrate (1320) may be coupled to a bottom side of the second substrate (1310). The sensor substrate (1320) may be disposed underneath the second substrate (1310). The sensor substrate (1320) may be coupled to the underside of the second substrate (1310) with the image sensor (1330) coupled thereto.

The camera device (1010) may comprise an image sensor (1330). The second movement part (1300) may comprise the image sensor (1330). The image sensor (1330) may be disposed on the sensor substrate (1320). The image sensor (1330) may be disposed between the sensor substrate (1320) and a sensor base (1350). The image sensor (1330) may be electrically coupled to the second substrate (1310). The image sensor (1330) may be integrally movable with the second substrate (1310).

The image sensor (1330) may receive a light that has passed through a lens (1220) and a filter (1360), and an image may be formed. The image sensor (1330) may be electrically connected to the sensor substrate (1320), the second substrate (1310), and the first substrate (1110). The image sensor (1330) may comprise an active image area. The image sensor (1330) can convert a light illuminating the active image area into an electrical signal. The image sensor (1330) may comprise one or more of a charge coupled device (CCD), a metal oxide semi-conductor (MOS), a CPD, and a CID.

The camera device (1010) may comprise a holder (1340). The second movement part (1300) may comprise the holder (1340). The holder (1340) may be formed of an insulating material. The holder (1340) may be disposed on the second substrate (1310). The holder (1340) may be disposed on the second substrate (1310). The holder (1340) may be disposed on top of the second substrate (1310). The holder (1340) may be secured to the second substrate (1310). The holder (1340) may be coupled to the second substrate (1310). The holder (1340) may comprise a hollow or a hole in which the image sensor (1330) is disposed. A second coil (1440) may be disposed in the holder (1340). The holder (1340) may comprise a protrusion around which the second coil (1440) is wound. The holder (1340) may comprise a hole in which the Hall sensor (1445) is disposed.

The camera device (1010) may comprise a sensor base (1350). The second movement part (1300) may comprise the sensor base (1350). The sensor base (1350) may be disposed on the sensor substrate (1320). The sensor base (1350) may comprise a hole formed at a location corresponding to that of the image sensor (1330). The sensor base (1350) may comprise a groove in which the filter (1360) is disposed.

The camera device (1010) may comprise a filter (1360). The second movement part (1300) may comprise the filter (1360). The filter (1360) may be disposed between the lens (1220) and the image sensor (1330). The filter (1360) may be disposed on the sensor base (1350). The filter (1360) may block certain frequency bands of light from entering the image sensor (1330) from light that has passed through the lens (1220). The filter (1360) may comprise an infrared cutoff filter. The filter (1360) may block infrared light from entering the image sensor (1330).

The camera device (1010) may comprise a drive part. The drive part may move the movement parts (1200, 1300) relative to the fixed part (1100). The drive part may perform an autofocus (AF) function. The drive part may perform the image stabilization (OIS) function. The drive part may move the lens (1220). The drive part may move the image sensor (1330). The drive part may comprise a magnet and a coil. The drive part may comprise a shape memory alloy (SMA).

The camera device (1010) may comprise a first drive part. The first drive part may be an AF drive portion. The first drive part may move the first movement part (1200) in the optical axis direction. The first drive part may move the bobbin (1210) in the optical axis direction. The first drive part may move the lens (1220) in the optical axis direction. The first drive part may perform an autofocus (AF) function. The first drive part may move the first movement part (1200) in an upward direction of the optical axis direction. The first drive part may move the first movement part (1200) in the downward direction of the optical axis direction.

The camera device (1010) may comprise a second drive part. The second drive part may be an OIS drive part. The second drive part may move the second movement part (1300) in a direction perpendicular to the optical axis direction. The second drive part may move the second substrate (1310) in a direction perpendicular to the optical axis direction. The second drive part may move the sensor substrate (1320) in a direction perpendicular to the optical axis direction. The second drive part may move the image sensor (1330) in a direction perpendicular to the optical axis direction. The second drive part may move the holder (1340) in a direction perpendicular to the optical axis direction. The second driver part may move the sensor base (1350) in a direction perpendicular to the optical axis direction. The second drive part may move the filter (1360) in a direction perpendicular to the optical axis direction. The second drive part may perform the image stabilization (OIS) function.

The second drive part may move the second movement part (1300) in a first direction perpendicular to the optical axis direction. The second drive part may move the second movement part (1300) in a second direction perpendicular to the optical axis direction and the first direction. The second drive part may rotate the second movement part (1300) about the optical axis.

In a second exemplary embodiment of the present invention, the first drive part may comprise a first coil (1430). The second drive part may comprise a second coil (1440). The first drive part and the second drive part may comprise a drive magnet (1410) that is used in common to interact with the first coil (1430) and the second coil (1440). That is, the first drive part and the second drive part may comprise separately controlled coils and a common magnet.

The camera device (1010) may comprise a drive magnet (1410). The drive part may comprise the drive magnet (1410). The drive magnet (1410) may be a magnet. The drive magnet (1410) may be a permanent magnet. The drive magnet (1410) may be a common magnet. The drive magnet (1410) may be commonly used for autofocus (AF) and image stabilization (OIS).

The drive magnet (1410) may be disposed in the fixed part (1100). The drive magnet (1410) may be secured to the fixed part (1100). The drive magnet (1410) may be coupled to the fixed part (1100). The drive magnet (1410) may be bonded to the fixed part (1100) with an adhesive. The drive magnet (1410) may be disposed in the housing (1130). The drive magnet (1410) may be secured to the housing (1130). The drive magnet (1410) may be coupled to the housing (1130). The drive magnet (1410) may be bonded to the housing (1130) with an adhesive. The drive magnet (1410) may be disposed at a corner of the housing (1130). The drive magnet (1410) may be disposed biased toward a corner of the housing (1130).

The drive magnet (1410) may be a two-pole magnetized magnet with one N-pole region and one S-pole region. The inner surface of each unit magnet of the drive magnet (1410) may be N-pole and the outer surface may be S-pole. Conversely, the inner surface of each unit magnet of the drive magnet (1410) may be S-pole and the outer surface may be N-pole. As a modification, the drive magnet (1410) may be a four-pole magnetized magnet comprising two N-pole regions and two S-pole regions. The drive magnet (1410) may comprise a plurality of magnets. The drive magnet (1410) may comprise four magnets. The drive magnet (1410) may comprise a first to fourth magnet. The first to fourth magnet may be disposed symmetrically about the optical axis. The first and fourth magnet may be formed of the same size and shape as each other.

In a modification, the drive magnet (1410) may comprise a first magnet disposed in a position corresponding to that of the first coil (1430) and a second magnet disposed in a position corresponding to that of the second coil (1440). In this case, the first magnet and the second magnet may be disposed in the fixed part (1100) and the first coil (1430) and the second coil (1440) may be disposed in the movement parts (1200, 1300). Alternatively, the first magnet and the second magnet may be disposed on the movement parts (1200, 1300) and the first coil (1430) and the second coil (1440) may be disposed on the fixed part (1100).

The camera device (1010) may comprise a first coil (1430). The drive part may comprise the first coil (1430). The first coil (1430) may be disposed in the first movement part (1200). The first coil (1430) may be fixed to the first movement part (1200). The first coil (1430) may be coupled to the first movement part (1200). The first coil (1430) may be bonded to the first movement part (1200) with an adhesive. The first coil (1430) may be disposed on the bobbin (1210). The first coil (1430) may be secured to the bobbin (1210). The first coil (1430) may be coupled to the bobbin (1210). The first coil (1430) may be bonded to the bobbin (1210) by an adhesive. The first coil (1430) may be electrically connected to the driver IC (1480). The first coil (1430) may be electrically connected to a lower elastic member (1720), a sensing substrate (1470), and the driver IC (1480). The first coil (1430) may receive a current supply from the driver IC (1480).

The first coil (1430) may be disposed in a position corresponding to that of the drive magnet (1410). The first coil (1430) may be disposed on the bobbin (1210) in a position corresponding to that of the drive magnet (1410). The first coil (1430) may face the drive magnet (1410). The first coil (1430) may comprise a surface facing the drive magnet (1410). The first coil (1430) may be disposed adjacent to the drive magnet (1410). The first coil (1430) may interact with the drive magnet (1410). The first coil (1430) may electromagnetically interact with the drive magnet (1410).

The first coil (1430) may move the first movement part (1200) in the optical axis direction. The first coil (1430) may move the bobbin 1210 in the optical axis direction. The first coil (1430) may move the lens (1220) in the optical axis direction. The first coil (1430) may move the first movement part (1200) in an upward direction of the optical axis direction. The first coil (1430) may move the bobbin (1210) in the upward direction of the optical axis direction. The first coil (1430) may move the lens (1220) in an upward direction of the optical axis direction. The first coil (1430) may move the first movement part (1200) in a downward direction of the optical axis direction. The first coil (1430) may move the bobbin (1210) in a downward direction of the optical axis direction. The first coil (1430) may move the lens (1220) in a downward direction of the optical axis direction.

The camera device (1010) may comprise a second coil (1440). The drive part may comprise the second coil (1440). The second coil (1440) may be disposed in the second movement part (1300). The second coil (1440) may be secured to the second movement part (1300). The second coil (1440) may be coupled to the second movement part (1300). The second coil (1440) may be bonded to the second movement part (1300) with an adhesive. The second coil (1440) may be disposed in the holder (1340). The second coil (1440) may be secured to the holder (1340). The second coil (1440) may be coupled to the holder (1340). The second coil (1440) may be bonded to the holder (1340) by an adhesive. The second coil (1440) may be disposed by being wound around a protrusion of the holder (1340). The second coil (1440) may be disposed on the holder (1340). The second coil (1440) may be electrically connected to the second substrate (1310). Both ends of the second coil (1440) may be soldered to the second substrate (1310). The second coil (1440) may be electrically connected to the driver IC (1495). The second coil (1440) may be electrically connected to the second substrate (1310) and the driver IC (1495). The second coil (1440) may receive current from the driver IC (1495).

The second coil (1440) may be disposed in a position corresponding to that of the drive magnet (1410). The second coil (1440) may be disposed in the holder (1340) in a position corresponding to that of the drive magnet (1410). The second coil (1440) may face the drive magnet (1410). The second coil (1440) may comprise a surface facing the drive magnet (1410). The second coil (1440) may be disposed adjacent to the drive magnet (1410). The second coil (1440) may interact with the drive magnet (1410). The second coil (1440) may electromagnetically interact with the drive magnet (1410).

The second coil (1440) may move the second movement part (1300) in a direction perpendicular to the optical axis direction. The second coil (1440) may move the second substrate (1310) in a direction perpendicular to the optical axis direction. The second coil (1440) may move the sensor substrate (1320) in a direction perpendicular to the optical axis direction. The second coil (1440) may move the image sensor (1330) in a direction perpendicular to the optical axis direction. The second coil (1440) may move the holder 1340 in a direction perpendicular to the optical axis direction. The second coil (1440) may rotate the second movement part (1300) about the optical axis. The second coil (1440) may rotate the second substrate (1310) about the optical axis. The second coil (1440) may rotate the sensor substrate (1320) about the optical axis. The second coil (1440) may rotate the image sensor (1330) about the optical axis. The second coil (1440) may rotate the holder (1340) about the optical axis.

The second coil (1440) may comprise a plurality of coils. The second coil (1440) may comprise four coils. The second coil (1440) may comprise a coil for an x-axis shift. The second coil (1440) may comprise a coil for y-axis shift.

The second coil (1440) may comprise a second-1 coil (1441). The second-1 coil (1441) may be a first-sub coil. The second-1 coil (1441) may be a coil for the x-axis shift. The second-1 coil (1441) may shift the second movement part (1300) in the x-axis direction. The second-1 coil (1441) may be elongated in the y-axis. The second-1 coil (1441) may comprise a plurality of coils. The second-1 coil (1441) may comprise two coils. The two coils of the second-1 coil (1441) may be electrically connected to each other. The second-1 coil (1441) may comprise a connection coil connecting the two coils. In this case, the two coils of the second-1 coil (1441) may be applied current together. Alternatively, two coils of second-1 coil (1141) may be electrically and mutually separated to receive a current individually.

The second coil (1440) may comprise a second-2 coil (1442). The second-2 coil 1442 may be a second sub coil. The second-2 coil (1442) may be a coil for y-axis shift. The second-2 coil (1442) may shift the second movement part (1300) in the y-axis direction. The second-2 coil (1442) may be elongated in the x-axis. The second-1 coil (1441) may comprise a plurality of coils. The second-2 coil (1442) may comprise two coils. The two coils of the second-2 coil (1442) may be electrically connected to each other. The second-2 coil (1442) may comprise a connection coil connecting the two coils. In this case, the two coils of the second-2 coil (1442) may be energized together. Alternatively, the two coils of the second-2 coil (1442) may be electrically isolated from each other and may be applied current separately.

The camera device (1010) may comprise a Hall sensor (1445). The Hall sensor (1445) may be disposed on the second substrate (1310). The Hall sensor (1445) may be disposed in a hole in the holder (1340). The Hall sensor (1445) may comprise a Hall IC. The Hall sensor (1445) may sense the drive magnet (1410). The Hall sensor (1445) may sense the magnetic force of the drive magnet (1410). The Hall sensor (1445) may face the drive magnet (1410). The Hall sensor (1445) may be disposed at a location corresponding to that of the drive magnet (1410). The Hall sensor (1445) may be disposed adjacent to drive magnet (1410). The Hall sensor (1445) may detect the position of the second movement part (1300). The Hall sensor (1445) may detect the movement of the second movement part (1300). The Hall sensor (1445) may be disposed in a hollow of the second coil (1440). The sensed value detected by the Hall sensor (1445) may be used to feedback the image stabilization drive. The Hall sensor (1445) may be electrically coupled to the driver IC (1495).

The Hall sensor (1445) may comprise a plurality of Hall sensors. The Hall sensor (1445) may comprise three Hall sensors. The Hall sensor (1445) may comprise a first to a third Hall sensor. The first Hall sensor may detect a displacement of the second movement part (1300) in the x-axis direction. The second Hall sensor may detect a displacement of the second movement part (1300) in the y-axis direction. The third Hall sensor may detect a rotation of the second movement part (1300) about the z-axis, either alone or in combination with one or more of the first and second Hall sensors.

The camera device (1010) may comprise a sensing magnet (1450). The sensing magnet (1450) may be disposed on the first movement part (1200). The sensing magnet (1450) may be fixed to the first movement part (1200). The sensing magnet (1450) may be coupled to the first movement part (1200). The sensing magnet (1450) may be bonded to the first movement part (1200) with an adhesive. The sensing magnet (1450) may be disposed on the bobbin (1210). The sensing magnet (1450) may be secured to the bobbin (1210). The sensing magnet (1450) may be coupled to the bobbin (1210). The sensing magnet (1450) may be bonded to the bobbin (1210) with an adhesive. The sensing magnet (1450) may be formed to a smaller size than the drive magnet (1410). In this way, the impact of the sensing magnet (1450) on the drive magnet (1410) can be minimized.

The sensing magnet (1450) may be disposed opposite the calibration (correction) magnet (1460). The sensing magnet (1450) and the calibration magnet (1460) may be disposed opposite each other on the first movement part (1200). The sensing magnet (1450) and the calibration magnet (1460) may be disposed opposite each other on the bobbin (1210).

The camera device (1010) may comprise a calibration magnet (1460). The calibration magnet (1460) may be a compensation magnet. The compensation magnet (1460) may be disposed in the first movement part (1200). The compensation magnet (1460) may be fixed to the first movement part (1200). The calibration magnet (1460) may be coupled to the first movement part (1200). The calibration magnet (1460) may be bonded to the first movement part (1200) with an adhesive. The calibration magnet (1460) may be disposed on the bobbin (1210). The calibration magnet (1460) may be secured to the bobbin (1210). The calibration magnet (1460) may be coupled to the bobbin (1210). The calibration magnet (1460) may be bonded to the bobbin (1210) by an adhesive. The calibration magnet (1460) may be formed to a smaller size than the drive magnet (1410). By doing so, the impact of the calibration magnet (1460) on the drive magnet (1410) may be minimized. Additionally, the calibration magnet (1460) may be disposed on the opposite side of the sensing magnet (1450) to form a magnetic equilibrium with the sensing magnet (1450). This may inhibit tilting that may be caused by the sensing magnet (1450).

The camera device (1010) may comprise a sensing substrate (1470). The sensing substrate (1470) may be a substrate. The sensing substrate (1470) may be a printed circuit board (PCB). The sensing substrate (1470) may be a flexible substrate. The sensing substrate (1470) may be an FPCB. The sensing substrate (1470) may be coupled to the first substrate (1110). The sensing substrate (1470) may be connected to the first substrate (1110). The sensing substrate (1470) may be electrically connected to the first substrate (1110). The sensing substrate (1470) may be soldered to the first substrate (1110). The sensing substrate (1470) may be disposed in the housing (1130). The sensing substrate (1470) may be secured to the housing (1130). The sensing substrate (1470) may be coupled to the housing (1130). The housing (1130) may comprise a groove or a hole shaped to correspond to that of the sensing substrate (1470). The sensing substrate (1470) may be disposed in the groove or hole in the housing (1130).

The sensing board (1470) may comprise a terminal that is coupled with the connection substrate (1600). The terminal of the sensing substrate (1470) may be formed at the 6 and 12 o'clock positions of the base (1120) in FIG. 41 and not formed at the 3 and 9 o'clock positions. The terminal of the sensing substrate (1470) may only be formed on the unit connection substrate (1600) on either side, even at the 6 and 12 o'clock positions of the base (1120).

The camera device (1010) may comprise a driver IC (1480). Driver IC (1480) may be an AF driver IC. The driver IC (1480) may be electrically coupled to the first coil (1430). The driver IC (1480) may apply a current to the first coil (1430) to perform AF driving. The driver IC (1480) may apply a power to the first coil (1430). The driver IC (1480) may apply a current to the first coil (1430). The driver IC (1480) may apply a voltage to the first coil (1430). The driver IC (1480) may be disposed on the sensing substrate (1470). The driver IC (1480) may be disposed in a position corresponding to that of the sensing magnet (1450). The driver IC (1480) may be disposed facing the sensing magnet (1450). The driver IC (1480) may be disposed adjacent to the sensing magnet (1450).

The driver IC (1480) may comprise a sensor. The sensor may comprise a Hall IC. The sensor may be disposed in a position corresponding to that of the sensing magnet (1450). The sensor may be disposed facing the sensing magnet (1450). The sensor may be disposed adjacent to the sensing magnet (1450). The sensor may detect the sensing magnet (1450). The sensor may detect a magnetic force of the sensing magnet (1450). The sensor may detect a position of the first movement part (1200). The sensor may detect a movement of the first movement part (1200). The sensed value detected by the sensor may be used for feedback to drive the autofocus.

The camera device (1010) may comprise a gyro sensor (1490). The gyro sensor (1490) may be disposed on the first substrate (1110). The gyro sensor (1490) may detect shaking (shake) of the camera device (1010). The gyro sensor (1490) may sense an angular velocity or a linear velocity caused by the shaking of the camera device (1010). The gyro sensor (1490) may be electrically coupled to driver IC (1495). The shake of the camera device (1010) detected by the gyro sensor (1490) may be used to drive the image stabilization (OIS).

The camera device (1010) may comprise a driver IC (1495). The driver IC (1495) may be an OIS driver IC. The driver IC (1495) may be electrically coupled to the second coil (1440). The driver IC (1495) may apply a current to second coil (1440) to perform OIS driving. The driver IC (1495) may apply a power to the second coil (1440). The driver IC (1495) may apply a current to the second coil (1440). The driver IC (1495) may apply a voltage to the second coil (1440). The driver IC (1495) may be disposed on the second substrate (1310).

The camera device (1010) may comprise a connection member. The connection member may be an interposer. The connection member may support movement of the second movement part (1300). The connection member may support movement of the second movement part (1300). The connection member may connect the second movement part (1300) and the fixed part (1100). The connection member may connect the first substrate (1110) and the second substrate (1310). The connection member may electrically connect the first substrate (1110) and the second substrate (1310). The connection member may connect the first substrate (1110) and the second movement part (1300). The connection member may guide movement of the second movement part (1300). The connection member may guide the second movement part (1300) to move in a direction perpendicular to the optical axis direction. The connection member may guide the second movement part (1300) to rotate about the optical axis. The connection member may limit movement of the second movement part (1300) in the optical axis direction.

The connection member may comprise a connection substrate (1600). The connection member may comprise an elastic member connecting the fixed part (1100) and the second movement part (1300). The connection member may comprise a leaf spring. The connection member may comprise a wire (1800). The connection member may comprise a ball disposed between the fixed part (1100) and the second movement part (1300).

The camera device (1010) may comprise a connection substrate (1600). The connection substrate (1600) may be a connection part. The connection substrate (1600) may be a connection member. The connection substrate (1600) may be a flexible substrate. The connection substrate (1600) may be a flexible board. The connection substrate (1600) may be a flexible printed circuit board. The connection substrate (1600) may be a flexible printed circuit board (FPCB). The connection substrate (1600) may be flexible in at least some portions. The second substrate (1310) and the connection substrate (1600) may be integrally formed.

The connection substrate (1600) may support the second movement part (1300). The connection substrate (1600) may support movement of the second movement part (1300). The connection substrate (1600) may movably support the second movement part (1300). The connection substrate (1600) may connect the second movement part (1300) to the fixed part (1100). The connection substrate (1600) may connect the first substrate (1110) and the second substrate (1310). The connection substrate (1600) may electrically connect the first substrate (1110) and the second substrate (1310). The connection substrate (1600) may guide movement of the second movement part (1300). The connection substrate (1600) may guide the second movement part (1300) to move in a direction perpendicular to the optical axis direction. The connection substrate (1600) may guide the second movement part (1300) to rotate about the optical axis. The connection substrate (1600) may limit movement of the second movement part (1300) in the optical axis direction. A portion of the connection substrate (1600) may be coupled to the base (1120).

The connection substrate (1600) may comprise two connection substrates (1600) spaced apart from each other and formed symmetrically. The two connection substrates (1600) may be disposed on either side of the second substrate (1310). The connection substrate (1600) may be formed to connect the first substrate (1110) and the second substrate (1310) with a total of six bends. The connection substrate (1600) may comprise a first region that is connected to the second substrate (1310) and is bent in an optical axis direction. The first region may be connected to the second substrate (1310) and may be bent in an optical axis direction. The first region may be connected to the second substrate (1310) and extend in the optical axis direction. The first region may be connected to the second substrate (1310) and bent in the optical axis direction. The connection substrate (1600) may comprise a second region extended from the first region. The connection substrate (1600) may comprise a third region that bends to a direction perpendicular to the optical axis direction from the second region. The third region may be bent in an optical axis direction and a direction perpendicular to the optical axis direction from the second region. The third region may extend from the second region in an optical axis direction and a direction perpendicular to the optical axis direction. The third region may extend and bend from the second region in a direction perpendicular to the optical axis direction.

The connection substrate (1600) may comprise a connection part (1610) comprising a first region. The connection substrate (1600) may comprise an extension part (1620) that comprises a second region and a third region. The connection substrate (1600) may comprise a connection part (1610) that connects to the second substrate (1310). The connection substrate (1600) may comprise an extension part (1620) extending from the connection part (1610). The connection substrate (1600) may comprise a terminal part (1630) that is connected to the extension part (1620) and comprises terminals.

The connection substrate (1600) may comprise a connection part (1610). The connection part (1610) may be connected to the second movement part (1300). The connection part (1610) may be coupled to the second movement part (1300). The connection part (1610) may be secured to the second movement part (1300). The connection part (1610) may be connected to the second substrate (1310). The connection part (1610) may be coupled to the second substrate (1310). The connection part (1610) may be secured to the second substrate (1310). The connection part (1610) may comprise a bending region that is bent in the optical axis direction. The connection part (1610) may comprise a first region that is bent in the optical axis direction with respect to the second substrate (1310) and a second region that extends from the first region and is bent in a direction perpendicular to the optical axis direction.

The connection substrate (1600) may comprise an extension part (1620). The extension part (1620) may connect the connection part (1610) and the terminal part (1630). The extension part (1620) may extend from the connection part (1610). The extension part (1620) may comprise a bending region that bend in a direction perpendicular to an optical axis direction. The bending angle of the extension part (1620) may be 80 to 100 degrees. The bending angle of the extension part (1620) may be 85 to 95 degrees.

One of the bending regions of the connection part (1610) and the bending regions of the extension part (1620) may be referred to as the first bending region and the other as the second bending region.

The connection substrate (1600) may comprise a terminal part (1630). The terminal part (1630) may be coupled to the fixed part (1100). The terminal part (1630) may be secured to the fixed part (1100). The terminal part (1630) may be connected to the extension part (1620). The terminal part (1630) may be coupled to the first substrate (1110). The terminal part (1630) may be connected to the first substrate (1110). The terminal part (1630) may be soldered to the first substrate (1110). The terminal part (1630) may be secured to the first substrate (1110). The terminal part (1630) may be coupled to the base (1120). The terminal part (1630) may be secured to the base (1120). The terminal part (1630) may comprise a terminal (1631) that is coupled with the first substrate (1110). The terminal part (1630) may comprise a terminal (1631). The terminal (1631) may be coupled to the first substrate (1110).

In a second exemplary embodiment of the present invention, the camera device (1010) may comprise a flexible substrate. The flexible substrate may connect the fixed part (1100) and the second movement part (1300). The flexible substrate may comprise a connection part (1610) connecting to the second movement part (1300), an extension part (1620) extending from the connection part (1610), and a terminal part (1630) connecting to the extension part (1620) and comprising a terminal.

In a second exemplary embodiment of the invention, the connection substrate (1600) may comprise a first portion coupled to the first substrate (1110), a second portion coupled to the second substrate (1310), and a third portion connecting the first and second portions. The third portion may be disposed at least partially parallel to the optical axis. The third portion may be formed such that its length along the optical axis direction is longer than its thickness. The second portion of the connection substrate (1600) may be disposed parallel to the second substrate (1310) in at least some portions. A third portion of the connection substrate (1600) may be disposed perpendicular to the second portion in at least some portions. The third portion of the connection substrate (1600) may be rounded at portions corresponding to corners of the second substrate (1310). The second substrate (1310) can comprise a first side and a second side disposed opposite each other, and a third side and a fourth side disposed opposite each other. A second portion of the connection substrate (1600) may be coupled to the first and second sides of the second substrate (1310). The first portion of the connection substrate (1600) may be coupled to portions of the first substrate (1110) that correspond to the third and fourth sides of the second substrate (1310).

The connection substrate (1600) may be integrally formed with the second substrate (1310), as shown in FIG. 44. Alternatively, in a modification, the connection substrate (1600) may be formed separately from the second substrate (1310), as shown in (a) of FIG. 45. In this case, the connection substrate (1600) may be coupled to the second substrate (1310). The connection substrate (1600) may be coupled to the second substrate (1310) by ACF bonding.

The camera device (1010) may comprise a metal member (1650). The connection member may comprise the metal member (1650). The connection substrate (1600) may comprise the metal member (1650). However, the metal member (1650) may also be understood as a separate configuration from the connection substrate (1600). The metal member (1650) may be a metal plate. The metal member (1650) may comprise a spring. The metal member (1650) may comprise a leaf spring. The metal member (1650) may comprise an elastic member. The metal member (1650) may comprise an elastic part having elasticity. The metal member 1650 may have elasticity.

The metal member (1650) may be a conductive member. The metal member (1650) may be electrically conductive. The metal member (1650) may be a metal part. The metal member (1650) may be a metal layer. The metal member (1650) may be a metal film. The metal member (1650) may be formed of metal. The metal member (1650) may be formed of an alloy. The metal member (1650) may be formed of a copper alloy. The metal member (1650) may be formed of a conductive material. The metal member (1650) may be distinct from the electrically conductive layer (1602) of the connection substrate (1600). The metal member (1650) may be formed of a different material than the electrically conductive layer (1602) of the connection substrate (1600).

The metal member (1650) may be disposed on the connection substrate (1600). The metal member (1650) may be coupled to the connection substrate (1600). The metal member (1650) may be secured to the connection substrate (1600). The metal member (1650) may be integrally formed with the connection substrate (1600). The metal member (1650) may be elastic. The metal member (1650) may be bonded to the connection substrate (1600). The metal member (1650) may be bonded to the connection substrate (1600) by an adhesive.

In an axial direction, at least in part, the length of the metal member (1650) may be the same as the length of the extension part (1620). The metal member (1650) may extend the same length in the optical axis direction as that of the extension part (1620). The thickness of the metal member (1650) may be the same as the thickness of the connection board (1600). The thickness of the metal member (1650) may be thicker than the thickness of the connection substrate (1600). The thickness of the conductive layer (1602) may be from 7 to 50 um. The thickness of the metal member (1650) may be 20 to 150 um. The metal member (1650) may be connected to ground (GND) and used for impedance matching and noise suppression. The thickness of the metal member (1650) can be two to four times the thickness of the conductive layer (1602). The thickness of the metal member (1650) may be 2.5 times to 3.5 times the thickness of the conductive layer (1602).

At least a portion of the metal member (1650) may be disposed on an extension part (1620) of the connection substrate (1600). The extension part (1620) may comprise a bending region that bends in a direction perpendicular to an optical axis direction. A metal member (1650) may be disposed in the bending region. The metal member (1650) may be disposed on an inner surface of the extension part (1620). The metal member (1650) may be disposed on an outer surface of the extension part (1620).

The metal member (1650) may be formed of a conductive material. The metal member (1650) may be electrically connected to the second substrate (1310). The metal member (1650) may be electrically connected to the first substrate (1110). The metal member (1650) may be electrically connected to a ground terminal of the connection substrate (1600). The metal member (1650) may be electrically connected to the image sensor (1330). The metal member (1650) may be electrically connected to the driver IC (1495). The metal member (1650) may be connected to a terminal (1631) of the connection substrate (1600). The metal member (1650) may be electrically connected to the terminal (1631) of the connection substrate (1600). The metal member (1650) may be in direct contact with the terminal (1631) of the connection substrate (1600).

The metal member (1650) may be coupled to the terminal (1631) of the connection substrate (1600) by a conductive member. The metal member (1650) may be used as a ground (GND). The metal member (1650) may be connected to the ground terminal of the connection substrate (1600). The metal member (1650) may be electrically connected to the first substrate (1110). In this case, the number of power connection patterns on the connection substrate (1600) may be reduced.

The metal member (1650) may comprise a body part disposed on the extension part (1620), and a protrusion (1660) extending from the body part down to the terminal (1631) of the connection substrate (1600). The protrusion (1660) may be a protruder. The protrusion (1660) can be connected to the terminal (1631) of the connection substrate (1600). The protrusion (1660) may be electrically connected to the terminal (1631) of the connection substrate (1600). The protrusion (1660) may be coupled to the terminal (1631) of the connection substrate (1600). The protrusion (1660) may be coupled to the terminal (1631) of the connection substrate (1600) by a conductive member. The protrusion (1660) may be coupled to the terminal (1631) of the connection substrate (1600) by solder. The protrusion (1660) may be coupled to the terminal (1631) of the connection substrate (1600) by soldering. The protrusion (1660) may be bonded to the terminal (1631) of the connection substrate (1600) by Ag epoxy. The protrusion (1660) may be secured to the terminal (1631) of the connection substrate (1600). The protrusion (1660) may contact the terminals (1631) of the connection substrate (1600). The protrusion (1660) may be in direct contact with the terminal (1631) of the connection substrate (1600). The protrusion (1660) may be in physical contact with the terminal (1631) of the connection substrate (1600). The protrusion (1660) may be connected to the ground terminal of the connection substrate (1600).

As shown in FIG. 45 (*b*), the connection substrate (1600) may comprise two insulating layers (1601) and a conductive layer (1602) disposed between the two insulating layers (1601). The metal member (1650) may comprise a different material than the conductive layer (1602). The conductive layer (1602) may be an energizing layer. The conductive layer (1602) may be formed of copper. The metal member (1650) may be formed of a copper alloy. The metal member (1650) may comprise an alloy of copper and titanium. The metal member (1650) may comprise an alloy of copper and nickel. The metal member (1650) may comprise copper. The metal member (1650) may comprise titanium. The metal member (1650) may comprise nickel.

The thickness of the metal member (1650) may be thicker than the thickness of the conductive layer (1602). The thickness of the conductive layer (1602) may correspond to a distance between the two insulating layers (1601). In a second exemplary embodiment of the present invention, the connection substrate (1600) may be formed with only the two insulating layers (1601) and the conductive layer (1602) disposed between the two insulating layers (1601). The insulating layer (1601) may be formed of polyimide (Pi). The conductive layer (1602) may be electrically connected to the metal member (1650). For example, the conductive layer (1602) and the metal member (1650) may be ground-connected. The conductive layer (1602) and the metal member (1650) may be connected through a via hole formed in the insulating layer (1601).

As a modification, the metal member (1650) may be formed of the same material as the conductive layer (1602).

For example, both the metal member (1650) and the conductive layer (1602) may be formed of copper.

In a second exemplary embodiment of the present invention, the pattern of the connection substrate (1600) may be exposed inwardly, i.e., the innermost insulating layer (1602) may be omitted. In this case, the metal member (1650) may be disposed on the outer surface of the connection substrate (1600). In a modification, the metal member (1650) may be disposed on an inner surface of the connection substrate (1600). In this case, the pattern on the connector substrate (1600) may be exposed to the outside.

As shown in FIG. 47(*a*), a metal member (1650*a*) may comprise a plurality of first grooves (1375) recessed from the top, and a plurality of second grooves (1375) recessed from the bottom. The plurality of first grooves (1375) and the plurality of second grooves (1375) may each be disposed at positions that correspond to each other in the optical axis direction. The width of each of the individual grooves of the first grooves (1375) and the second grooves (1375) may be less than a length in the optical axis direction of the metal member (1650*a*).

As shown in FIG. 47 (*b*), a metal member (1650*b*) may comprise a first portion (1653) and a second portion (1654) formed to be shorter than the first portion (1653) in the optical axis direction. At least a portion of the second portion (1654) of the metal member (1650) may be disposed in a bending region of the extension part (1620) of the connection member (1600).

As shown in FIG. 47 (*c*), a metal member (1650*c*) may extend in a zigzag manner in a direction perpendicular to the optical axis direction with a width shorter than the length in the optical axis direction of the extension part (1620). The metal member (1650*c*) may extend in a direction inclined to the optical axis and in a direction perpendicular to the optical axis. The metal member (1650*c*) may comprise a first portion (1655) and a second portion (1656) extending in a zigzag shape from the first portion (1655).

As shown in FIG. 47 (*d*), a metal member (1650*d*) may comprise a plurality of first grooves recessed from the top and a plurality of second grooves recessed from the bottom. The plurality of first grooves and the plurality of second grooves may each be disposed at positions corresponding to each other in the optical axis direction. The width of each individual groove of the first and second grooves may be less than the length of the metal member (1650*d*) in the optical axis direction. The metal member (1650*d*) may comprise a first portion (1657) and a second portion (1658) connecting the first portion (1657) and comprising the first and second grooves. The first portion (1657) of the metal member (1650*d*) may be disposed in a bending region of the extension part (1620)

The camera device (1010) may comprise an insulating layer. The connection member may comprise an insulating layer. The connection substrate (1600) may comprise an insulating layer. The insulating layer may cover the metal member (1650). The insulating layer may be disposed on an exterior surface of the metal member (1650). The metal member (1650) may be disposed between the insulating layers. The insulating layer may comprise an insulating material. The insulating layer may be formed of polyimide (Pi). The insulating layer may protect the metal member (1650).

The camera device (1010) may comprise an elastic member (1700). The elastic member (1700) may be a support member. The elastic member (1700) may connect the fixed part (1100) and the first movement part (1200). The elastic member (1700) may elastically connect the fixed part (1100)

and the first movement part (1200). The elastic member (1700) may connect the bobbin (1210) and the housing (1130). The elastic member (1700) may elastically connect the bobbin (1210) and the housing (1130). The elastic member (1700) may moveably support the first movement part (1200) relative to the fixed part (1100). The elastic member (1700) may deform as the first movement part (1200) is moved. The elastic member (1700) may return the first movement part (1200) to its initial position via a restoring power when the movement of the first movement part (1200) ends. The elastic member (1700) may comprise a leaf spring. The elastic member (1700) may comprise a spring. The elastic member (1700) may be elastic in at least a portion. The elastic member (1700) may provide a restoring power to the first movement part.

The camera device (1010) may comprise an upper elastic member (1710). The elastic member (1700) may comprise an upper elastic member (1710). The upper elastic member (1710) may be disposed on top of a lower elastic member (1720). The upper elastic member (1710) may comprise an inner part that engages the bobbin (1210). The inner part of the upper elastic member (1710) may be coupled to an upper portion of the bobbin (1210). The inner part of the upper elastic member (1710) may be disposed on a top surface of the bobbin (1210). The upper elastic member (1710) may comprise an outer part that is coupled to the housing (1130). The outer part of the upper elastic member (1710) may be coupled to a lower portion of the housing (1130). The outer part of the upper elastic member (1710) may be disposed on a bottom side of the housing (1130). The upper elastic member (1710) may comprise a connection part connecting the inner and outer parts. The connection may have elasticity.

The camera device (1010) may comprise a lower elastic member (1720). The elastic member (1700) may comprise the lower elastic member (1720). The lower elastic member (1720) may be disposed below the upper elastic member (1710). The lower elastic member (1720) may comprise an inner part that engages the bobbin (1210). The inner part of the lower elastic member (1720) may be coupled to a lower portion of the bobbin (1210). An inner part of the lower elastic member (1720) may be disposed on the underside of the bobbin (1210). The lower elastic member (1720) may comprise an outer part that engages the housing (1130). The outer part of the lower elastic member (1720) may be coupled to an upper portion of the housing (1130). The outer part of the lower elastic member (1720) may be disposed on a top surface of the housing (1130). The lower elastic member (1720) may comprise a connection part connecting the inner and outer parts. The connection may have elasticity. The lower elastic member (1720) may comprise a plurality of lower elastic units. The lower elastic member (1720) may comprise first and second lower elastic units (1720-1, 720-2). The lower elastic member (1720) may comprise two lower elastic units (1720-1, 720-2). The two lower elastic units (1720-1, 720-2) may be spaced apart from each other to electrically connect the sensing substrate (1470) and the first coil (1430).

The camera device (1010) may comprise a wire (1800). The wire (1800) may be a wire spring. The wire (1800) may be an elastic member. The wire (1800) may be a leaf spring, as a variation. The wire (1800) may connect the fixed part (1100) and the second movement part (1300). The wire (1800) may elastically connect the fixed part (1100) and the second movement part (1300). The wire (1800) may connect the housing (1130) and the second substrate (1310). The wire (1800) may elastically connect the housing (1130) and the second substrate (1310). The wire (1800) may moveably support the second movement part (1300). The wire (1800) may support the second movement part (1300) to move or rotate in a direction perpendicular to the optical axis direction. The wire (1800) may comprise four wires disposed at corner regions of the housing (1130).

An interposer that simultaneously serves as an electrical connection to connect the image sensor (1330) and driver IC (1495) signals of the Sensor Shift OIS to the main PCB, the first substrate (1110), and a mechanical role, such as shock reliability, may be essential. A second exemplary embodiment of the present invention may comprise an interposer that can achieve the same characteristics. The interposer may be a connection member. The interposer may comprise a connection substrate (1600) and a metal member (1650). The sensing substrate (1470) may be electrically connected to the connection substrate (1600). The connection substrate (1600) may be an interposer PCB. The metal member (1650) may be formed of a copper material. The metal member (1650) may be formed from a copper (Cu) and titanium (Ti) alloy. The metal member (1650) may be a spring. The metal member (1650) may be an elastic member.

The metal member (1650) may be elastic. A spring may be used as ground (GND) reinforcement. The GND connection through the metal member (1650) according to the second exemplary embodiment of the present invention may also facilitate impedance matching even if the increased size of the image sensor (1330) requires a higher allowable current. The spring geometry may be varied in other ways besides that of FIG. 47, and the spring constant (Spring K) may be lowered. The spring constant may be more than one order of magnitude higher in the rotational direction and more than 50 orders of magnitude higher in the z direction compared to the x and y directions. The metal member (1650) may be omitted. However, in this case, the target value of the spring constant may be set to be the same. The interposer may be easy to move in the x, y, directions and difficult to move in the z direction.

By applying the connection substrate (1600) and the metal member (1650), the bending part may be easily managed and tolerated. The spring constant (Spring K) may be increased relative to the connection substrate (1600) alone, to reduce the influence of the connection substrate (1600) relative to the influence of the spring. To facilitate tuning, the first resonant frequency of the OIS may be within 40 to 150 [Hz] and the resonant frequency for the rotation direction may be higher than the first resonant frequency. The weight of the second movement part (1300), comprising the image sensor (1330) and the second substrate (1310), may be 2 grams or less, and the spring constant (K) value may be 100 N/m or more. The first resonant frequency and the third resonant frequency may be managed to be above 100 Hz to facilitate tuning. The interposer substrate may be a second substrate (1310). A center of the interposer substrate may be formed with a hole.

Driver ICs and Hall elements are disposed on the second substrate (1310), and the rigid portion of the second substrate (1310) and the FPCB portion of the connection substrate (1600) may be electrically connected in two or more portions. In this case, the connection may be realized at two to four locations. The FPCB may be bended twice. The bended part of the connection substrate (1600) may have wider springs or GNDs than other locations because the driving displacement is not large and the shape must be maintained. The bending angle of the connection substrate (1600) may be 80 to 100 degrees. A second exemplary embodiment of the present invention may comprise an actuator that utilizes the connection substrate (1600) of the sensor shift to connect circuit signals to the main PCB.

In the second exemplary embodiment of the invention, a spring may be added to a portion of the interposer. The interposer may be electrically connected to a ground (GND). The first resonant frequency may be within 40 to 150 Hz. The rotation mode may be located between the first resonant frequency and the tilt mode, and the rotation frequency may be at least one order of magnitude greater than the first resonant frequency. The spacing between the first resonant frequency and the third resonant frequency may be 100 Hz or more. The spring constants K in the x, y, and z directions of the connection member, which is a combination of the connection substrate (1600) and the metal member (1650), may be 50 times higher than K in the Z direction.

In a second exemplary embodiment of the present invention, the first resonance point may be located within 60 to 80 Hz, the second resonance point may be located within 150 to 170 Hz, and the third resonance point may be located within 290 to 310 Hz. The gain value may be higher at the first resonance point than at the second resonance point, and higher at the second resonance point than at the third resonance point. For reference, the point at which the output voltage is maximized over the input voltage when the voltage forming the x-axis force is applied as a sine wave may be the first resonance point. The point where rotation occurs may be the secondary resonance point. The point where tilt occurs may be the third resonance point. The waveform at the resonance point may be a sine wave. The frequency may be between 5 Hz and 10 KHz. The sweep may be 300 steps/sweep. The source can be 0 Vdc, 100 mV p-p. The lens can weigh 0.097 grams.

Hereinafter, operation of the camera device according to the second exemplary embodiment of the present invention will be described with reference to the drawings.

Figure 50:
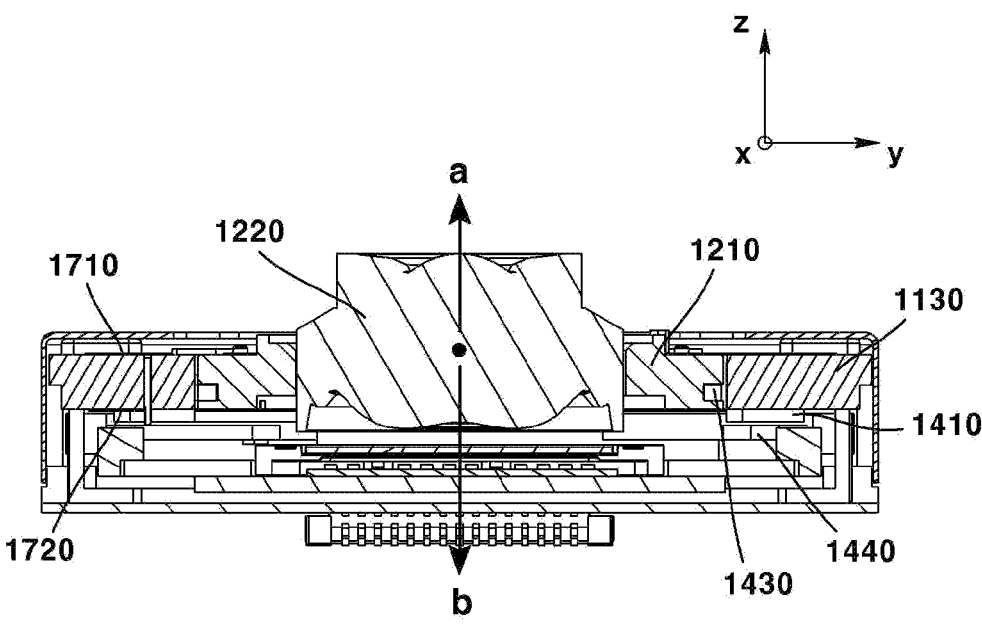
FIG. 50 is a diagram to illustrate the operation of the autofocus function of the camera device according to a second exemplary embodiment of the present invention.

FIG. 50 is a drawing to illustrate operation of an autofocus function of a camera device according to a second exemplary embodiment of the present invention.

When power is applied to a first coil (1430) of the camera device (1010) according to the second exemplary embodiment of the present invention, an electromagnetic field is formed in the first coil (1430) such that the first coil (1430) may move in the optical axis direction (z-axis direction) through electromagnetic interaction with the drive magnet (1410). In this case, the first coil (1430) may move in the optical axis direction with the first movement part (1200), which comprises the lens (1220). In this case, the lens (1220) may be moved away from or closer to the image sensor (1330), thereby adjusting the focus of the subject. One or more of a current and a voltage may be applied to energize the first coil (1430).

When a current in a first direction is applied to the first coil (1430) of the camera device (1010) according to a second exemplary embodiment of the present invention, the first coil (1430) may move in an upward direction of the optical axis direction {see FIG. 50 (*a*)} through electromagnetic interaction with the drive magnet (1410). At this time, the first coil (1430) can move the lens (1220) in the upward direction of the optical axis direction away from the image sensor (1330).

When a current in a second direction opposite to the first direction is applied to the first coil (1430) of the camera device (1010) according to a second exemplary embodiment of the present invention, the first coil (1430) may be moved to a downward direction of the optical axis direction {see FIG. 50 (*b*)} through electromagnetic interaction with the drive magnet (1410). At this time, the first coil (1430) can move the lens (1220) in the downward direction of the optical axis direction to be closer to the image sensor (1330).

Figure 51:
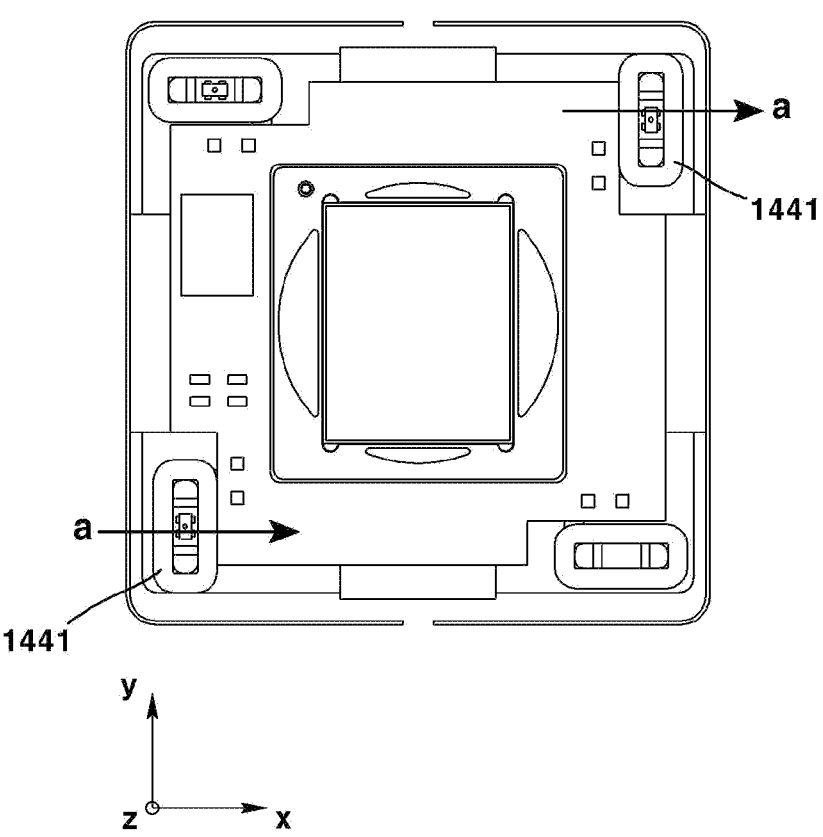
FIGS. 51 to 53 are drawings to illustrate operation of an image stabilization function of a camera device according to a second exemplary embodiment of the present invention. More specifically.
Figure 52:
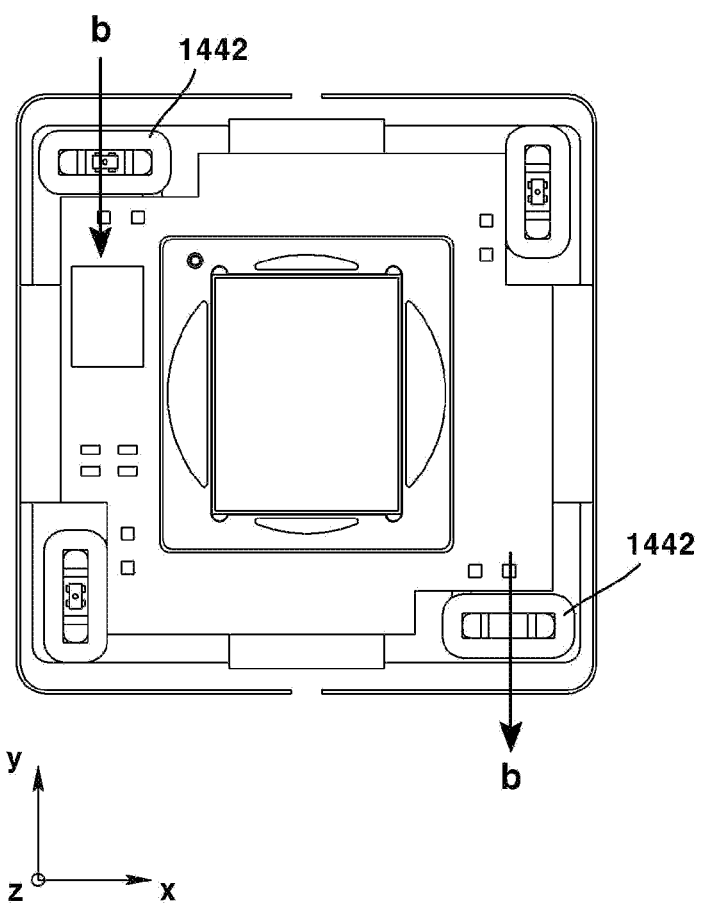
Figure 53:
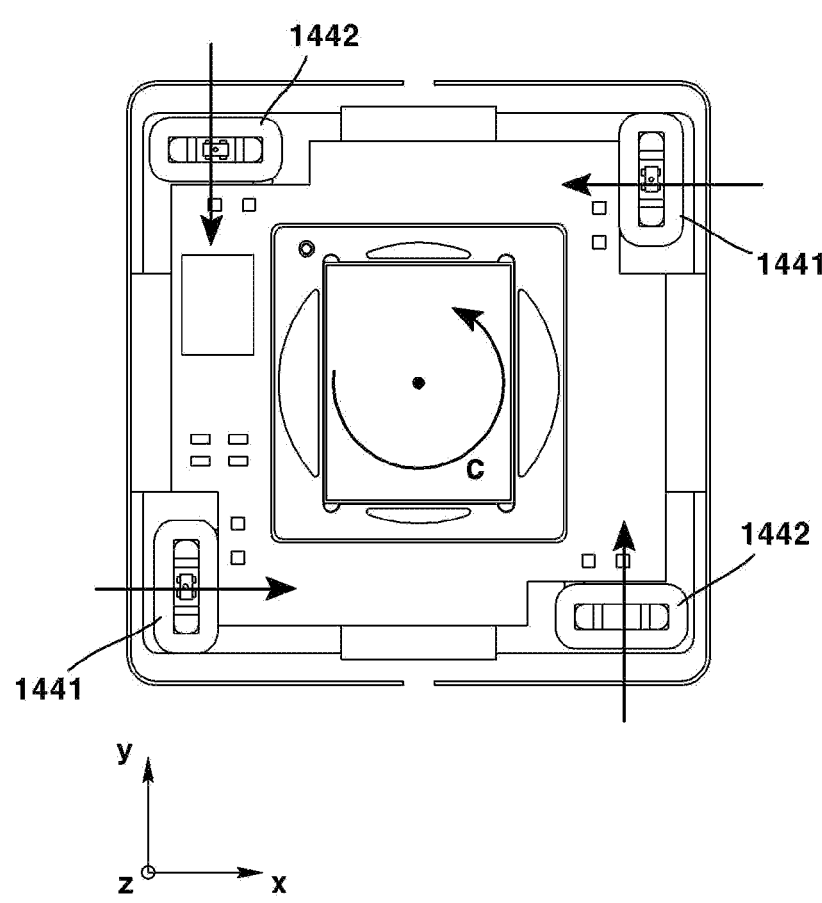

FIGS. 51 to 53 are drawings to illustrate operation of an image stabilization function of a camera device according to a second exemplary embodiment of the present invention.

When power is applied to a second coil (1440) of the camera device (1010) according to the second exemplary embodiment of the present invention, an electromagnetic field may be formed on the second coil (1440) such that the second coil (1440) may move in a direction perpendicular to the optical axis direction through electromagnetic interaction with the drive magnet (1410). In addition, the second coil (1440) may rotate about the optical axis through electromagnetic interaction with the drive magnet (1410). In this case, the second coil (1440) may move or rotate with the second movement part (1300), which comprises the image sensor (1330). In a second exemplary embodiment of the present invention, the second coil (1440) may move the image sensor (1330) to compensate for a shake (shaking) of the camera device (1010) detected by the gyro sensor (1490).

FIG. 51 is a drawing to illustrate a drive in which an image sensor of a camera device according to a second exemplary embodiment of the present invention is shifted along the X-axis.

When a current in a first direction is applied to the second-1 coil (1441) of the camera device (1010) according to the second exemplary embodiment of the present invention, the second-1 coil (1441) may be shifted in one of the first direction (x-axis direction) perpendicular to the optical axis direction {see FIG. 51 (*a*)} through electromagnetic interaction with the drive magnet (1410). At this time, the second-1 coil (1441) may move the image sensor (1330) in one of the first directions perpendicular to the optical axis direction. Conversely, when current is applied to the second-1 coil (1441) in a second direction opposite to the first direction, the second-1 coil (1441) may move in the other direction of the first direction perpendicular to the optical axis (x-axis direction) through electromagnetic interaction with the drive magnet (1410). At this time, the second-1 coil (1441) may move the image sensor (1330) in the other of the first directions perpendicular to the optical axis direction.

FIG. 52 is a drawing to illustrate a drive in which an image sensor of a camera device according to a second exemplary embodiment of the present invention is shifted along the y-axis.

When a current in the first direction is applied to the second-2 coil (1442) of the camera device (1010) according to the second exemplary embodiment of the present invention, the second-2 coil (1442) may be moved in one of the second directions (y-axis direction) perpendicular to the optical axis direction {see FIG. 52 (*b*)} through electromagnetic interaction with the drive magnet (1410). In this case, the second-2 coil (1442) may move the image sensor (1330) in one of the second directions perpendicular to the optical axis direction. Conversely, when current is applied to the second-2 coil (1442) in a second direction opposite to the first direction, the second-2 coil (1442) may move in the other direction of the second directions perpendicular to the optical axis direction (y-axis direction) through electromagnetic interaction with the drive magnet (1410). At this time, the second-2 coil (1442) may move the image sensor (1330) in the other direction of the second directions perpendicular to the optical axis direction.

FIG. 53 is a drawing to illustrate a drive in which an image sensor of a camera device according to a second exemplary embodiment of the present invention is rolled around a z-axis.

When a current in a first direction is applied to the second-1 coil (1441) and the second-2 coil (1442) of the camera device (1010) according to the second exemplary embodiment of the present invention, the second-1 coil (1441) and the second-2 coil (1442) may rotate unidirectionally about the optical axis through electromagnetic interaction with the drive magnet (1410) {see FIG. 53 (*c*)}. At this time, the second-1 coil (1441) and the second-2 coil (1442) may rotate the image sensor (1330) in a unidirectional direction about the optical axis. In this case, the unidirectional direction may be counterclockwise. Conversely, when current is applied to the second-1 coil (1441) and the second-2 coil (1442) in a second direction that is opposite to the first direction, the second-1 coil (1441) and the second-2 coil (1442) may rotate in the other direction about the optical axis through electromagnetic interaction with the drive magnet (1410). In this case, the second-1 coil (1441) and the second-2 coil (1442) may rotate the image sensor (1330) in a different direction about the optical axis. In this case, the other direction may be clockwise direction.

Hereinafter, an optical instrument according to a second exemplary embodiment of the present invention will be described with reference to the drawings.

Figure 54:
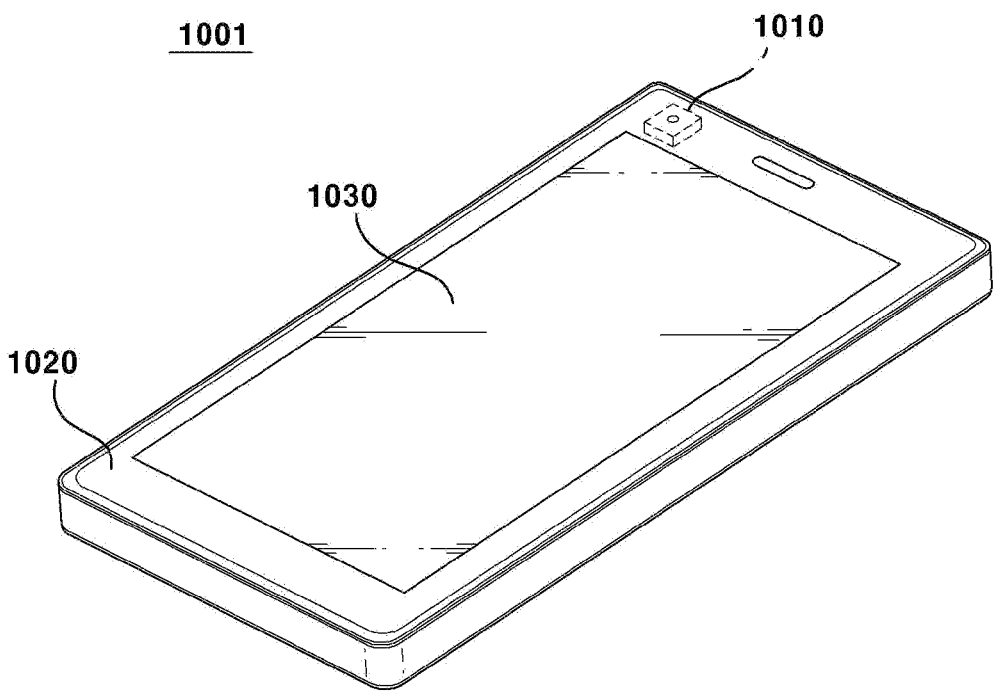
FIG. 54 is a perspective view of an optical instrument according to a second exemplary embodiment of the present invention.
Figure 55:
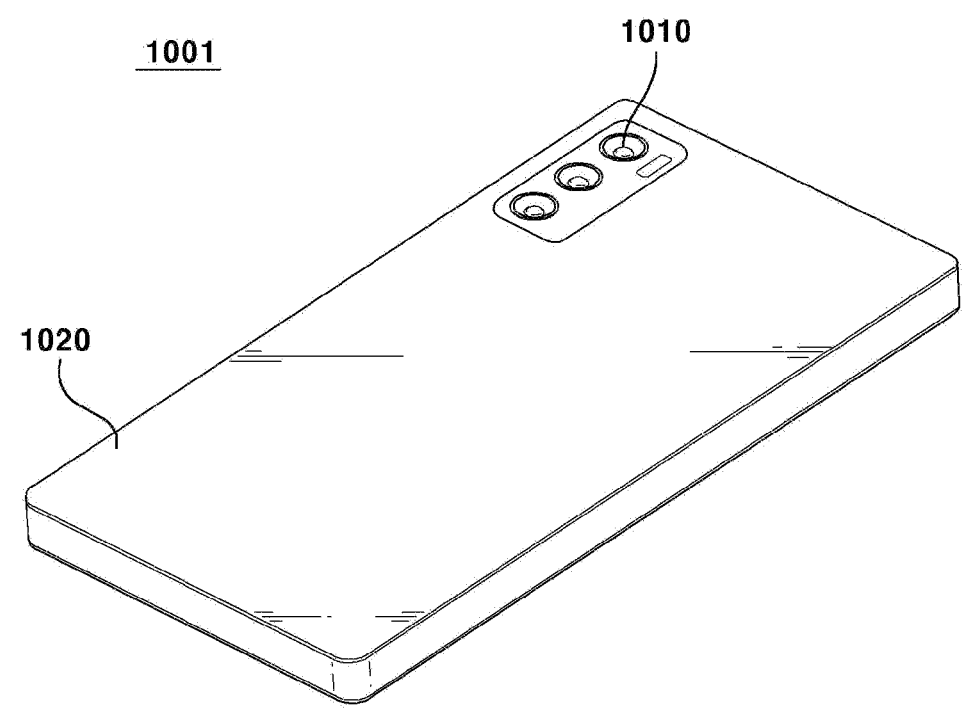
FIG. 55 is a perspective view of an optical instrument according to a second exemplary embodiment of the present invention from a different orientation than FIG. 54.

FIG. 54 is a perspective view of an optical instrument according to a second exemplary embodiment of the present invention, and FIG. 55 is a perspective view of an optical instrument according to a second exemplary embodiment of the present invention from a different direction than FIG. 54.

An optical instrument (1001) may comprise one or more of a cell phone, a mobile phone, a handheld device, a mobile terminal, a smart phone, a smart pad, a portable smart device, a digital camera, a laptop computer, a digital broadcast terminal, a personal digital assistant (PDA), a portable multi-media player (PMP), and a navigation device. The optical instrument (1001) may comprise any device for taking video or photographs.

The optical instrument (1001) may comprise a main body (1020). The optical instrument (1001) may comprise a camera device (1010). The camera device (1010) may be disposed on the main body (1020). The camera device (1010) may photograph a subject. The optical instrument (1001) may comprise a display (1030). The display (1030) may be disposed on the main body (1020). The display (1030) may output one or more of a video and an image taken by the camera device (1010). The display (1030) may be disposed on a first surface of the main body (1020). The camera device (1010) may be disposed on one or more of a first surface of the main body (1020) and a second surface opposite the first surface.

Although exemplary embodiments of the present invention have been described above by dividing them into a first exemplary embodiment and a second exemplary embodiment, some configurations of the first exemplary embodiment may be replaced by corresponding configurations of the second exemplary embodiment. Alternatively, some configurations of the second exemplary embodiment may be replaced by corresponding configurations of the first exemplary embodiment. Further, a third exemplary embodiment of the invention may comprise some configurations of the first exemplary embodiment and some configurations of the second exemplary embodiment. More specifically, the second exemplary embodiment of the invention may comprise the elastic member (500) of the first exemplary embodiment.

Further, the first exemplary embodiment of the invention may comprise the metal member (1650) of the second exemplary embodiment, or various variations of the metal member (1650).

While embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

We claim:

1. A camera device comprising:
a first substrate;
a second substrate and an image sensor configured to move together with the second substrate;
a drive part configured to move the image sensor in a direction perpendicular to an optical axis direction;
a connection substrate connecting the first substrate and the second substrate; and
a metal plate disposed on the connection substrate,
wherein the connection substrate comprises a connection part connected with the second substrate, a terminal part connected with the first substrate, and an extension part connecting the connection part and the terminal part,
wherein the extension part is disposed perpendicular to an upper surface of the image sensor,
wherein the extension part comprises a first region extending parallel to the upper surface of the image sensor, and a second region extending parallel to the upper surface of the image sensor and extending in a direction different from the first region, and
wherein the metal plate is disposed on the first region and the second region.

2. The camera device of claim 1, wherein the metal plate extends along the extension part of the connection substrate.

3. The camera device of claim 1, wherein the metal plate is used as a ground (GND).

4. The camera device of claim 1, comprising:
a fixed part comprising the first substrate;
a first movement part comprising a lens;
a second movement part comprising the second substrate and the image sensor; and
a first elastic member connecting the fixed part and the second movement part,
wherein the first elastic member comprises an outer part coupled with the fixed part, an inner part coupled with the second movement part, and a connection part connecting the outer part and the inner part, and
wherein the connection part extends in the direction perpendicular to the optical axis direction.

5. The camera device of claim 4, wherein a height in the optical axis direction of the connection part is from 0.5 times to 5 times a width in the direction perpendicular to the optical axis direction.

6. The camera device of claim 4, wherein a spring constant in the direction perpendicular to the optical axis direction of the connection part is less than a spring constant in the optical axis direction of the connection part.

7. The camera device of claim 4, comprising a second elastic member connecting the fixed part and the first movement part,
wherein the second elastic member comprises an outer part coupled with the fixed part, an inner part coupled with the first movement part, and a connection part connecting the outer part and the inner part, and wherein a spring constant in the optical axis direction of the connection part is less than a spring constant in the direction perpendicular to the optical axis direction.

8. The camera device of claim 4, wherein the first elastic member is spaced apart from the connection substrate.

9. The camera device of claim 4, comprising a wire connecting the fixed part and the second movement part, wherein the wire is spaced apart from the first elastic member.

10. The camera device of claim 4, wherein the fixed part comprises a base disposed on the first substrate, wherein the second movement part comprises a holder coupled with the second substrate, and wherein the first elastic member connects the base and the holder.

11. The camera device of claim 4, comprising a damper connecting the outer part of the first elastic member and the connection part of the first elastic member.

12. The camera device of claim 4, comprising a damper connecting the inner part of the first elastic member and the connection part of the first elastic member.

13. The camera device of claim 1, wherein the metal plate is formed of an alloy.

14. The camera device of claim 1, wherein the metal plate is electrically connected with the first substrate.

15. An optical instrument comprising:

a main body;

the camera device of claim 1 disposed on the main body; and a display disposed on the main body and configured to output a video or an image taken by the camera device.

16. A camera device comprising:

a fixed part comprising a first substrate;

a movement part comprising a second substrate, an image sensor electrically connected with the second substrate;

a magnet and a coil configured to move the image sensor;

a connection substrate connecting the first substrate and the second substrate; and a metal plate disposed on the connection substrate, wherein the connection substrate comprises a connection part connected with the second substrate, a terminal part connected with the first substrate, and an extension part connecting the connection part and the terminal part, wherein the extension part is disposed perpendicular to an upper surface of the image sensor, wherein the extension part comprises a first region extending parallel to the upper surface of the image sensor, and a second region extending parallel to the upper surface of the image sensor and extending in a direction different from the first region, and wherein the metal plate is disposed on the first region and the second region.

17. The camera device of claim 16, wherein the metal plate extends along the extension part of the connection substrate.

18. The camera device of claim 16, wherein the metal plate is used as a ground (GND).

19. The camera device of claim 16, wherein the metal plate is electrically connected with the first substrate.

20. A camera device comprising:

a first substrate;

a second substrate and an image sensor configured to move together with the second substrate;

a drive part configured to move the image sensor;

a connection substrate connecting the first substrate and the second substrate; and a metal plate disposed on the connection substrate wherein the connection substrate comprises a connection part connected with the second substrate, a terminal part connected with the first substrate, and an extension part connecting the connection part and the terminal part, wherein the extension part is disposed perpendicular to an upper surface of the image sensor, wherein the extension part comprises a first region extending parallel to the upper surface of the image sensor, and a second region extending parallel to the upper surface of the image sensor and extending in a direction different from the first region, wherein the metal plate is disposed on the first region and the second region, and wherein the metal plate is electrically connected with a ground terminal.

* * * * *